United States Patent
Slagle et al.

(10) Patent No.: US 11,831,027 B2
(45) Date of Patent: Nov. 28, 2023

(54) ELECTROCHEMICAL STACK AND METHOD OF ASSEMBLY THEREOF

(71) Applicant: QUANTUMSCAPE BATTERY, INC., San Jose, CA (US)

(72) Inventors: Richard Anthony Slagle, San Jose, CA (US); Celina Mikolajczak, San Jose, CA (US)

(73) Assignee: QUANTUMSCAPE BATTERY, INC., San Jose, CA (US)

(*) Notice: Subject to any disclaimer, the term of this patent is extended or adjusted under 35 U.S.C. 154(b) by 0 days.

(21) Appl. No.: 18/050,031

(22) Filed: Oct. 26, 2022

(65) Prior Publication Data

US 2023/0102316 A1 Mar. 30, 2023

Related U.S. Application Data

(63) Continuation of application No. PCT/US2022/044883, filed on Sep. 27, 2022.

(Continued)

(51) Int. Cl.
*H01M 50/105* (2021.01)
*H01M 10/653* (2014.01)
(Continued)

(52) U.S. Cl.
CPC ..... *H01M 50/105* (2021.01); *H01M 10/0486* (2013.01); *H01M 10/052* (2013.01);
(Continued)

(58) Field of Classification Search
CPC ................................................ H01M 10/0486
See application file for complete search history.

(56) References Cited

U.S. PATENT DOCUMENTS 6,743,546 B1 * 6/2004 Kaneda ............. H01M 10/0486
429/129
8,076,021 B2 12/2011 Shimamura et al.
(Continued)

FOREIGN PATENT DOCUMENTS

CN 101076915 A 11/2007
EP 1403942 3/2004
(Continued)

OTHER PUBLICATIONS

Communication pursuant to Article 94(3) EPC for the EP Application No. 18 819 429.4 dated Dec. 13, 2022, 8 pages.
(Continued)

*Primary Examiner* — Robert S Carrico
(74) *Attorney, Agent, or Firm* — Squire Patton Boggs (US) LLP

(57) ABSTRACT

An electrochemical stack assembly includes a laminated pouch surrounding a frame which encloses solid-state electrochemical cells and electrochemical stacks. In some embodiments, an electrochemical stack assembly includes one or more electrochemical cells, each electrochemical cell comprising a solid-state electrolyte to form at least one electrochemical stack with two major surfaces and four minor surfaces; a frame surrounding the at least one electrochemical stack with space between the frame and each of the four minor surfaces; and a laminated pouch surrounding the frame and the at least one electrochemical stack, the laminated pouch in contact with one or both of the major surfaces. In some embodiments, the frame comprises a tray. In some embodiments, the electrochemical stack assembly comprises two trays, each with an electrochemical stack comprising an electrochemical cell, the cell comprising a solid-state electrolyte.

20 Claims, 34 Drawing Sheets

Related U.S. Application Data

(60) Provisional application No. 63/261,727, filed on Sep. 27, 2021, provisional application No. 63/299,700, filed on Jan. 14, 2022, provisional application No. 63/313,051, filed on Feb. 23, 2022, provisional application No. 63/334,635, filed on Apr. 25, 2022, provisional application No. 63/392,093, filed on Jul. 25, 2022.

(51) Int. Cl.
*H01M 50/119* (2021.01)
*H01M 10/052* (2010.01)
*H01M 10/613* (2014.01)
*H01M 10/647* (2014.01)
*H01M 10/6555* (2014.01)
*H01M 50/121* (2021.01)
*H01M 50/124* (2021.01)
*H01M 10/04* (2006.01)

(52) U.S. Cl.
CPC ....... *H01M 10/613* (2015.04); *H01M 10/647* (2015.04); *H01M 10/653* (2015.04); *H01M 10/6555* (2015.04); *H01M 50/119* (2021.01); *H01M 50/121* (2021.01); *H01M 50/124* (2021.01)

(56) References Cited

U.S. PATENT DOCUMENTS

| | | |
|---|---|---|
| 8,394,523 B2 | 3/2013 | Yeo |
| 8,647,763 B2 | 2/2014 | Tennessen et al. |
| 8,828,576 B2 | 9/2014 | Kumar et al. |
| 9,224,516 B2 | 12/2015 | Nelson et al. |
| 9,548,512 B2 | 1/2017 | Liang et al. |
| 9,640,785 B2 | 5/2017 | Lee |
| 9,660,233 B2 | 5/2017 | Kim et al. |
| 9,666,870 B2 | 5/2017 | Oladeji et al. |
| 9,720,299 B1 | 8/2017 | Timmerman et al. |
| 10,490,781 B2 | 11/2019 | Jang |
| 10,505,222 B2 | 12/2019 | Carignan et al. |
| 10,854,858 B2 | 12/2020 | Yang et al. |
| 10,868,285 B2 | 12/2020 | You et al. |
| 10,998,587 B2 | 5/2021 | Walker |
| 11,450,926 B2 | 9/2022 | Chen et al. |
| 2002/0068212 A1 | 6/2002 | Osenar et al. |
| 2003/0180582 A1 | 9/2003 | Masumoto et al. |
| 2004/0115527 A1 | 6/2004 | Hiratsuka et al. |
| 2004/0126650 A1 | 7/2004 | Kim |
| 2006/0186601 A1 | 8/2006 | Lopez |
| 2006/0263672 A1 | 11/2006 | Lee et al. |
| 2006/0266542 A1 | 11/2006 | Yoon |
| 2007/0096688 A1 | 5/2007 | Suzuki et al. |
| 2007/0154794 A1 | 7/2007 | Kim et al. |
| 2008/0102358 A1 | 5/2008 | Kowalczyk et al. |
| 2008/0171259 A1 | 7/2008 | Kanai et al. |
| 2008/0257219 A1 | 10/2008 | Lelieur et al. |
| 2009/0123821 A1 | 5/2009 | Kim |
| 2009/0165933 A1 | 7/2009 | Loesch et al. |
| 2009/0305124 A1 | 12/2009 | Ahn et al. |
| 2010/0092859 A1 | 4/2010 | Kim et al. |
| 2010/0178536 A1 | 7/2010 | Kwak et al. |
| 2011/0039134 A1 | 2/2011 | Kim et al. |
| 2011/0059355 A1 | 3/2011 | Zhang et al. |
| 2011/0117422 A1 | 5/2011 | Lee et al. |
| 2011/0123836 A1 | 5/2011 | Jang |
| 2011/0159328 A1 | 6/2011 | Yeo |
| 2011/0217591 A1 | 9/2011 | Heo |
| 2012/0009467 A1 | 1/2012 | Park |
| 2012/0077091 A1 | 3/2012 | Lee et al. |
| 2012/0085396 A1 | 4/2012 | Tsuda et al. |
| 2012/0164553 A1 | 6/2012 | Gemba et al. |
| 2012/0208054 A1 | 8/2012 | Shirasawa et al. |
| 2012/0219840 A1 | 8/2012 | Choi et al. |
| 2012/0231313 A1 | 9/2012 | Kumar et al. |
| 2013/0011698 A2 | 1/2013 | Kwak et al. |
| 2013/0059171 A1 | 3/2013 | Kim et al. |
| 2013/0316224 A1 | 11/2013 | Lee et al. |
| 2014/0004397 A1 | 1/2014 | Lee et al. |
| 2014/0038045 A1 | 2/2014 | Lee et al. |
| 2014/0087224 A1 | 3/2014 | Kim et al. |
| 2014/0099538 A1 | 4/2014 | Johnson et al. |
| 2014/0134510 A1 | 5/2014 | Kawabata et al. |
| 2014/0162113 A1 | 6/2014 | Ohta et al. |
| 2014/0199581 A1 | 7/2014 | Ryu et al. |
| 2014/0205879 A1 | 7/2014 | Jang et al. |
| 2015/0037662 A1 | 2/2015 | Pinon et al. |
| 2015/0147633 A1 | 5/2015 | Ahn et al. |
| 2015/0288021 A1 | 10/2015 | Kwon et al. |
| 2015/0303412 A1 | 10/2015 | Lee |
| 2015/0303414 A1 | 10/2015 | Park et al. |
| 2015/0364741 A1 | 12/2015 | Kwon et al. |
| 2016/0028110 A1 | 1/2016 | Yu et al. |
| 2016/0056425 A1 | 2/2016 | Kim et al. |
| 2016/0056427 A1 | 2/2016 | Kim et al. |
| 2016/0072160 A1 | 3/2016 | Hwang |
| 2016/0093919 A1 | 3/2016 | Yoshida et al. |
| 2016/0133916 A1 | 5/2016 | Zagars et al. |
| 2016/0156004 A1 | 6/2016 | Kim et al. |
| 2016/0156018 A1 | 6/2016 | Kim |
| 2016/0211493 A1 | 7/2016 | Kim et al. |
| 2016/0233470 A1 | 8/2016 | Kim et al. |
| 2016/0276635 A1 | 9/2016 | Ju et al. |
| 2016/0315301 A1 | 10/2016 | Kim et al. |
| 2016/0315326 A1 | 10/2016 | Shin et al. |
| 2016/0317305 A1 | 11/2016 | Pelled et al. |
| 2017/0047563 A1 | 2/2017 | Lee et al. |
| 2017/0077545 A1 | 3/2017 | Shaffer, II et al. |
| 2017/0162901 A1 | 6/2017 | Chen et al. |
| 2017/0214105 A1 | 7/2017 | Oh et al. |
| 2017/0288198 A1 | 10/2017 | Schmiedhofer |
| 2017/0288232 A1 | 10/2017 | Herle |
| 2017/0309943 A1 | 10/2017 | Angell et al. |
| 2017/0373346 A1 | 12/2017 | Asano |
| 2018/0090949 A1 | 3/2018 | Lim et al. |
| 2018/0138470 A1 | 5/2018 | Park et al. |
| 2018/0205112 A1 | 7/2018 | Thomas-Alyea et al. |
| 2018/0219261 A1 | 8/2018 | Drews et al. |
| 2018/0248160 A1 | 8/2018 | Lee |
| 2018/0261887 A1 | 9/2018 | Idikurt et al. |
| 2019/0173065 A1 | 6/2019 | Millon |
| 2019/0190068 A1 | 6/2019 | Lee et al. |
| 2019/0221881 A1 | 7/2019 | You et al. |
| 2019/0372083 A1 | 12/2019 | Ryu et al. |
| 2019/0386353 A1 | 12/2019 | Jang et al. |
| 2020/0006779 A1 | 1/2020 | Lee et al. |
| 2020/0020995 A1 | 1/2020 | Kim |
| 2020/0038698 A1 | 2/2020 | Ryu et al. |
| 2020/0099034 A1 | 3/2020 | Jin et al. |
| 2020/0119329 A1 | 4/2020 | Hong et al. |
| 2020/0153030 A1 | 5/2020 | Bae et al. |
| 2020/0295313 A1 | 9/2020 | Chung et al. |
| 2020/0321604 A1 | 10/2020 | Koenig, Jr. et al. |
| 2021/0036295 A1 | 2/2021 | Park et al. |
| 2021/0083342 A1 | 3/2021 | Ryu et al. |
| 2021/0129684 A1 | 5/2021 | Wuensche et al. |
| 2021/0135292 A1 | 5/2021 | Holme et al. |
| 2021/0242446 A1 | 8/2021 | Jin et al. |
| 2021/0249733 A1 | 8/2021 | Kim et al. |
| 2021/0265672 A1 | 8/2021 | Lettner et al. |
| 2021/0273291 A1 | 9/2021 | Gardner et al. |

FOREIGN PATENT DOCUMENTS

| | | |
|---|---|---|
| EP | 1717882 | 11/2006 |
| EP | 2068419 | 6/2009 |
| EP | 2178134 | 4/2010 |
| EP | 2207222 | 7/2010 |
| EP | 2284931 | 2/2011 |
| EP | 2328210 | 6/2011 |
| EP | 2405507 | 1/2012 |
| EP | 2573852 | 3/2013 |
| EP | 3196975 | 7/2017 |

(56) References Cited

FOREIGN PATENT DOCUMENTS

| | | |
|---|---|---|
| EP | 3226342 | 10/2017 |
| EP | 3346517 | 7/2018 |
| EP | 3540812 | 9/2019 |
| EP | 3540845 | 9/2019 |
| EP | 3872889 | 9/2021 |
| EP | 3883007 | 9/2021 |
| EP | 3886202 | 9/2021 |
| JP | 10214638 A | 8/1998 |
| KR | 20140144787 A | 12/2014 |
| WO | WO 2013/065945 | 5/2013 |
| WO | WO 2016/044324 A1 | 3/2016 |
| WO | WO 2016/152565 A1 | 9/2016 |
| WO | WO 2018/135862 | 7/2018 |

OTHER PUBLICATIONS

International search report and written opinion of PCT/US2022/044883 dated Mar. 30, 2023; 18 pages.

Ding et al., "Dendrite-Free Lithium Deposition via Self-Healing Electrostatic Shield Mechanism", J. Am. Chem. Soc., 2013, vol. 135, pp. 4450-4456, dx.doi.org/10.1021/ja312241y.

Louli et al., "Diagnosing and correcting anode-free cell failure via electrolyte and morphological analysis", Nature Energy, https://doi.org/10.1038/s41560-020-0668-8; 10 pages.

Niu et al., "High-energy lithium metal pouch cells with limited anode swelling and long stable cycles", Nature Energy, Jul. 2019, vol. 4, pp. 551-559, https://doi.org/10.1038/s41560-019-0390-6.

Zhu et al., "Design principles for self-forming interfaces enabling stable lithium-metal anodes", PNAS Latest Articles, www.pnas.org/cgi/doi/10.1073/pnas.2001923117; 9 pages.

L.B. Kong et al., Chapter 2, Transparent Ceramics, Topics in Mining, Metallurgy and Materials Engineering, DOI 10.1007/978-3-319-18956-7_2; pp. 29-90.

Taylor et al., "Characterizing the Stability and Kinetics of Hybrid Oxide-Sulfide Solid Electrolyte Cells", IOPscience, 2016, Meet. Abstr: MA2016-01, 264; https://doi.org/10.1149/MA2016-01/2/264.

Will et al., "Fabrication of thin electrolytes for second-generation solid oxide fuel cells," Solid State Ionics, 2000, vol. 131, pp. 79-96.

\* cited by examiner

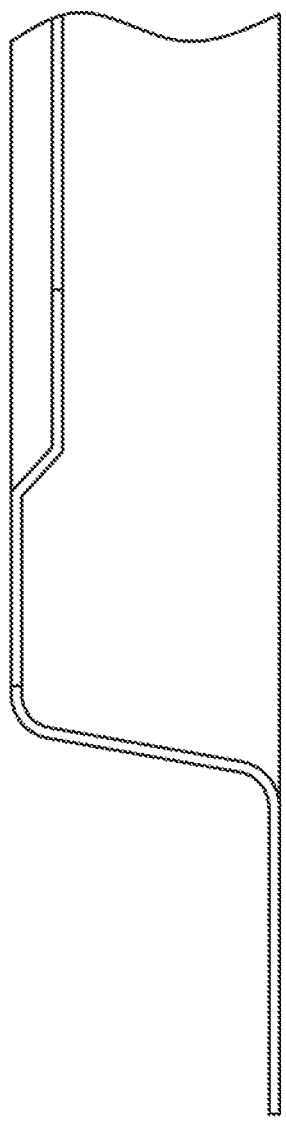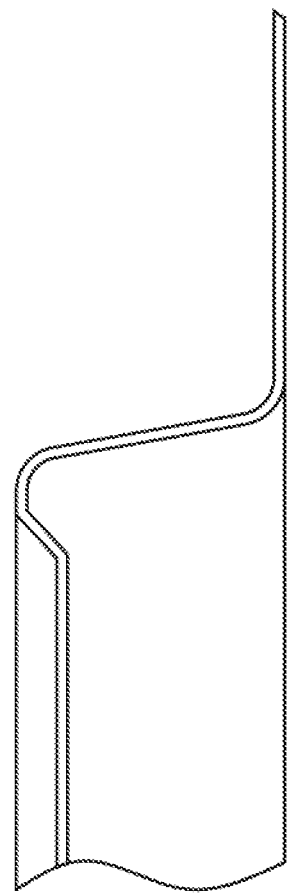
FIG. 4J
FIG. 4K

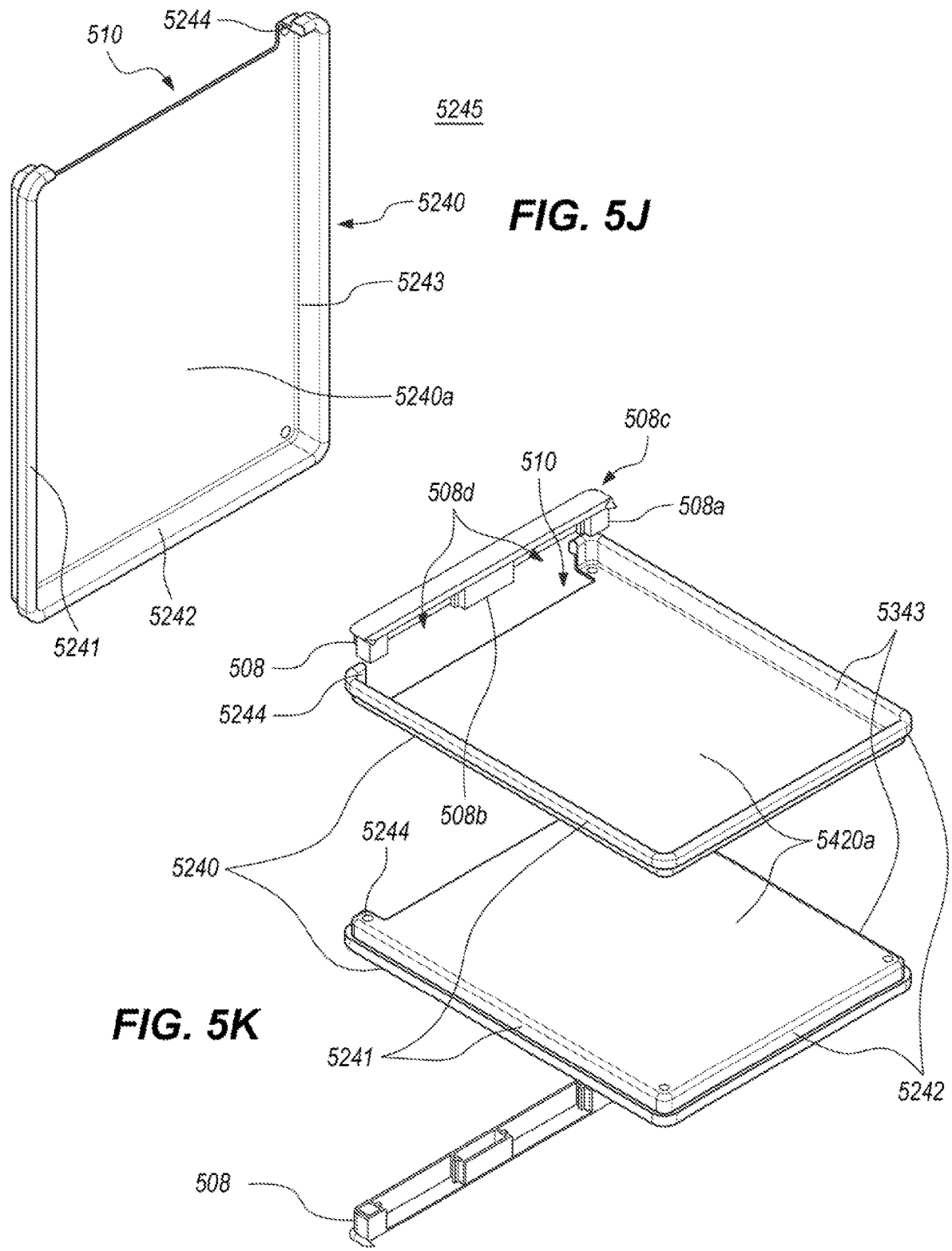

2

ELECTROCHEMICAL STACK AND METHOD OF ASSEMBLY THEREOF

CROSS-REFERENCE TO RELATED APPLICATIONS

The present application is a continuation of International Application Number PCT/US2022/44883, filed Sep. 27, 2022. The international application claims priority from U.S. Provisional Application Nos. 63/261,727, filed Sep. 27, 2021; 63/299,700, filed Jan. 14, 2022; 63/313,051, filed Feb. 23, 2022; 63/334,635, filed Apr. 25, 2022; and 63/392,093, filed Jul. 25, 2022. The present application incorporates all of these applications by reference in their entirety.

FIELD

The present application relates to enclosures for rechargeable batteries, particularly solid-state lithium batteries.

BACKGROUND

Solid-state lithium batteries have a number of advantages over conventional lithium batteries that rely solely on liquid-based electrolytes. However, solids by their very nature are less deformable than liquids, making packaging solid-state lithium batteries more challenging.

One challenge associated with packaging solid-state lithium batteries is that the batteries expand and contract during charge and discharge cycles. It would be desirable to provide packaging that accommodates this expansion and contraction without adversely affecting battery performance.

SUMMARY

In some examples, set forth herein is an electrochemical stack assembly. Generally, an electrochemical stack assembly includes at least one electrochemical stack, a frame, and a laminated pouch. In some examples, an electrochemical stack includes at least one or more electrochemical cells, each electrochemical cell including a solid-state electrolyte. The resulting electrochemical stack will have two major surfaces and four minor surfaces. The frame will surround the at least one electrochemical stack, and will not contact the four minor surfaces of the at least one electrochemical stack. In some examples, including in use, the laminated pouch will contain the frame and the at least one electrochemical stack, and will contact one or both major surfaces.

Throughout this specification, the terms "electrochemical stack assembly," "laminate over frame assembly," and "prismatic-frame-in-pouch" may be used to describe various embodiments and/or examples described herein. These terms may be used interchangeably to refer to the same structure.

BRIEF DESCRIPTION OF THE DRAWINGS

FIGS. 4J and 4K are schematic views of a formed portion of a laminated pouch according to an embodiment.

FIG. 5J is a view of a frame portion for containing an electrochemical stack according to an embodiment, and FIG. 5K is an exploded view of a frame assembly for containing an electrochemical stack according to an embodiment.

DETAILED DESCRIPTION

Figure 1:
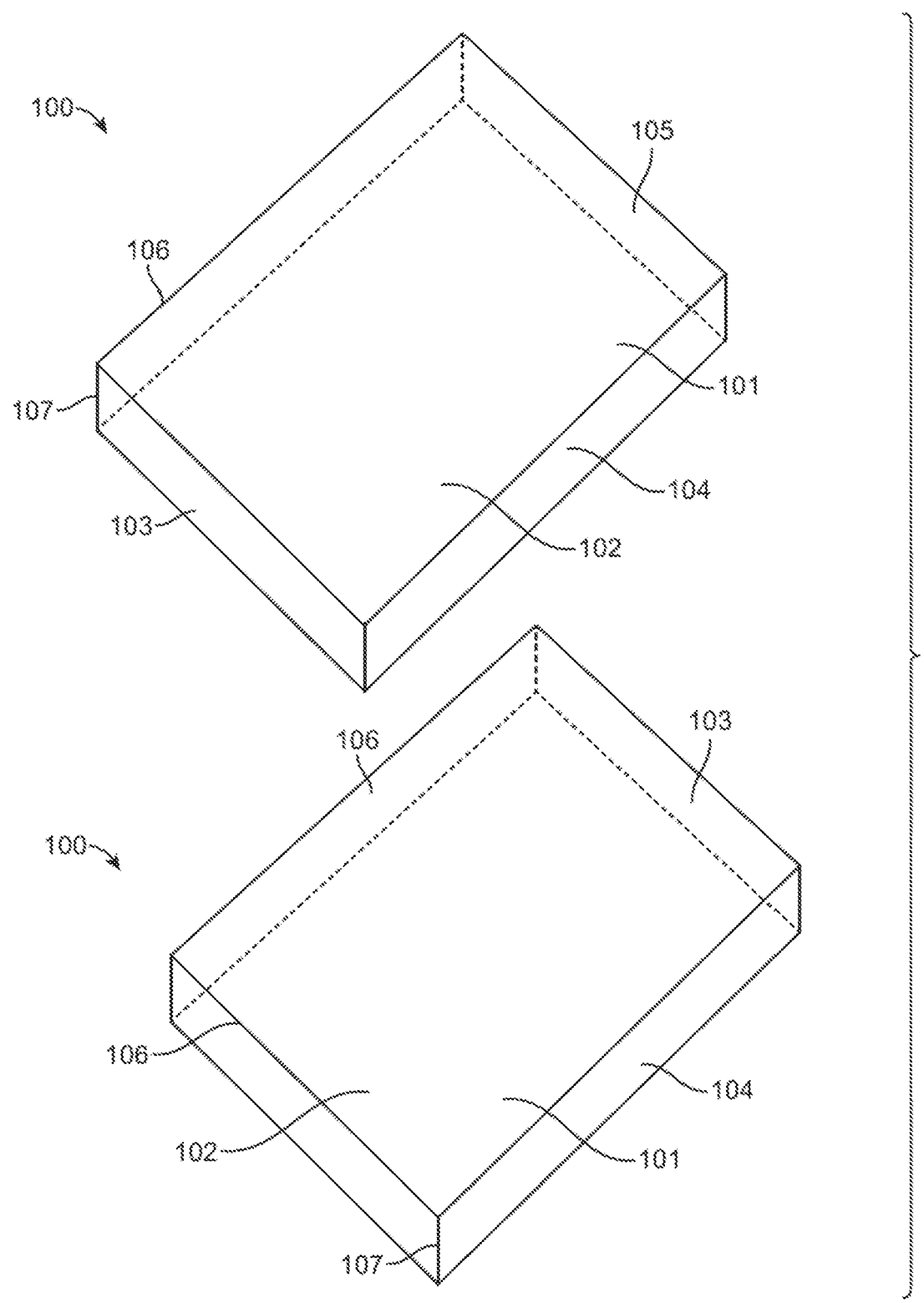
FIG. 1 is a diagram of elements of a rectangular shaped electrochemical stack that includes electrochemical cells, wherein each electrochemical cell includes a solid-state electrolyte.

The following sets forth various embodiments of a frame structure that holds a laminated pouch away from edges of an electrochemical stack (edges also being referred to herein as edge-surfaces or minor surfaces) to protect the edges, while allowing pressure where desired on top and bottom major surfaces of the electrochemical stack where it is desired. When sealed under vacuum, a laminated pouch will exert pressure on a cell stack. The frame provides structure to protect the cell stack. The frame also provides space and protection for expansion of cells in the electrochemical stack during charge and discharge cycles. In an embodiment, the laminated pouch is an encapsulating laminated pouch. In an embodiment, the laminated pouch is a pre-formed laminated pouch. Accordingly, the term "laminated pouch" as used herein may include an encapsulating laminated pouch and/or a pre-formed laminated pouch.

An electrochemical stack (sometimes referred to herein as a stack, or a cell stack, or an electrochemical cell stack) comprises a series of solid-state electrochemical cells layered on top of each other. It is important to protect cell stacks from exposure to water and oxygen. Accordingly, the stack is sealed under vacuum in cans, pouches, and other types of sealed housings. When sealed under vacuum, pouches exert a pressure on the cell stack. In an embodiment, this pressure is atmospheric pressure, unopposed by pressure inside the pouch. When the pressure on the cell stack is not evenly distributed, the solid-state electrolyte within each of the one or more cells within the stack may be damaged through deforming, cracking, or breaking.

To address these damage issues and other issues associated with packaging solid-state electrochemical cells, frame structures described herein allow a laminate pouch to seal an electrochemical stack, with pressure being applied only to the major surfaces of the electrochemical stack, and not to the edges or minor surfaces of the electrochemical stack. This type of structure allows application of pressure vertically (in the z-direction) to the major surfaces of the electrochemical stack. This application of pressure, leaving room around the edges or minor surfaces of the electrochemical stack, prevents or reduces pressure applied on the edges or minor surfaces of the electrochemical stack (in the x-direction or the y-direction).

The following description enables one of ordinary skill in the art to make and use the disclosed subject matter and to incorporate that subject matter in a number of applications. Various modifications, as well as a variety of uses in different applications, will be readily apparent to ordinarily skilled artisans. The general principles described herein may be applied to a wide range of embodiments. Thus, the present disclosure is not intended to be limited to the embodiments presented, but is to be accorded the widest scope consistent with the principles and novel features disclosed herein.

In the following detailed description, numerous specific details are set forth in order to provide a more thorough understanding of the disclosed structures and techniques. However, it will be apparent to ordinarily skilled artisans that they can practice these disclosed structures and techniques without necessarily being limited to these specific details. In other instances, well-known structures and devices are shown in block diagram form, rather than in detail, in order to avoid obscuring the present disclosure.

Definitions

As used herein, the term "about," when qualifying a number, e.g., about 15 weight percent (% w/w), refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well as 67° C., 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. For example, a member selected from the group consisting of A, B, and C can include A only, B only, or C only, as well as A and B, A and C, B and C, as well as A, B, and C.

As used herein, the phrases "electrochemical cell" or "battery cell" shall, unless specified to the contrary, mean a single cell including a positive electrode and a negative electrode, which have ionic communication with each other by way of an electrolyte or ion. In some embodiments, a battery or module may include multiple positive electrodes and/or multiple negative electrodes enclosed in one container or otherwise put together one on top of another, e.g., a stack of electrochemical cells. A stack of electrochemical cells may be referred to as a multi-layered cell. A symmetric cell may be a cell having two Li metal anodes separated by a solid-state electrolyte.

As used herein, the phrase "electrochemical stack" refers to one or more units, each of which includes at least a negative electrode (e.g., Li, $LiC_6$), a positive electrode (e.g., $FeF_3$, $NiF_x$ wherein x is 2 or 3, nickel-cobalt aluminum oxide (NCA), lithium iron phosphate (LFP), $LiNi_xMn_yCo_zO_2$, [NMC] or $LiNi_xAl_yCo_zO_2$ [NCA], wherein x+y+z=1; and wherein $0 \leq x \leq 1$; $0 \leq y \leq 1$; and $0 \leq z \leq 1$), optionally combined with a solid-state electrolyte or a gel electrolyte), and a solid-state electrolyte (e.g., an oxide electrolyte set forth herein such as a lithium-stuffed garnet (e.g., $Li_7La_3Zr_2O_{12}$)) between and in contact with the positive and negative electrodes. In some examples, between the solid-state electrolyte and the positive electrode, there is an additional layer comprising a compliant electrolyte (e.g., gel electrolyte, gel polymer electrolyte). An electrochemical stack may include one of these aforementioned units. An electrochemical stack may include several of these aforementioned units arranged in electrical communication (e.g., serial or parallel electrical connection). In some examples, when the electrochemical stack includes several units, the units may be layered, laminated together, or otherwise adhered to each other, in a column. In some examples, when the electrochemical stack includes several units, the units may be layered, laminated together, or otherwise adhered to each other in an array. In some examples, when the electrochemical stack includes several units, the stack may be arranged such that one negative electrode current collector is shared with two or more positive electrodes. Alternatively, in some examples, when the electrochemical stack includes several units, the stack may be arranged such that one positive electrode current collector is shared with two or more negative electrodes. Where appropriate or necessary, adhesives or other bonding materials may be provided among the various layers in a stack. Optionally or additionally, when cells are provided together to form a stack, the cells simply may be set one on top of another, or alternatively one or more of the cells may be adhered to one or both immediately adjacent cells.

As used herein, the phrase "positive electrode" refers to the electrode in a secondary battery towards which positive ions, e.g., $Li^+$, conduct, flow, or move during discharge of the battery. As used herein, the phrase "negative electrode" refers to the electrode in a secondary battery from which positive ions, e.g., $Li^+$ flow, or move during discharge of the battery. In a battery comprised of a Li-metal electrode and a conversion chemistry, intercalation chemistry, or combination of conversion/intercalation chemistry-including electrode, the electrode having the conversion chemistry, intercalation chemistry, or combination of conversion/intercalation chemistry material is referred to as the positive electrode. In some usage, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein, the phrase "positive electrode terminal" refers to an electrical connection to the positive electrode. A positive electrode terminal may also be referred to as a positive electrode current collector.

As used herein, the phrase "negative electrode terminal" refers to an electrical connection to the negative electrode. A negative electrode terminal may also be referred to as a negative electrode current collector.

As used herein, the phrase "cathode active material" refers to a material which can intercalate lithium ions or react with lithium ions in a reversible manner. Examples include $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, x+y+z=1, 0≤x≤1, 0≤y≤1, and 0≤z≤1; and $LiNi_xCo_yAl_zO_2$, wherein x+y+z=1, and 0≤x≤1, 0≤y≤1, and 0≤z≤1. In these formula, x, y, and z are chosen so that the formula is charge neutral.

As used herein, the phrase "solid-state cathode" refers to a cathode that does not include a liquid-phase electrolyte. As used herein, the terms "cathode" and "anode" refer to the electrodes of a battery. The cathode and anode are often referred to in the relevant field as the positive electrode and negative electrode, respectively.

As used herein, the phrase "solid-state catholyte" or the term "catholyte" refers to an ion conductor that is intimately mixed with, or surrounded by, a cathode (i.e., positive electrode) active material.

As used herein, the term "electrolyte" refers to a material that allows ions, e.g., $Li^+$, to migrate therethrough, but which does not allow electrons to conduct therethrough. Electrolytes are useful for electrically insulating the cathode and anode of a secondary battery while allowing ions, e.g., $Li^+$, to transmit through the electrolyte.

As used here, the phrase "solid-state electrolyte separator" is used interchangeably with the phrase "solid separator," and refers to a material which does not include carbon and which conducts atomic ions (e.g., $Li^+$) but does not conduct electrons. A solid-state electrolyte separator is a solid material suitable for electrically isolating the positive and negative electrodes of a lithium secondary battery while also providing a conduction pathway for lithium ions. Examples of solid-state electrolytes include oxide electrolytes and sulfide electrolytes, which are further defined below. Non-limiting examples of sulfide electrolytes are found, for example, in U.S. Pat. No. 9,172,114, which issued Oct. 27, 2015, and also in US Patent Application Publication No. 2017-0162901 A1, which published Jun. 8, 2017. Non-limiting examples of oxide electrolytes are found, for example, in US Patent Application Publication No. 2015-0200420 A1, which published Jul. 16, 2015, and issued as U.S. Pat. No. 9,806,372 on Oct. 31, 2017. In some examples, the inorganic solid-state electrolyte also includes a polymer and is referred to as a composite electrolyte. Composite electrolytes are found for example in U.S. Pat. No. 9,666,870. The entire contents of the just-mentioned US patents and published US patent applications are incorporated herein by reference in their entirety for all purposes.

As used herein, the term "separator" is a short-hand reference for $Li^+$ ion-conducting separator, unless explicitly specified otherwise.

Unless explicitly specified to the contrary, a separator as used herein is stable when in contact with lithium metal.

As used herein, the terms "edge surface" or "minor surface" may be used interchangeably to refer to sides of an electrochemical cell stack, a frame, or a prismatic-frame-in-pouch.

As used herein, the term "major surface" may be used interchangeably to refer to a major surface of an electrochemical cell stack, a frame, or a prismatic-frame-in-pouch, in contrast to an "edge surface" or "minor surface," either of which will have substantially less surface area than will a major surface. In some instances, depending on orientation of the electrochemical stack, a major surface may be a top major surface or a bottom major surface. A "top surface" or "top major surface" generally will be opposed to a "bottom surface" or a "bottom major surface".

As used herein, the phrase "thickness" or "film thickness" refers to the distance, or median measured distance between major surfaces of a layer or film. As used herein, the major surfaces refer to the layer or film sides having the largest geometric surface area.

As used herein, "thin" means, when qualifying a solid-state electrolyte, a thickness dimension less than 200 μm, sometimes less than 100 μm and in some cases between 0.1 and 60 μm, and in other cases between about 10 nm to about 100 μm; in other cases about 1 μm, 10 μm, or 50 μm in thickness.

As used herein the phrase "% of z-volume expansion and contraction" refers to the expansion and contraction of a solid-state electrochemical cell having a lithium-metal anode as a consequence of charging and discharging, respectively. During charging, lithium metal plates out at the anode layer in each electrochemical cell and thereby expands each electrochemical cell. This expansion is primarily in the direction transverse to the order in which a cell's cathode, electrolyte, and anode are layered. Herein, the z-direction is a perpendicular line which traverses the cathode, electrolyte and anode. Herein, the x- and y-directions would be contained within the plane of the cathode, the electrolyte, or the anode. During discharging, lithium metal strips away from (leaves) the anode layer in each electrochemical cell and thereby contracts each electrochemical cell. Z-volume expansion and contraction is the direction of this expansion and contraction of each electrochemical cell. The direction is parallel or substantially parallel to a line (referred to elsewhere herein as a z-axis) normal to the top or bottom major surface of the electrochemical stack. For example, if an electrochemical stack was 100 μm thick and in a 0% state-of-charge and was then subjected to a 20% of z-volume expansion and contraction, this would mean that the electrochemical stack would expand by about 20 μm when charged to 100% state-of-charge and then contract by about 20 μm when discharged to 0% state-of-charge. The laminate is shaped in such a way that it can accommodate cell expansion between 0 and 20% of the thickness of the electrochemical cell and then return to its original shape during discharge.

As used herein, the phrase "laminate conforms around the frame" refers to the pliability of the laminated pouch to surround and encapsulate the frame without a significant amount of space being present between the laminate and the frame where the laminate does not contact the frame. In some examples, the laminate will be in intimate contact with the frame, particularly when the pouch is under vacuum.

As used herein, the phrase "pre-formed shape of the laminated pouch" means a shape made in the laminate. In some examples, the laminate is manufactured from a flat sheet form which is placed in a pneumatic press. A die and a cavity are used to transform the flat sheet into a pre-formed shape. This includes debossing the form to raise part of the laminate up and away from the laminate surface, as well as embossing the form to push part of the laminate down and away from the laminate surface. In some examples, a combination of deboss and emboss is used to form the shape in the laminate. By forming a shape in the laminate, the laminate does not need to deform much, if at all, against the top or bottom major surface of the electrochemical stack. When vacuum is applied, the atmosphere will push the sealed laminate onto the frame and the cell stack, and will take the shape of the frame and the cell stack. In some examples, the laminate is formed into the shape of the electrochemical stack at 0% state-of-charge. The laminate is thus pre-stressed during its manufacture so no stress is concentrated on the electrochemical stack when the laminate is stretched over the frame. As the laminate is pulled over the frame, a draft angle is present as the laminate stretches over the frame. This draft angle, is part, provides space between the laminate and the electrochemical stack so that the laminate only contacts the top or bottom major surfaces of the electrochemical stack. When a vacuum is pulled on the sealed laminate, the draft angles collapse against the frame but not against the minor surfaces of the electrochemical stack. After pulling a vacuum in the sealed laminate, the pre-formed portion of the laminate will take the shape of the frame.

As used herein, the phrases "top major surface" and "bottom major surface" refer to a particular orientation of a laminated pouch, a frame, an electrochemical cell, and/or an electrochemical stack. Such orientation may be shown in one or more of the Figures herein. Ordinarily skilled artisans will appreciate that orientation of the just-mentioned elements, or indeed of the resulting electrochemical stack assembly, module, or pack, is relative.

As used herein, the phrase "geometric surface area" is the length multiplied by the width of the area of the surface considered, and assuming flat surfaces.

As used herein, the phrase "lithium stuffed garnet" refers to oxides that are characterized by a crystal structure related to a garnet crystal structure. U.S. Patent Application Publication No. U.S. 2015/0099190, which published Apr. 9, 2015 and was filed Oct. 7, 2014 as Ser. No. 14/509,029, is incorporated by reference herein in its entirety for all purposes. This application describes Li-stuffed garnet solid-state electrolytes used in solid-state lithium rechargeable batteries.

Unless stated otherwise to the contrary, lithium-stuffed garnets include compounds having the formula $Li_A La_B M'_C M''_D Zr_E O_F$, $Li_A La_B M'_C M''_D Ta_E O_F$, or $Li_A La_B M'_C M''_D Nb_E O_F$, wherein $4<A<8.5$, $1.5<B<4$, $0\leq C\leq 2$, $0\leq D\leq 2$; $0\leq E\leq 2$, $10<F<13$, and M' and M'' are each, independently in each instance selected from Al, Mo, W, Nb, Sb, Ca, Ba, Sr, Ce, Hf, Rb, or Ta, or $Li_a La_b Zr_c Al_d Me''_e O_f$, wherein $5<a<7.7$; $2<b<4$; $0\leq c\leq 2.5$; $0\leq d\leq 2$; $0\leq e\leq 2$, $10<f<13$ and Me'' is a metal selected from Nb, Ta, V, W, Mo, Ga, or Sb and as described herein.

Li-stuffed garnets may also be a composition according to $Li_A La_B M'_C M''_D Zr_E O_F$, $Li_A La_B M'_C M''_D Ta_E O_F$, or $Li_A La_B M'_C M''_D Nb_E O_F$, wherein $4<A<8.5$, $1.5<B<4$, $0\leq C\leq 2$, $0\leq D\leq 2$; $0\leq E\leq 3$, $10<F<13$, and M' and M'' are each, independently in each instance selected from Ga, Al, Mo, W, Nb, Sb, Ca, Ba, Sr, Ce, Hf, Rb, or Ta, or $Li_a La_b Zr_c Al_d Me''_e O_f$, wherein $5<a<8.5$; $2<b<4$; $0<c\leq 2.5$; $0\leq d<2$; $0\leq e<2$, and $10<f<13$ and Me'' is a metal selected from Ga, Nb, Ta, V, W, Mo, or Sb and as otherwise described in U.S. Patent Application Publication No. U.S. 2015/0099190. As used herein, lithium-stuffed garnets, and garnets, generally, include, but are not limited to, $Li_{7.0}La_3(Zr_{t1}+Nb_{t2}+Ta_{t3})O_{12}+0.35Al_{12}O_3$; wherein $(t1+t2+t3=2)$ so that the La:(Zr/Nb/Ta) ratio is 3:2. Also, garnets used herein include, but are not limited to, $Li_xLa_3Zr_2O_F+yAl_2O_3$, wherein x ranges from 5.5 to 9; and y ranges from 0.05 to 1. In these examples, subscripts x, y, and F are selected so that the garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_xLa_3Zr_2O_{12}+yAl_2O_3$. In one embodiment, the Li-stuffed garnet herein has a composition of $Li_7Li_3Zr_2O_{12}$. In another embodiment, the Li-stuffed garnet herein has a composition of $Li_7Li_3Zr_2O_{12}.Al_2O_3$. In yet another embodiment, the Li-stuffed garnet herein has a composition of $Li_7Li_3Zr_2O_{12}.0.22Al_2O_3$. In yet another embodiment, the Li-stuffed garnet herein has a composition of $Li_7Li_3Zr_2O_{12}.0.35Al_2O_3$. In certain other embodiments, the Li-stuffed garnet herein has a composition of $Li_7Li_3Zr_2O_{12}.0.5Al_2O_3$. In another embodiment, the Li-stuffed garnet herein has a composition of $Li_7Li_3Zr_2O_{12}.0.75Al_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

Electrochemical Stacks in Pouches

In some examples herein, an electrochemical stack includes at least one or more electrochemical cells, each electrochemical cell including a solid-state electrolyte. In these examples, the electrochemical stack has a two major surfaces and four minor surfaces. A laminated pouch is in contact with one or both major surfaces. A frame is contained within the laminated pouch and surrounds the at least one electrochemical stack. The frame does not contact the four minor surfaces.

In some examples herein, a laminate over frame assembly comprises at least one electrochemical cell which in turn includes at least one positive electrode terminal and at least one negative electrode terminal to form at least one electrochemical stack having two major surfaces and four minor surfaces; a laminated pouch; and a frame contained within the laminated pouch and surrounding the at least one electrochemical stack; wherein: the frame does not contact the four minor surfaces; and the laminated pouch contacts both major surfaces.

In some examples herein, a laminate over frame assembly comprises at least one electrochemical stack which in turn comprises at least one or more electrochemical cells, each electrochemical cell comprising: at least one positive electrode terminal and at least one negative electrode terminal; and a solid-state electrolyte and having two major surfaces and four minor surfaces; a laminated pouch; and a frame contained within the laminated pouch and surrounding the at least one electrochemical stack; wherein: the frame does not contact the four minor surfaces; and the laminated pouch contacts both major surfaces.

In some examples herein, a laminate over frame assembly comprises at least one electrochemical stack which in turn includes a solid-state electrolyte and at least one positive electrode terminal and at least one negative electrode terminal, and having two major surfaces and four minor surfaces; a laminated pouch; and a frame contained within the laminated pouch and surrounding the at least one electrochemical stack; wherein: the frame does not contact the four minor surfaces; and the laminated pouch contacts both major surfaces.

In some examples herein, a laminate over frame assembly comprises at least one electrochemical cell which in turn includes at least one solid-state electrolyte, at least one positive electrode terminal, and at least one negative electrode terminal and having two major surfaces and four minor surfaces to form at least one electrochemical stack; a laminated pouch; and a frame contained within the laminated pouch and surrounding the at least one electrochemical stack; wherein: the frame does not contact the four minor surfaces; and the laminated pouch contacts both major surfaces.

In some examples, including any of the foregoing, the frame is adhered to either major surface of the electrochemical stack.

In some examples, including any of the foregoing, the frame is adhered to either major surface of the electrochemical stack with a pressure sensitive adhesive.

In some examples, including any of the foregoing, there are a first electrochemical stack and a second electrochemical stack, wherein a thermally conductive center wall separates the first electrochemical stack from the second electrochemical stack.

In some examples, including any of the foregoing, the second electrochemical stack is the same as the first electrochemical stack. In some examples, the second electrochemical stack may have a different number of electrochemical cells, a different type of electrochemical cell, or a different size of electrochemical cells, compared with the first electrochemical stack.

In some examples, including any of the foregoing, the electrochemical stack further includes at least one positive electrode terminal and at least one negative electrode terminal.

In some examples, including any of the foregoing, the frame is at a negative electrical potential relative to lithium metal, which in a lithium metal battery will have zero voltage.

In some examples, including any of the foregoing, the frame is at a positive electrical potential relative to lithium metal, which in a lithium metal battery will have zero voltage.

In some examples, including any of the foregoing, the frame is insulated.

In some examples, including any of the foregoing, the frame comprises anodized aluminum. In some examples, the frame comprises glass, such as tempered glass. In some examples, the frame comprises plastic, including plastic with thermal additives.

In some examples, including any of the foregoing, the frame prevents the application of force on the four minor surfaces of the electrochemical stack.

In some examples, including any of the foregoing, the laminated pouch is under vacuum and the frame prevents the application of atmospheric pressure on the four minor surfaces of the electrochemical stack.

Looking now at embodiments of the present invention with reference to the drawings, FIG. 1 shows a top view and a bottom view of a rectangularly-shaped electrochemical stack 100 that includes electrochemical cells (not shown separately), each electrochemical cell including a solid-state electrolyte. The views are not necessarily to scale, and are not high resolution. The top view shows top major surface 101 and bottom major surface 102, as well as edges or sides or minor surfaces 103, 104, 105, and 106. The bottom view shows the top major surface 101 and bottom major surface 102 flipped, and also shows edges or sides 103 and 105 flipped. The electrochemical stack has a thickness 107. In an embodiment, the electrochemical stack fits within a frame, to be described further herein, which is sized or dimensioned to prevent laminate from contacting the edges or minor surfaces of the electrochemical stack when vacuum is applied. The frame provides space around the electrochemical stack so that there is no physical interference with the electrochemical stack during charge and discharge.

In certain examples, including any of the foregoing, the top major surface 101 and/or the bottom major surface 102 of the electrochemical stack is attached to a surface on the frame by way of a pressure-sensitive adhesive (PSA) material. In different embodiments, PSA materials are found in 3M adhesives or Avery Dennison adhesives. PSA materials may include an elastomer with a tackifier. This PSA holds either the top major surface 101 or bottom major surface 102 of the stack to a surface of the frame, to keep the stack from moving within the frame during charging and discharging. In some embodiments, the PSA keeps the minor surfaces of the electrochemical stack from touching the frame. In certain examples, top major surface 101 is bonded to the frame at a center wall, to be described herein. In certain examples, bottom major surface 102 is bonded to the frame at the center wall. The center wall may be referred to as a center plane, center plate, or bonding plate (bonding plate denoting the adherence of the stack to the plate in certain embodiments). Movement of the stack within the frame may be assessed by vibration testing using a simulated mass. Where there is little or no movement, there will be little or no change in location of the mass with respect to the center plane.

In some examples, including any of the foregoing, the amount of clearance between the frame and the minor surfaces of the electrochemical stack is at least 0.5 mm. In certain applications, the clearance may be larger or smaller. In some other examples, the amount of clearance between the frame and the minor surfaces of the electrochemical stack is at least 0.4 mm. In yet other examples, the amount of clearance between the frame and the minor surfaces of the electrochemical stack is at least 0.3 mm. In still further examples, the amount of clearance between the frame and the minor surfaces of the electrochemical stack is at least 0.2 mm. In yet further examples, the amount of clearance between the frame and the minor surfaces of the electrochemical stack is at least 0.1 mm.

In some examples, including any of the foregoing, the electrochemical stack has a rectangular shape with two major surfaces, having the highest geometric surface area. At about 90° angles to the major surfaces are four minor surfaces, each of which has a geometric surface area less than the geometric surface area of either of the major surfaces. In some examples, including any of the foregoing, the angle between the major surfaces and the minor surfaces may be close to, but not exactly 90°, depending on how the solid-state electrolyte is formed. For example, one or more of the edges of the solid-state electrolyte may be rounded slightly. In these examples, two of the four minor surfaces will have a smaller area than the other two of the four minor surfaces.

In some examples, including any of the foregoing, the electrochemical stack has a square shape with two major surfaces, having the highest geometric surface area. At about 90° angles to the major surfaces are four minor surfaces, each of which has a geometric surface area less than the geometric surface area of either of the major surfaces. In some examples, including any of the foregoing, the angle between the major surfaces and the minor surfaces may be close to, but not exactly 90°, depending on how the solid-state electrolyte is formed. For example, one or more of the edges of the solid-state electrolyte may be rounded slightly. In these examples, the four minor surfaces will have approximately equal surface areas.

In some examples, including any of the foregoing, the solid-state electrolyte has a rectangular shape with two major surfaces, having the highest geometric surface area. In some examples, including any of the foregoing, at about 90° angles to the major surfaces are four minor surfaces, each of which has a geometric surface area less than the geometric surface area of either of the major surfaces. In some examples, including any of the foregoing, the angle between the major surfaces and the minor surfaces may be close to, but not exactly 90°, depending on how the solid-state electrolyte is formed. For example, one or more of the edges of the solid-state electrolyte may be rounded slightly. In these examples, two of the four minor surfaces will have a smaller geometric surface area than the other two of the four minor surfaces.

In some examples, including any of the foregoing, the solid-state electrolyte has a square shape with two major surfaces, having the highest geometric surface area. At about 90° angles to the major surfaces are four minor surfaces, each of which has a geometric surface area less than the geometric surface area of either of the major surfaces. In some examples, including any of the foregoing, the angle between the major surfaces and the minor surfaces may be close to, but not exactly 90°, depending on how the solid-state electrolyte is formed. For example, one or more of the edges of the solid-state electrolyte may be rounded slightly. In these examples, the four minor surfaces will have approximately equal surface areas.

In some examples, including any of the foregoing, the solid-state electrolyte is a thin film with a film thickness of 1 µm-100 µm. In some examples, the solid-state electrolyte is a thin film with a film thickness of 20 µm-100 µm. In some examples, the solid-state electrolyte is a thin film with a film thickness of 40 µm-100 µm. In some examples, the solid-state electrolyte is a thin film with a film thickness of 20 µm-80 µm. In some examples, the solid-state electrolyte is a thin film with a film thickness of 40 µm-80 µm. In some examples, the solid-state electrolyte is a thin film with a film thickness of 20 µm-60 µm. In some examples, the solid-state electrolyte is a thin film with a film thickness of 10 µm-30 µm. In some examples, the solid-state electrolyte is a thin film with a film thickness of 10 µm. In some examples, the solid-state electrolyte is a thin film with a film thickness of 11 µm. In some examples, the solid-state electrolyte is a thin film with a film thickness of 12 µm. In some examples, the solid-state electrolyte is a thin film with a film thickness of 13 µm. In some examples, the solid-state electrolyte is a thin film with a film thickness of 14 µm. In some examples, the solid-state electrolyte is a thin film with a film thickness of 15 µm. In some examples, the solid-state electrolyte is a thin film with a film thickness of 16 µm. In some examples, the solid-state electrolyte is a thin film with a film thickness of 17 µm. In some examples, the solid-state electrolyte is a thin film with a film thickness of 18 µm. In some examples, the solid-state electrolyte is a thin film with a film thickness of 19 µm. In some examples, the solid-state electrolyte is a thin film with a film thickness of 20 µm. In some examples, the solid-state electrolyte is a thin film with a film thickness of 21 µm. In some examples, the solid-state electrolyte is a thin film with a film thickness of 22 µm. In some examples, the solid-state electrolyte is a thin film with a film thickness of 23 µm. In some examples, the solid-state electrolyte is a thin film with a film thickness of 24 µm. In some examples, the solid-state electrolyte is a thin film with a film thickness of 25 µm. In some examples, the solid-state electrolyte is a thin film with a film thickness of 26 µm. In some examples, the solid-state electrolyte is a thin film with a film thickness of 27 µm. In some examples, the solid-state electrolyte is a thin film with a film thickness of 28 µm. In some examples, the solid-state electrolyte is a thin film with a film thickness of 29 µm. In some examples, the solid-state electrolyte is a thin film with a film thickness of 30 µm. In some examples, the solid-state electrolyte is a thin film with a film thickness of 31 µm. In some examples, the solid-state electrolyte is a thin film with a film thickness of 32 µm. In some examples, the solid-state electrolyte is a thin film with a film thickness of 33 µm. In some examples, the solid-state electrolyte is a thin film with a film thickness of 34 µm. In some examples, the solid-state electrolyte is a thin film with a film thickness of 35 µm. In some examples, the solid-state electrolyte is a thin film with a film thickness of 36 µm. In some examples, the solid-state electrolyte is a thin film with a film thickness of 37 µm. In some examples, the solid-state electrolyte is a thin film with a film thickness of 38 µm. In some examples, the solid-state electrolyte is a thin film with a film thickness of 39 µm. In some examples, the solid-state electrolyte is a thin film with a film thickness of 40 µm.

In certain examples, including any of the foregoing, the solid-state electrolyte is a thin film with a film thickness of 10 µm. In certain other examples, the solid-state electrolyte is a thin film with a film thickness of 20 µm. In yet other examples, the solid-state electrolyte is a thin film with a film thickness of 30 µm. In certain examples, the solid-state electrolyte is a thin film with a film thickness of 40 µm. In yet other examples, the solid-state electrolyte is a thin film with a film thickness of 50 µm. In yet other examples, the solid-state electrolyte is a thin film with a film thickness of 60 µm. In yet other examples, the solid-state electrolyte is a thin film with a film thickness of 70 µm. In yet other examples, the solid-state electrolyte is a thin film with a film thickness of 80 µm. In yet other examples, the solid-state electrolyte is a thin film with a film thickness of 90 µm. In yet other examples, the solid-state electrolyte is a thin film with a film thickness of 100 µm.

In some examples, including any of the foregoing, the frame is at a negative electrical potential. For example, the frame may be at the same potential as the anode portion of the electrochemical stack. In certain examples, the frame is electrically connected to the anode (i.e., the negative electrode) of at least one electrochemical cell.

In some examples, including any of the foregoing, the frame is at a positive electrical potential. For example, the frame may be at the same potential as the cathode portion of the electrochemical stack. In certain examples, the frame is electrically connected to the cathode (i.e., the positive electrode) of at least one electrochemical cell.

Figure 2A:
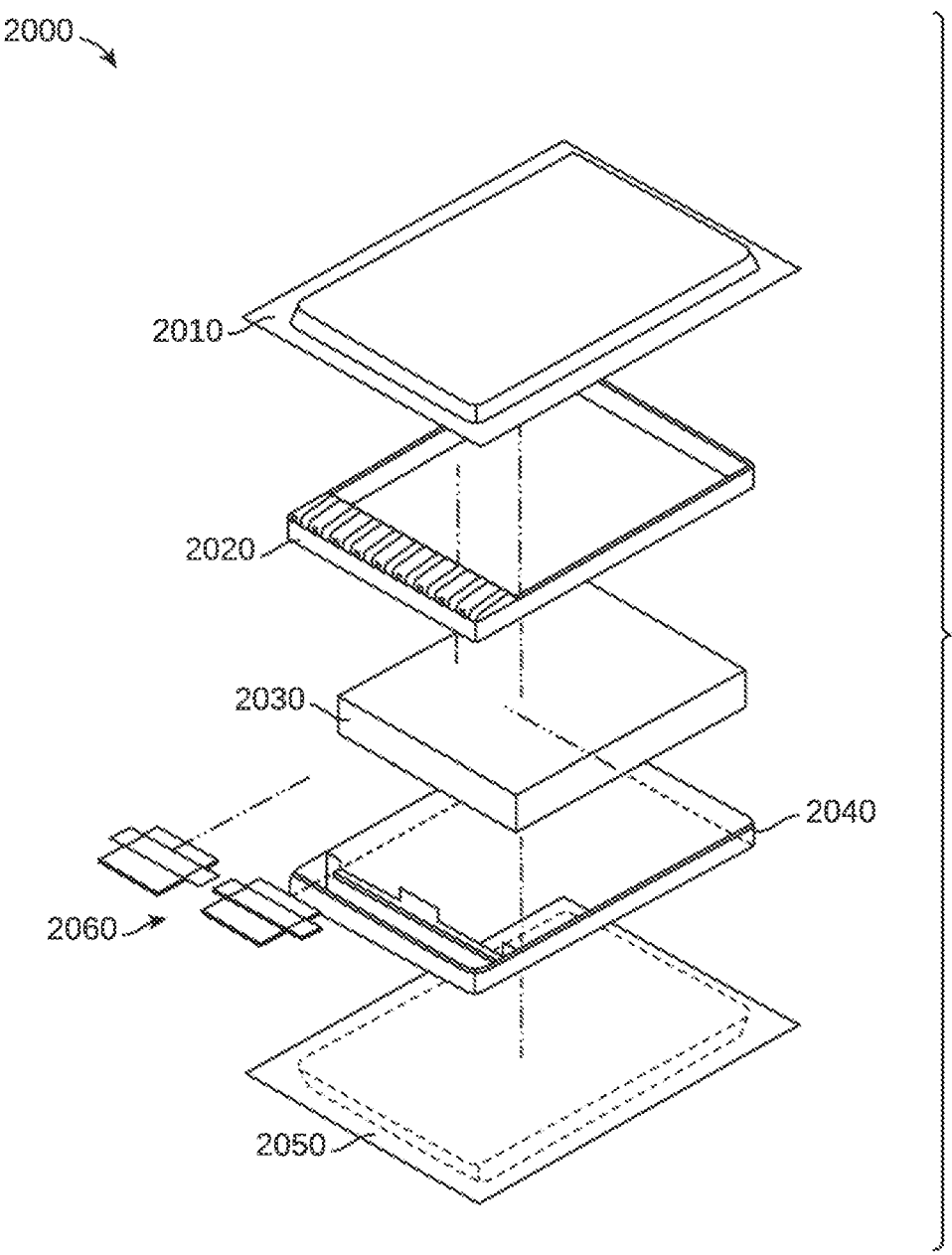
FIGS. 2A-2D are diagrams of a laminated pouch that contains a frame and an electrochemical stack according to an embodiment.
Figure 2B:
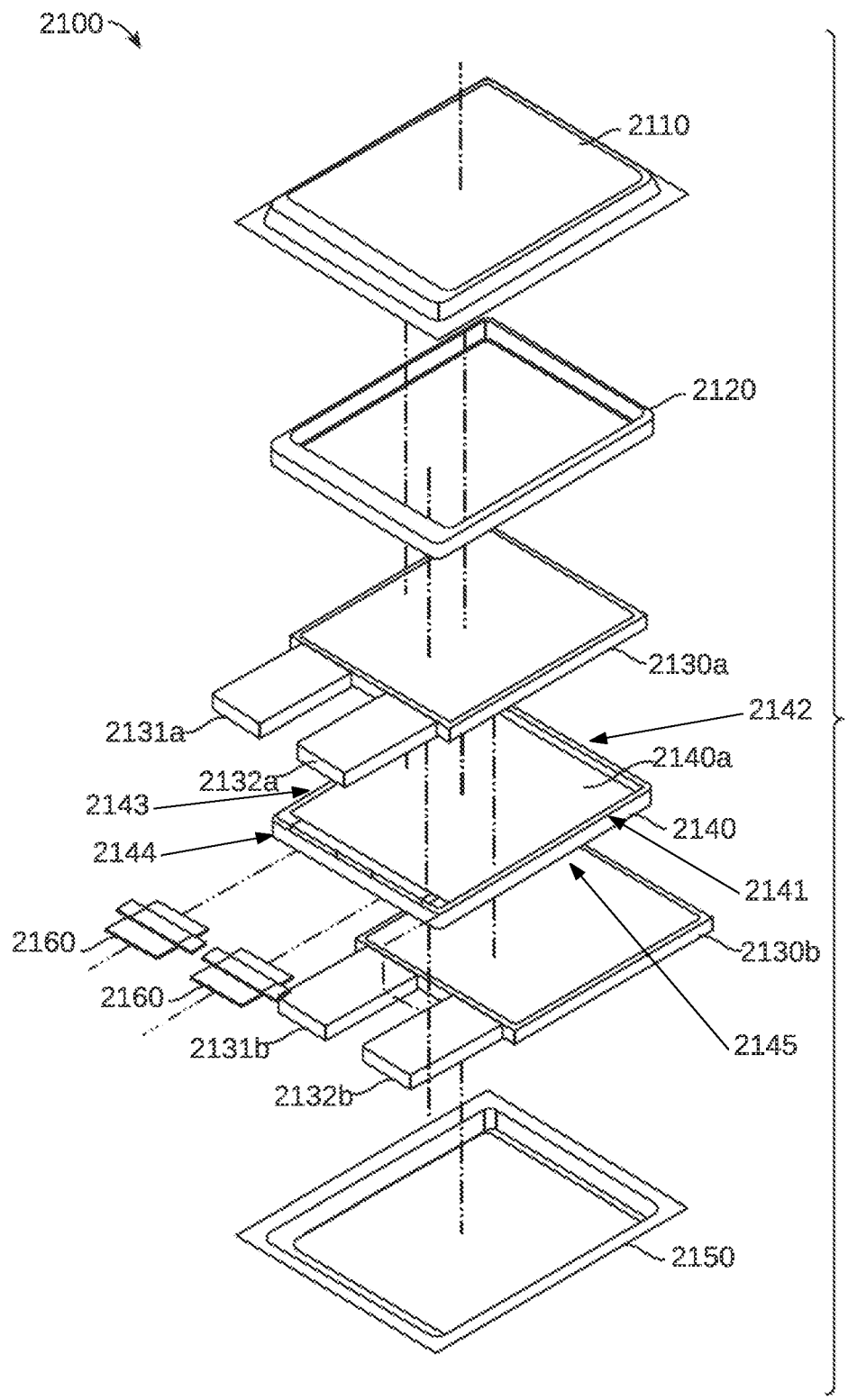
Figure 2C:
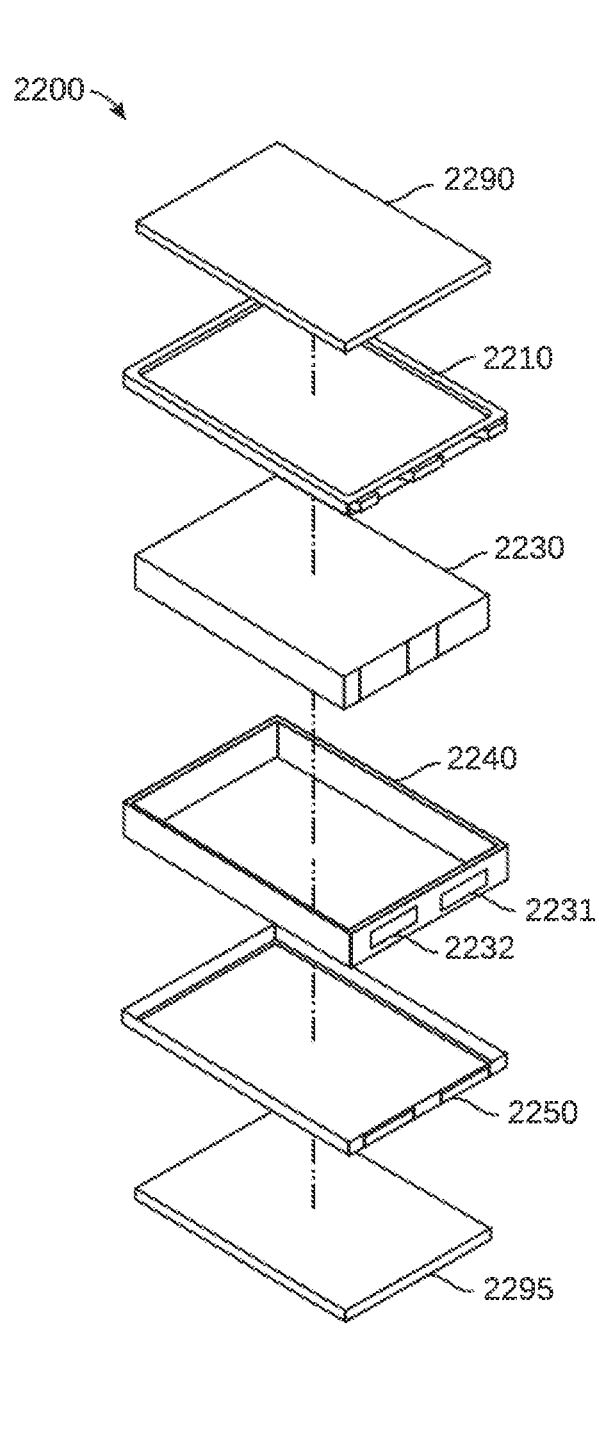

FIGS. 2A-2C are diagrams of an assembly with laminated pouch that contains a frame and an electrochemical stack according to embodiments. This assembly may be referred to variously as an electrochemical stack assembly, a laminate over frame assembly, or a prismatic-frame-in-pouch.

In FIG. 2A, in order from top to bottom, in assembly 2000, a top laminate portion 2010 is disposed over an upper frame portion 2020. An electrochemical stack 2030 fits between upper frame portion 2020 and a lower frame portion 2040. The upper frame portion 2020 and the lower frame portion 2040 are attached to each other to form a frame around the electrochemical stack 2030. The frame surrounds but does not contact the minor surfaces of the electrochemical stack 2030. A bottom laminate portion 2050 is disposed below the lower frame portion 2040. The top laminate portion 2010 and bottom laminate portion 2050 form a laminated pouch (sometimes referred to herein as a pre-formed laminated pouch) which surrounds the assembled frame and the electrochemical stack 2030 contained therein. The top laminate portion 2010 and bottom laminate portion 2050 are sealed together so as to form a seal around the assembled frame and the electrochemical stack 2030 contained therein.

The electrochemical stack 2030 also has terminals (positive and negative electrodes or tabs) 2060 attached respectively to the cathode and anode of the electrochemical stack 2030. The cathode and anode extend through the frame and may contact the frame. In some examples, the terminals 2060 extend through the laminated pouch. In some examples, the terminals 2060 extend through the laminated pouch and form part of the seal.

In FIG. 2B, in order from top to bottom, in assembly 2100, a top laminate portion 2110 is disposed over an upper frame portion 2120. An electrochemical stack 2130a fits between upper frame portion 2120 and a lower frame portion 2140. Lower frame portion 2140 has a solid portion or surface 2140a to which electrochemical stack 2130a may be bonded or otherwise attached. Lower frame portion 2140 has edges 2141-2144 which protrude both above and below solid portion or surface 2140a, forming a tray-shaped structure 2145 that may be referred to elsewhere herein as a tray.

The upper frame portion 2120 and the lower frame portion 2140 are attached to each other to form a frame around the electrochemical stack 2130a. The frame surrounds but does not contact the minor surfaces of the electrochemical stack 2130a. A further electrochemical stack 2130b is disposed below surface 2140a, and may be bonded or otherwise attached to surface 2140a. The frame surrounds but does not contact the minor surfaces of the electrochemical stack 2130b. In an embodiment, electrochemical stack 2130b is sufficiently thin to fit within lower protruding edges of lower frame portion 2040, so that the lower protruding edges of lower frame portion 2140 surround, but do not contact edges of electrochemical stack 2130b. A bottom laminate portion 2150 is disposed below the lower frame portion 2140. The top laminate portion 2110 and bottom laminate portion 2150 form a laminated pouch which surrounds the assembled frame and the electrochemical stacks 2130a and 2130b contained therein. The top laminate portion 2110 and bottom laminate portion 2150 are sealed together so as to form a seal around the assembled frame and the electrochemical stacks 2130a and 2130b contained therein.

The electrochemical stack 2130a also has terminals (positive and negative electrodes or tabs) 2160 attached respectively to the individual cell cathode terminals 2131a and individual cell anode terminals 2132a of the electrochemical stack 2130, and to individual cell cathode terminals 2131b and individual cell anode terminals 2132b of the electrochemical stack 2130b. These individual cell cathode terminals 2131a, 2131b and anode terminals 2132a, 2132b extend through the frame and may contact the frame. In some examples, the terminals 2160 extend through the laminated pouch. In some examples, the terminals 2160 extend through the laminated pouch and form part of the seal.

In FIG. 2C, in order from top to bottom, in assembly 2200, a top laminate portion 2210 is disposed over an electrochemical stack 2230. The electrochemical stack 2230 fits within a frame 2240. The frame 2240 surrounds but does not contact the minor surfaces of the electrochemical stack 2230. A bottom laminate portion 2250 is disposed below the outer frame 2040. The top laminate portion 2210 and bottom laminate portion 2250 form a laminated pouch which surrounds the frame 2240 and the electrochemical stack 2230 contained therein. The top laminate portion 2210 and bottom laminate portion 2250 are sealed together so as to form a seal around the frame 2240 and the electrochemical stack 2240 contained therein. Positive electrode terminal (cathode) 2231 and negative electrode terminal (anode) 2232 are accessible in electrochemical stack 2230.

In FIG. 2C, terminals which would attach respectively to a cathode protruding from opening 2231 and an anode protruding from opening 2232 are not shown. Where the embodiment of FIG. 2C includes terminals, those terminals may extend through a laminated pouch which surrounds assembly 2200 and form part of the seal.

FIG. 2C also shows foam pads 2290, 2295 above and below laminate members 2210 and 2250, respectively. These pads can help to cushion the assembled laminated pouch when mounting the pouch for use. In FIG. 2C, pads 2290, 2295 are sized to cover approximately the same area as a central portion of top and bottom laminate portions 2290, 2295.

Figure 2D:
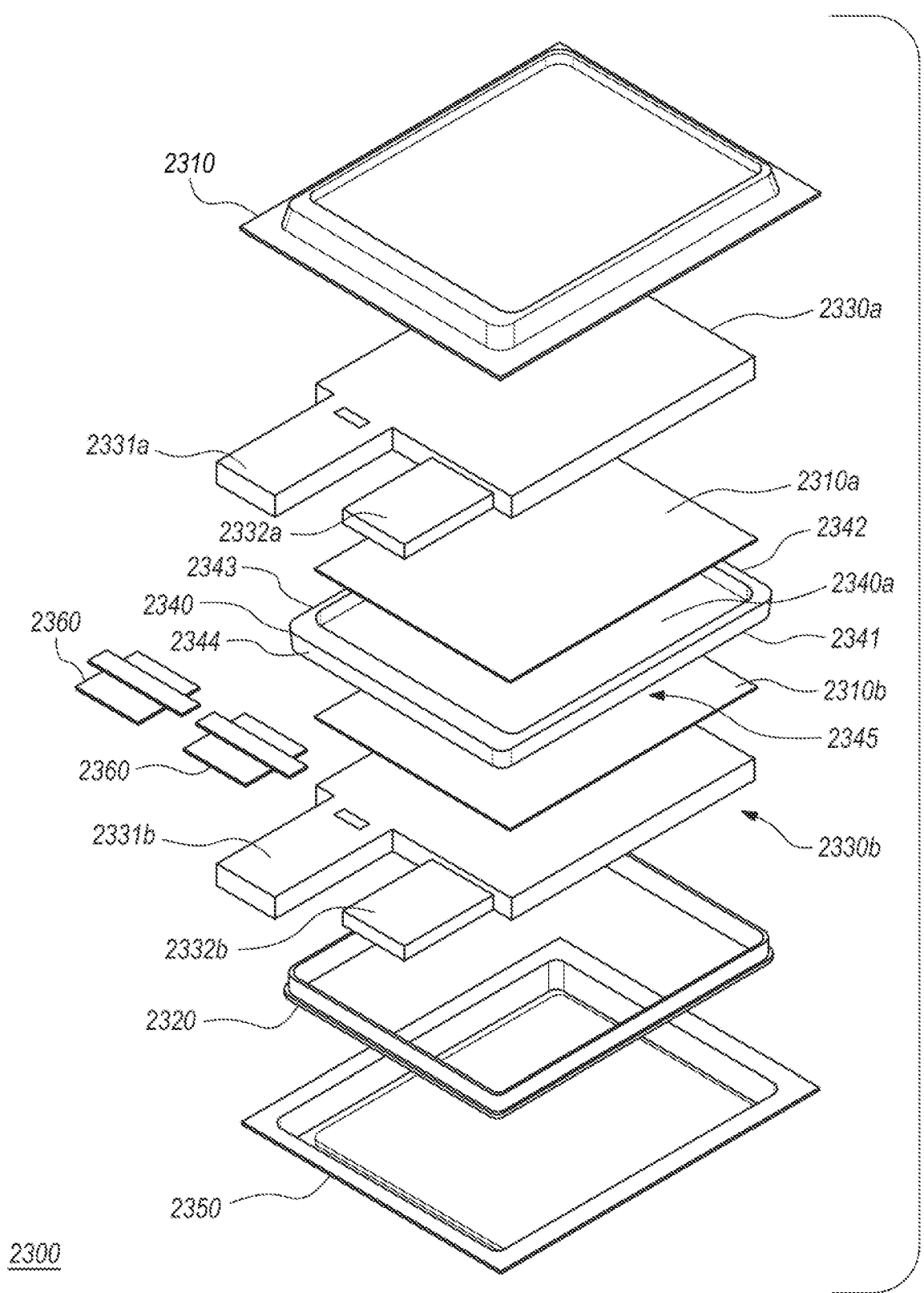

In FIG. 2D, in order from top to bottom, in assembly 2300, a top laminate portion 2310 is disposed over a unit stack 2330a, which has electrodes 2331a and 2332a. A spacer block 2310a may be provided between electrochemical stack 2330a and a frame portion 2340 with a center plate 2340a, to aid in distributing pressure across the surface area of electrochemical stack 2330a. In some embodiments, spacer block 2310a provides additional volume in assembly 2300 to facilitate a top major surface of electrochemical stack 2330a contacting top laminate portion 2310. Frame portion 2340 has edges 2341-2344 extending upwardly from center plate 2340a to accommodate spacer block 2310a and electrochemical stack 2330a. The overall structure of the frame portion 2340, center plate 2340a, and upwardly extending edges 2341-2344 form a tray 2345. In an embodiment, spacer block 2310a may be compressible to provide a resilient surface against which electrochemical stack 2330a can seat.

A further spacer block 2310b may be provided between frame portion 2340 and a further electrochemical stack 2330b with electrodes 2331b and 2332b, to aid in distributing pressure across the surface area of electrochemical stack 2330b. In an embodiment, spacer block 2310b may be compressible to provide a resilient surface against which electrochemical stack 2330b can seat. In some embodiments, spacer block 2310b provides additional volume in assembly 2300 to facilitate a bottom major surface of electrochemical stack 2330b contacting bottom laminate portion 2350. Frame portion 2320 fits around spacer block 2310b and electrochemical stack 2330b. A bottom laminate portion 2350 is disposed below the frame portion 2320 and electrochemical stack 2330b. In some embodiments, spacer block 2310b provides additional volume in assembly 2300 to facilitate a bottom major surface of electrochemical stack 2330b contacting bottom laminate portion 2350. The tray 2345 and frame portion 2320 together form an assembled frame which surrounds but does not contact the minor surfaces of the electrochemical stack 2330b. The top laminate portion 2310 and bottom laminate portion 2350 form a laminated pouch which surrounds the assembled frame and the electrochemical stacks 2330a and 2330b contained therein. The top laminate portion 2310 and bottom laminate portion 2350 are sealed together so as to form a seal around the assembled frame and the electrochemical stacks 2330a and 2330b contained therein.

The electrochemical stack 2330a also has terminals (positive and negative electrodes or tabs) 2360 attached respectively to the cell cathode terminals 2331a and cell anode terminals 2332a of the electrochemical stack 2330a, and to cell cathode terminals 2331b and cell anode terminals 2332b of the electrochemical stack 2330b. These cell cathode terminals 2331a, 2331b and anode terminals 2332a, 2332b extend to the edge of the frame and may contact the frame. The terminals 2060 connect to the cathode terminals 2331a, 2331b and anode terminals 2332a, 2332b. In some examples, the terminals 2360 extend through the laminated pouch. In some examples, the terminals 2360 extend through the laminated pouch and form part of the seal.

Figure 3A:
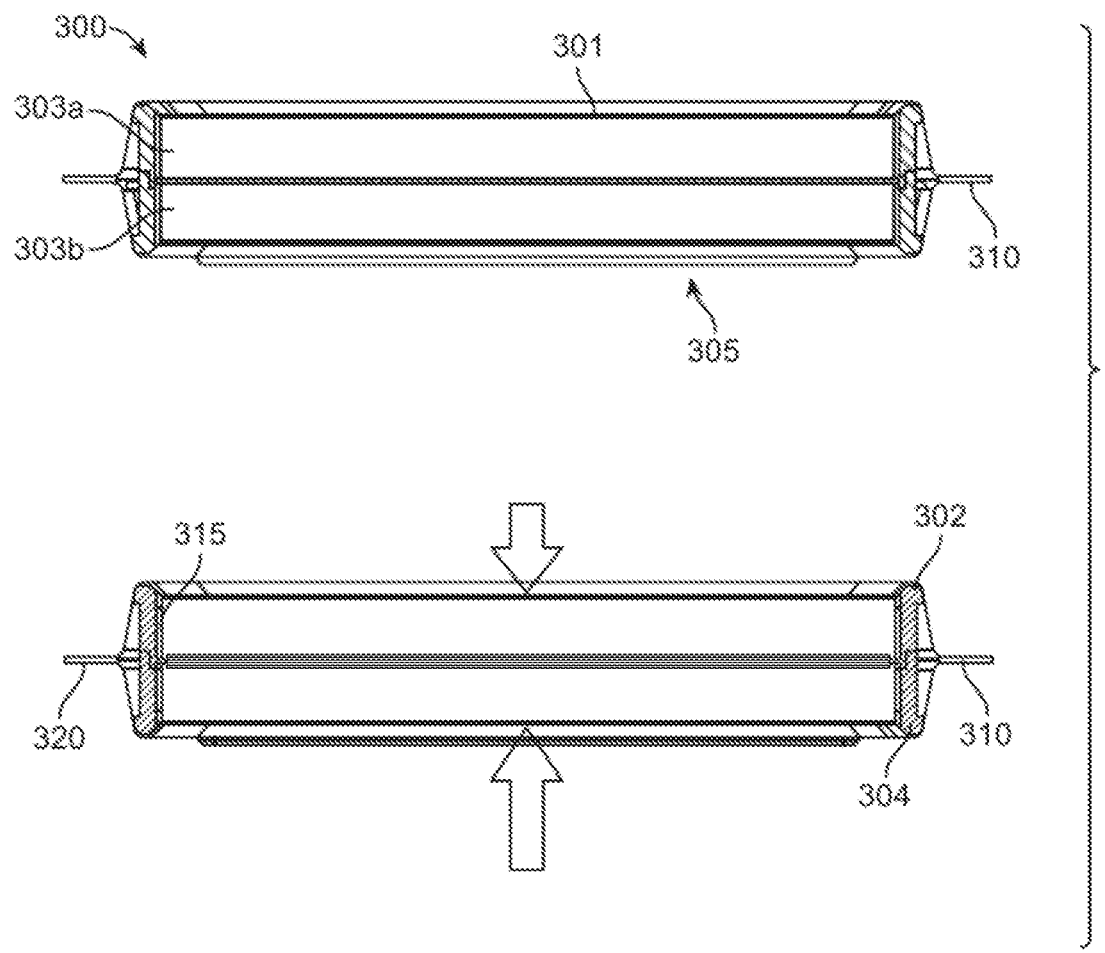
FIGS. 3A and 3B are cross-sectional diagrams of a laminated pouch that contains a frame and two electrochemical stacks according to an embodiment.

FIG. 3A shows two different cross-sectional views of a laminated pouch 300 according to an embodiment. In the upper cross-sectional view, in some examples, including any of the foregoing, a PSA is provided between electrochemical cell stack 1 (303a) and electrochemical cell stack 2 (303b), respectively. A center wall or center plane 310 extends between the electrochemical cell stacks 303a, 303b and may extend outside of the pouch. In an embodiment, center wall 310 acts as a structural member. In an embodiment, center wall or center plane 310 acts as a thermal conductor. In an embodiment, center wall or center plane 310 acts as both a structural member and a thermal conductor.

As a thermal conductor, the center wall or center plane 310 improves heat transfer into the frame from the electrochemical cell stacks 303a, 303b, by acting as a thermal transfer wall to facilitate heat extraction from the electrochemical cell stacks 303a, 303b. In an embodiment, the center wall or center plane 310 also provides a mechanical constraint for the electrochemical cell stacks 303a, 303b so that the stacks do not move within the frame limits. Depending on the embodiment, the center wall or center plane 310 may be made of the same material as the frame, or may be made of a different material. Depending on the embodiment, the center wall or center plane 310 may be aluminum (Al), anodized aluminum, magnesium (Mg), Mg-copper (Cu) alloy, or an Al—Mg alloy.

In some examples, including any of the foregoing, either or both of the electrochemical cell stacks 303a, 303b may have from 8 to 100 electrochemical cells.

Looking at the lower cross-sectional view in FIG. 3A, upper frame portion 302 and lower frame portion 304 form a frame in which electrochemical cell stacks 303a, 303b, with center wall 310 sandwiched between, are located. Top laminate portion 301 and bottom laminate portion 305 surround the frame. In an embodiment, center wall 310 may be part of upper frame portion 302. In an embodiment, center wall 310 may be part of lower frame portion 304. In an embodiment, center wall may be part of neither upper frame portion 302 nor lower frame portion 304, but instead may be a separate element. As noted earlier, in an embodiment the center wall 310 provides a thermal sink in the middle of the electrochemical stack, to draw heat from inside the electrochemical stack toward the frame and edges of the laminate pouch.

The lower cross-sectional view shows a gap 315 between the electrochemical cell stacks 303a, 303b and the frame. The gap 315 allows for expansion and contraction of the electrochemical cell stacks 303a, 303b during charge and discharge cycles. The lower cross-sectional view in FIG. 3A also shows the provision of a vacuum within the laminated pouch 300. This view also shows atmospheric pressure (14.7 pounds per square inch (PSI), or 101.4 kilopascals (kPa) at sea level) outside of the laminated pouch 300. The pressure differential inside and outside the stack presses the upper laminate portion 301 and lower laminate portion 305 against the respective facing surfaces of the electrochemical cell stacks 303a, 303b. Ordinarily skilled artisans will appreciate that less than perfect vacuum may be provided within the laminated pouch 300. Depending on the embodiment, a sufficient pressure differential between the inside and the outside of the laminated pouch 300 will suffice to provide the necessary contact between upper laminate portion 301 and lower laminate portion 305 and the respective facing surfaces of the electrochemical cell stacks 303a, 303b.

The gap 315 extends around the perimeter of the electrochemical cell stacks 303a, 303b between the stacks and the frame. Because the frame is interposed between the pouch and the minor surfaces of the electrochemical cell stacks 303a, 303b, the pouch does not contact the minor surfaces of the stacks. In some examples, there is about 0.5 mm space between the minor surfaces of the electrochemical stack and the frame. FIG. 3A also shows a laminate seal 315 where the upper laminate portion 301 and lower laminate portion 305 are bonded together to form the pouch which surrounds the frame and electrochemical cell stacks 303a, 303b. The lower cross-section of FIG. 3A also shows the center wall 310 extending through the pouch.

Figure 3B:
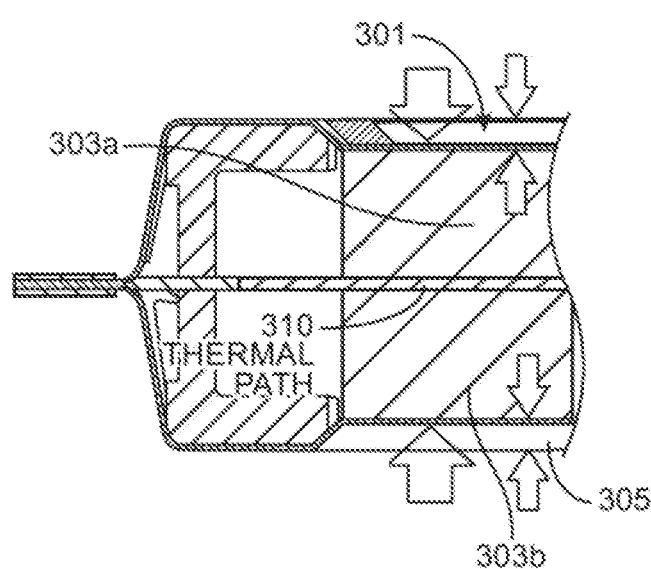

FIG. 3B shows a closeup of some of the structure in FIG. 3A, with additional detail for upper laminate portion 301, lower laminate portion 305, electrochemical cell stacks 303a, 303b, and center wall 310. Depending on the composition of the electrochemical stacks 303a, 303b, there can be varying amounts of thickness expansion of those stacks in operation. The imposition of vacuum inside the laminated pouch, opposed by atmospheric pressure outside the laminated pouch, helps to maintain force of the upper and lower laminate portions 301, 305 against the electrochemical stacks 303a, 303b. Center wall 310 adds to structure of the overall battery, and also transfers heat from the electrochemical stacks 303a, 303b to outside the laminated pouch, to cooler areas. In an embodiment, center wall 310 extending outside the laminated pouch will contact cooler structures directly to facilitate heat transfer.

Figure 3C:
FIGS. 3C and 3D show further views of electrochemical stacks within the pouch.
Figure 3D:
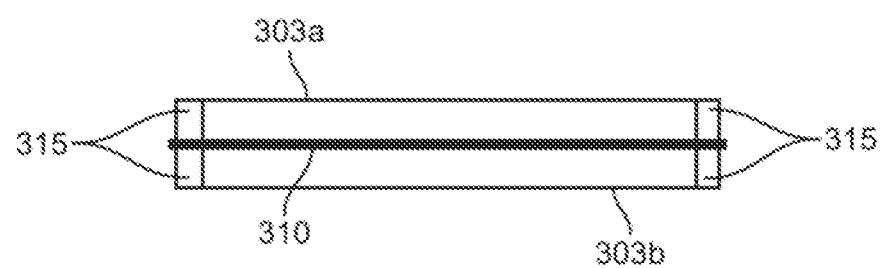

FIGS. 3C and 3D show respective high level cross-sectional views of pouch 300 through the longer dimension (FIG. 3C) and the shorter dimension (FIG. 3D), where the electrochemical cell stacks 303a, 303b are rectangular. Both FIGS. 3C and 3D show center wall 310 extending between electrochemical cell stacks 303a, 303b, and gaps 315 between electrochemical cell stacks 303a, 303b and the frame.

Figure 3E:
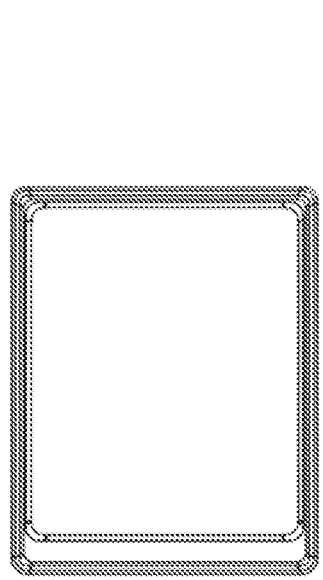
FIG. 3E is top view of a laminated pouch according to an embodiment.

FIG. 3E shows a top view of an electrochemical stack. In an embodiment, the electrochemical stack has dimensions of 64 mm×79 mm. A frame is disposed around the stack. In some examples, the inner dimensions of the frame are 64.5 mm×79.5 mm. In some examples, the inner dimensions are (64+x) mm×(79.5+x) mm, wherein x is the space between the frame and the electrochemical stack. In an embodiment, x may be head room for foil tabs (e.g., positive electrode terminals, negative electrode terminals). In some examples, x is 1 mm. In some examples, x is 2 mm. In some examples, x is 3 mm. In some examples, x is 4 mm. In some examples, x is 5 mm. In some examples, x is 6 mm.

Figure 3F:
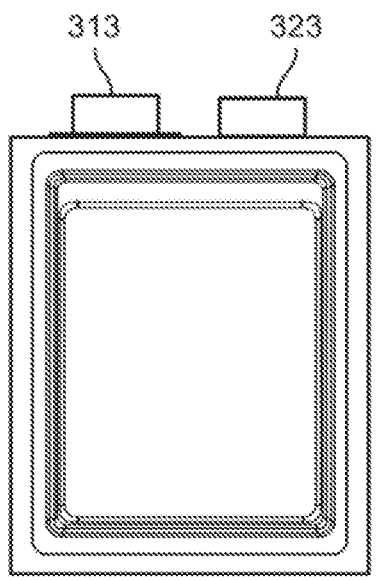
FIGS. 3F and 3G are a top view and side view, respectively, of a laminated pouch with a positive electrode terminal and a negative electrode terminal extending through the laminated pouch according to an embodiment.
Figure 3G:
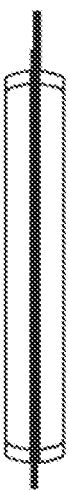

FIGS. 3F and 3G show a top view and a side view of a laminated pouch. In an embodiment, the laminated pouch has a thickness of 13.5 mm. In an embodiment, the laminated pouch has outer dimensions of 102 mm×83 mm. In FIG. 3F, in an embodiment positive and negative terminals 313, 323 extend 111 mm from the laminated pouch. The terminals 313, 323 may extend downwardly from the pouch, or may extend straight out from the pouch, or may extend at an angle from the pouch.

Figure 4A:
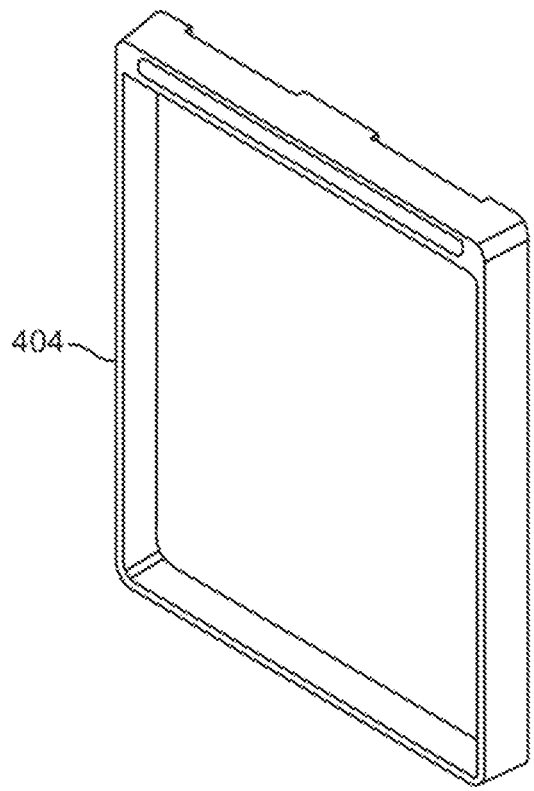
FIGS. 4A and 4B are two different views of a frame for containing an electrochemical stack according to an embodiment.
Figure 4B:
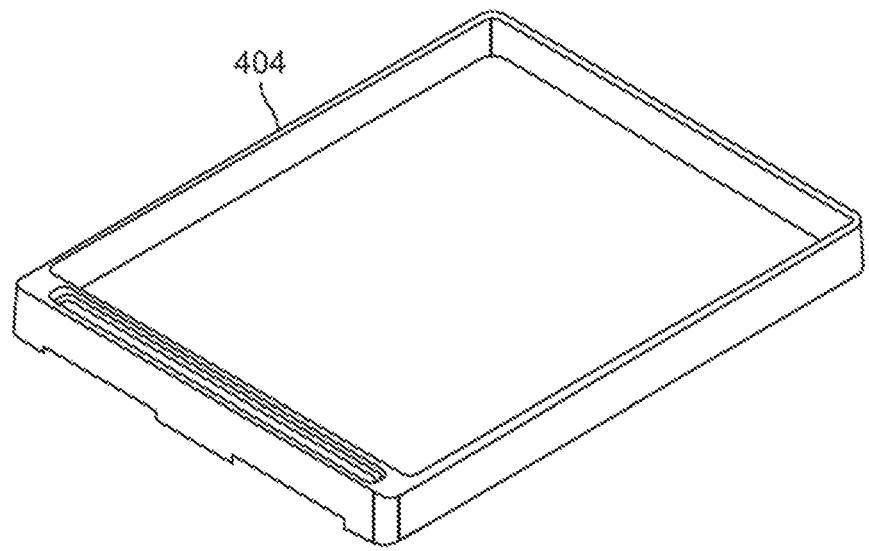

FIGS. 4A and 4B show different respective views of an embodiment of a frame portion 404, which could be an upper frame portion or a lower frame portion. In an embodiment, the frame portions 404 in FIGS. 4A and 4B may be used in conjunction with the frame portions 5040 in FIGS. 5A and 5B, discussed below, which have a solid portion or surface 5040a to which electrochemical cell stacks may be attached, as discussed above with respect to FIG. 2B. In an embodiment, solid portion of surface 5040a acts as a center wall, which was described previously.

Figure 4C:
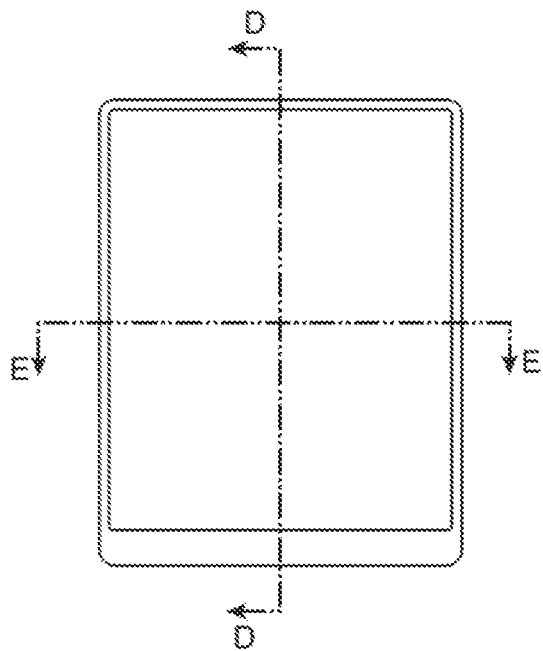
FIGS. 4C-4I are different schematic views of a frame and portions of a frame according to an embodiment.
Figure 4D:
Figure 4E:
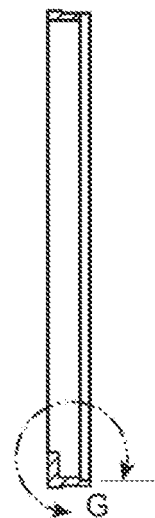
Figure 4F:
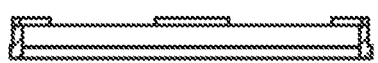
Figure 4G:
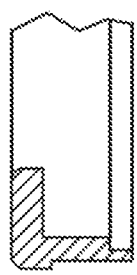

FIG. 4C shows a top view of a frame portion. FIG. 4D shows a cross-section of FIG. 4C through line D-D. FIG. 4E shows a cross-section of FIG. 4C through line E-E. FIG. 4F shows a side view of a frame portion. FIG. 4G shows an enlarged portion of FIG. 4E as indicated by circular section G. FIG. 4G shows one way by which an upper frame portion and a lower frame portion can be attached to form a frame, by showing mechanical interlocking of one frame portion with the other frame portion.

Figure 4H:
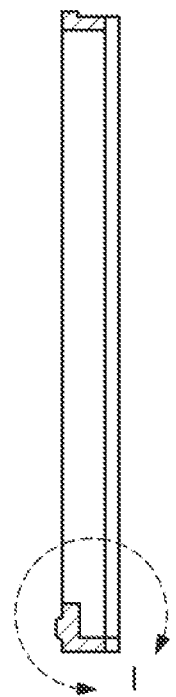
Figure 4I:
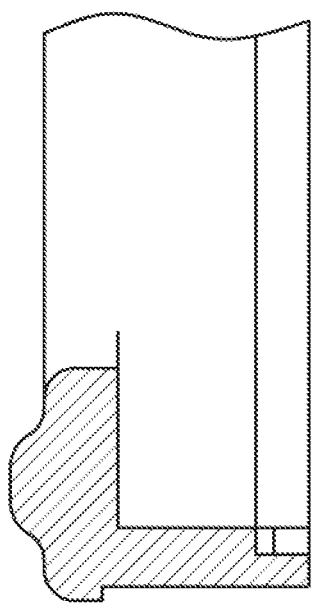

FIGS. 4H and 4I show one way by which an upper frame portion and a lower frame portion can be attached to form a frame. FIG. 4H shows, as one example, a 2.00 mm gap between the frame and the electrochemical stack within the frame. FIG. 4I, which shows an exploded version of a portion of FIG. 4H marked "I," shows mechanical interlocking of one frame portion with the other frame portion.

FIGS. 4J and 4K show examples of formed portions of a laminated pouch according to an embodiment. The dimensions shown are exemplary and are not intended to be limiting. In FIG. 4J, going from the outer edge of the laminated pouch towards its center and across the top, outer surface, there is about a 1000 rise in the laminated pouch where the formed portion begins. After the rise, the laminated pouch has a formed cavity in which a major surface of the cavity lowers after a lateral distance of about 7.97 mm. In FIG. 4K, a thickness of the formed portion is about 6.57 mm. Also in FIG. 4K, there is about a 1.26 mm thick rise in the formed portion of the laminated pouch. In this example, the formed portion of the laminated pouch has a wall which extends to provide a cavity into which an electrochemical stack can be positioned. The wall extends over a lateral distance of about 3.35 mm.

Figure 5A:
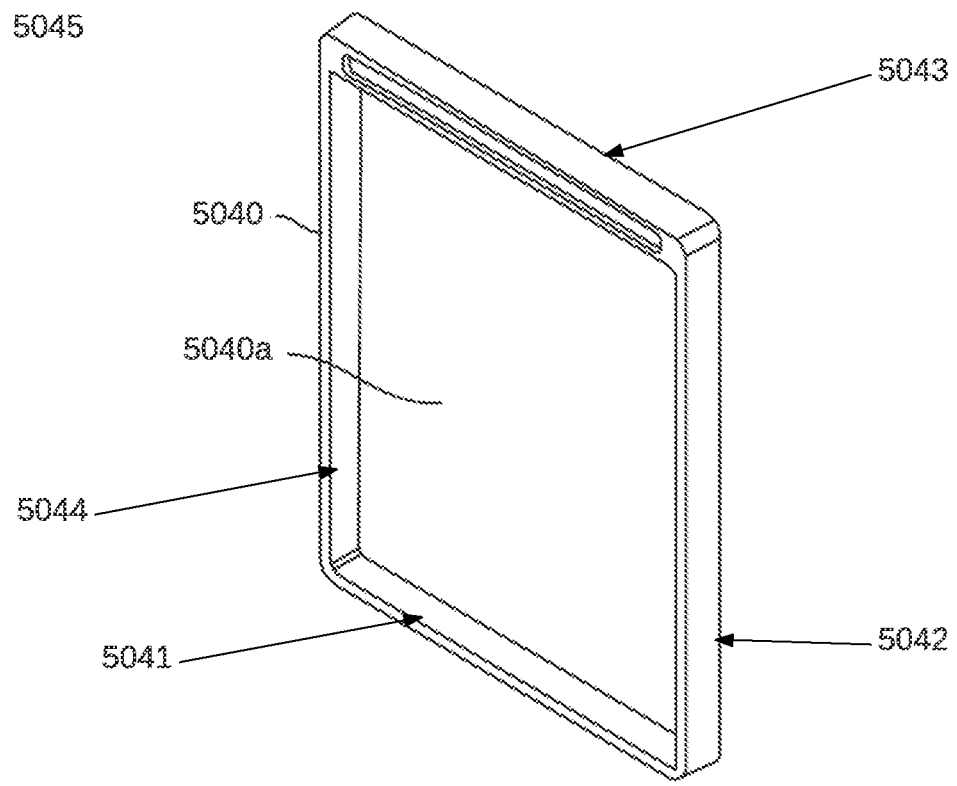
FIGS. 5A and 5B are two different views of a frame portion for containing an electrochemical stack according to an embodiment.
Figure 5B:
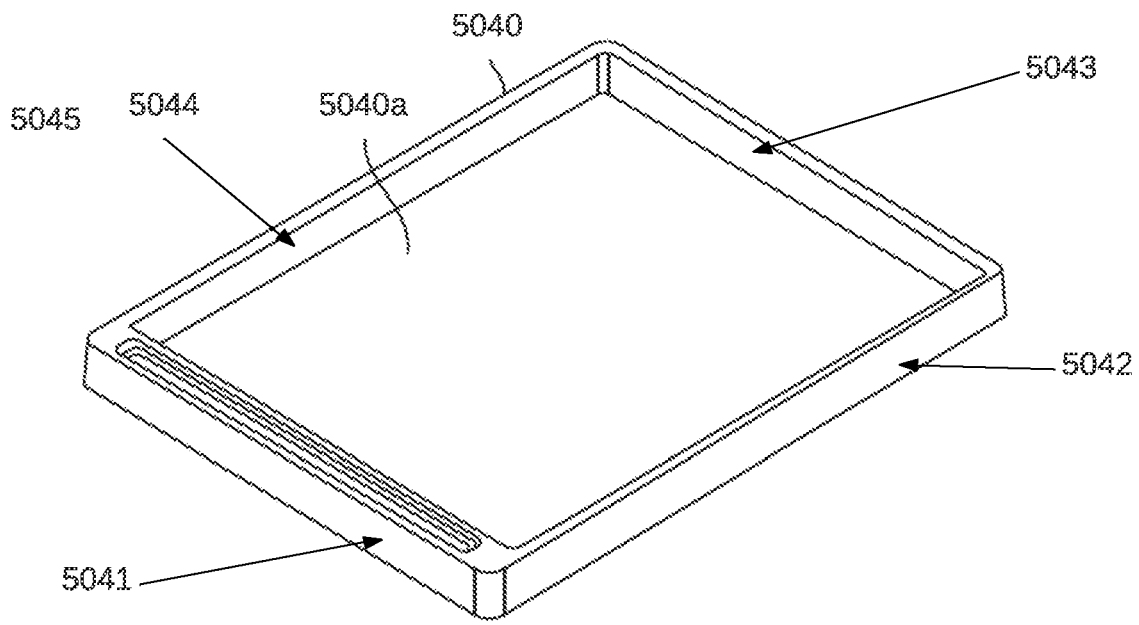

FIGS. 5A and 5B show different respective views of an embodiment of a tray 5045 comprising frame portion 5040, which could be an upper frame portion or a lower frame portion; center plate or plane 5040a to which electrochemical cell stacks may be attached, as discussed above with respect to FIG. 2B; and edges 5041-5044 extending upwardly from center plane 5040a.

Figure 5C:
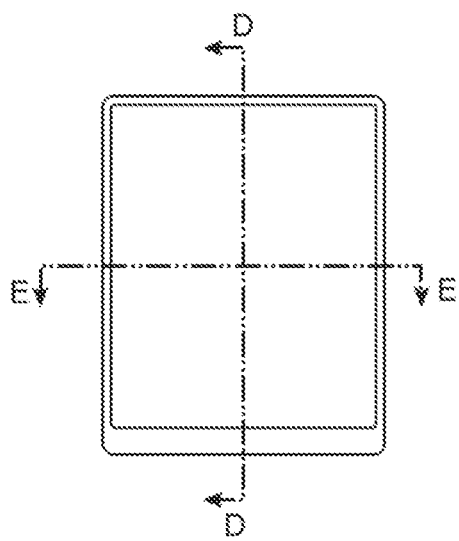
FIGS. 5C-5G are different schematic views of a frame and portions of a frame according to an embodiment.
Figure 5D:
Figure 5E:
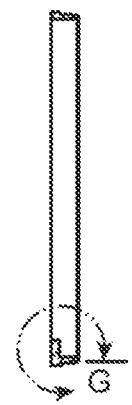
Figure 5F:
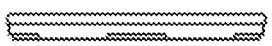
Figure 5G:

FIG. 5C shows a top view of a frame portion. FIG. 5D shows a cross-section of FIG. 5C through line D-D. FIG. 5E shows a cross-section of FIG. 5C through line E-E. FIG. 5F shows a side view of a frame portion. FIG. 5G shows an enlarged portion of FIG. 5E as indicated by circular section G. FIG. 5G shows one way by which an upper frame portion and a lower frame portion can be attached to form a frame, by showing mechanical interlocking of one frame portion with the other frame portion.

Figure 5H:
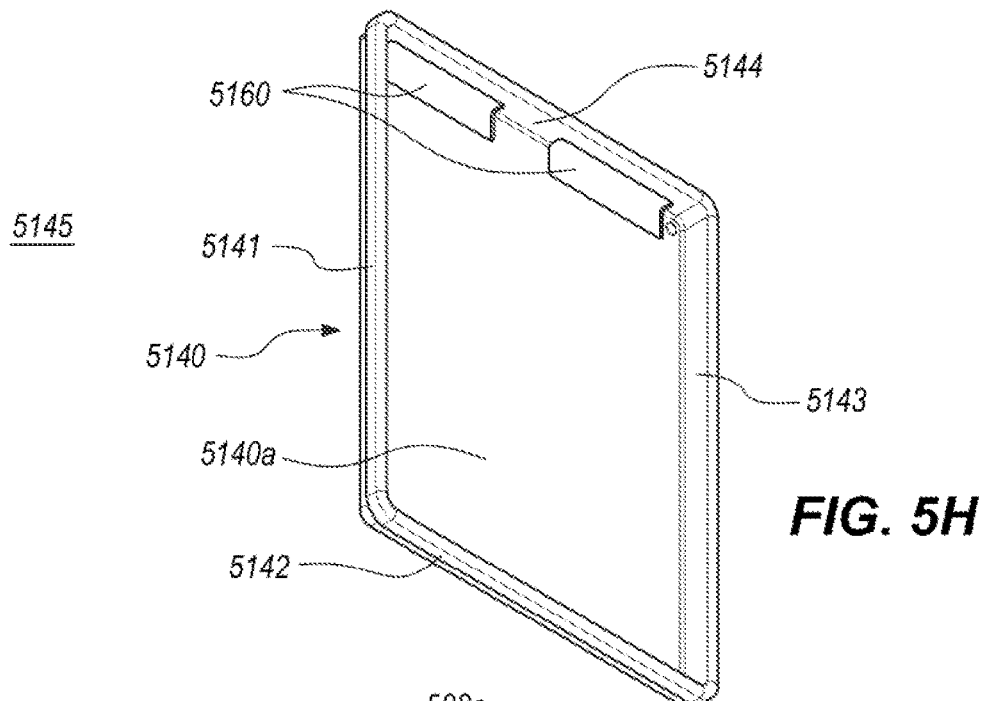
FIG. 5H is a view of a frame portion for containing an electrochemical stack according to an embodiment.

FIG. 5H shows an embodiment of a frame portion 5140 with a center plane 5140a and two spaced-apart openings 5160, 5160 at one end to accommodate terminals for anodes and cathodes of cells in the pack. Edges 5141-5144 extend away from center plane 5140a. The frame 5140, its center plane 5140a, and its edges 5141-5144 form a tray 5145.

Figure 5I:
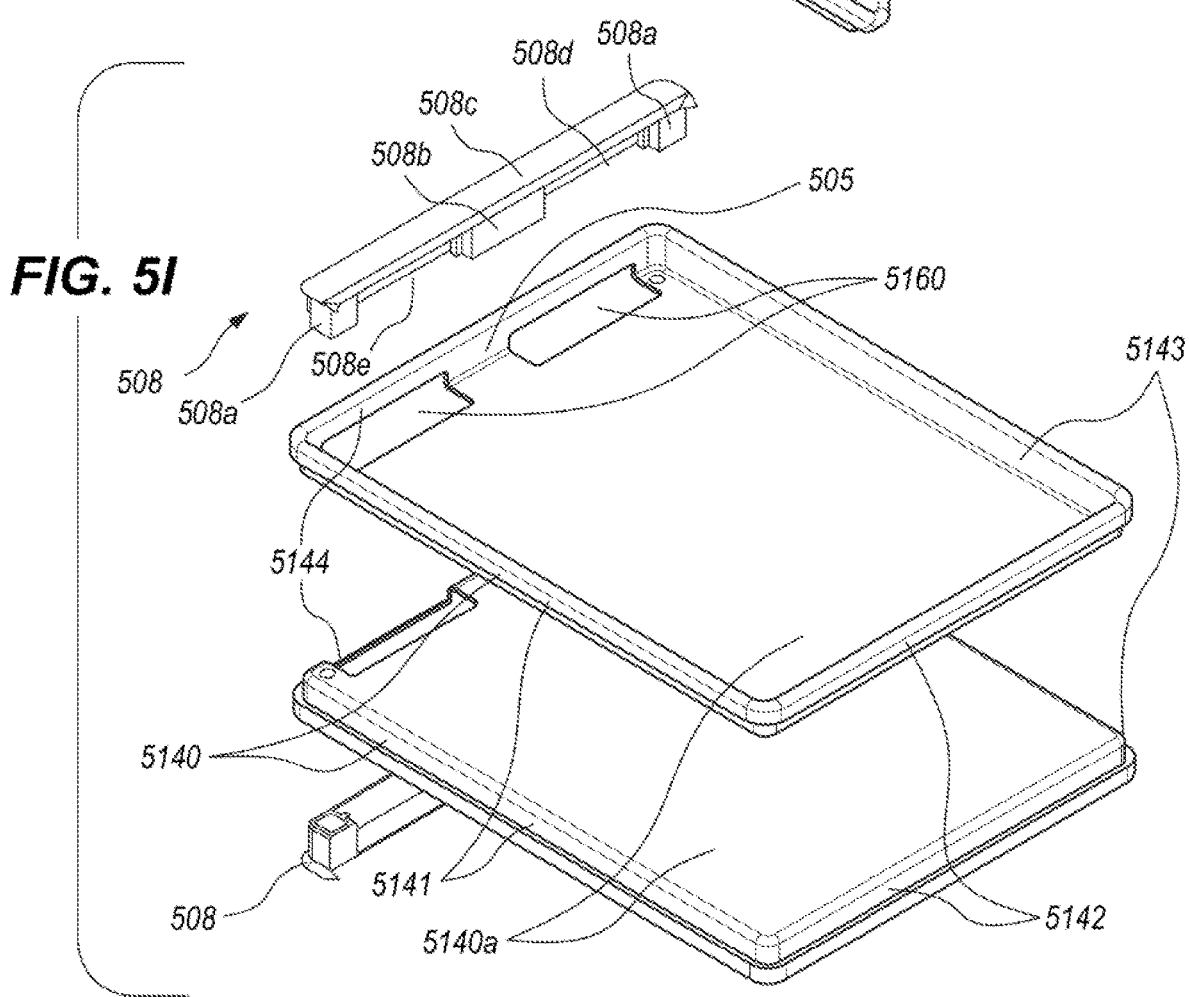
FIG. 5I is an exploded view of a frame assembly for containing an electrochemical stack according to an embodiment.

FIG. 5I shows two frame portions 5140 with their respective center planes 5140a facing each other, and edges 5141-5144 extending away from respective center plane 5140a. The frame 5140, its center plane 5140a, and its edges 5141-5144 form a tray 5145. Accordingly, FIG. 5I shows two trays 5145 with their center planes 5140a positioned back to back. Pieces 508, 508 seat at the end of frame portions 5140 containing the openings 5160. Piece 508 includes protrusions 508a and 508b extend downwardly from major surface 508c to form openings 508d which are complementary to openings 5160 in frame portion 5140. In an embodiment, frame portions 5140 may be stamped or made using CNC. In an embodiment, pieces 508 may be injection molded.

FIG. 5J shows an embodiment of a frame portion 5240 with a center plane 5240a and a single opening 510 at one end to accommodate terminals for anodes and cathodes of cells in the pack. Edges 5241-5244 extend away from center plane 5240a. The frame 5240, its center plane 5240a, and its edges 5241-5244 form a tray 5245.

FIG. 5K shows two frame portions 5240 with their respective center planes 5240a facing each other, and edges 5241-5244 extending away from respective center plane 5240a. A frame 5240, its center plane 5240a, and its edges 5241-5244 form a tray 5245. Accordingly, FIG. 5I shows two trays 5245 with their center planes 5240a positioned back to back. Pieces 508, 508 seat at the end of frame portions 5240 containing the respective openings 510, to provide appropriate spaces for the anodes and cathodes of the cells in the pack. As in FIG. 5I, piece 508 includes protrusions 508*a* and 508*b* extend downwardly from major surface 508*c* to form openings 508*d* which are complementary to opening 510 in frame portion 5240. In an embodiment, frame portions 5240 may be stamped or made using CNC. In an embodiment, pieces 508 may be injection molded.

Looking further at FIGS. 5H-5K, particularly FIGS. 5I and 5K, in accordance with other embodiments, as described previously (see, e.g., FIGS. 4A and 4B), one of the frame portions 5140 and 5240 may lack a center plane. Pieces 508 still form openings for cathodes and anodes.

Depending on the embodiment, there may be a slot on at least one side of one frame portion, into which a complementary protruding portion of the other frame portion may seat to facilitate bringing the pieces together.

In some examples, including any of the foregoing, the frame prevents the application of force on the four minor surfaces of the electrochemical stack. When the laminated pouch is under vacuum, the laminated pouch contacts the major surfaces of the electrochemical stack. In doing so, the laminated pouch does not contact the minor surfaces of the electrochemical stack. There is a space between the minor surfaces and the frame. The laminated pouch contains the frame and the electrochemical stack. When the laminated pouch is under vacuum, there remains a space between the minor surfaces and the frame.

In some examples, including any of the foregoing, the laminated pouch is under vacuum. The frame prevents the application of atmospheric pressure on the four minor surfaces. The atmospheric pressure may be applied externally to the pouch. However, because the pouch does not contact the four minor surfaces, the atmospheric pressure is not transferred to the minor surfaces.

In some examples, including any of the foregoing, the electrochemical stack includes electrochemical cells that each include a lithium-metal negative electrode.

In some examples, including any of the foregoing, the frame provides space around the electrochemical stack to expand and contract during a charge and discharge cycle. In some examples, the electrochemical stack expands and contracts up to and including 20% of its thickness. The expansion and contraction is substantially in one direction, which is perpendicular to the stack if the stack is considered from the cathode towards the anode. This is also referred to as the z-direction. If an x-y-z three-dimensional coordinate system were placed on the top major surface of the solid-state electrolyte, the x-axis and y-axis would be in the plane of the top major surface and the z-axis would be perpendicular to the top major surface. The z-axis in this example would be parallel or substantially parallel to the aforementioned z-direction of expansion and contraction. The laminated pouch provides enough space around the minor surfaces of the electrochemical stack to accommodate this expansion and contraction.

In some examples, including any of the foregoing, the frame provides space around the minor surfaces of the electrochemical stack to expand and contract during a charge cycle without deforming, cracking, or breaking the solid state electrolyte.

In some examples, including any of the foregoing, the laminated pouch provides about 10-20% of z-volume expansion and contraction without deforming, cracking, or breaking the solid-state electrolyte. In some examples, including any of the foregoing, the laminated pouch provides about 20% of z-volume expansion and contraction without deforming, cracking, or breaking the solid-state electrolyte. In some examples, including any of the foregoing, the laminated pouch provides about 19% of z-volume expansion and contraction without deforming, cracking, or breaking the solid-state electrolyte. In some examples, including any of the foregoing, the laminated pouch provides about 18% of z-volume expansion and contraction without deforming, cracking, or breaking the solid-state electrolyte. In some examples, including any of the foregoing, the laminated pouch provides about 17% of z-volume expansion and contraction without deforming, cracking, or breaking the solid-state electrolyte. In some examples, including any of the foregoing, the laminated pouch provides about 16% of z-volume expansion and contraction without deforming, cracking, or breaking the solid-state electrolyte. In some examples, including any of the foregoing, the laminated pouch provides about 15% of z-volume expansion and contraction without deforming, cracking, or breaking the solid-state electrolyte. In some examples, including any of the foregoing, the laminated pouch provides about 14% of z-volume expansion and contraction without deforming, cracking, or breaking the solid-state electrolyte. In some examples, including any of the foregoing, the laminated pouch provides about 13% of z-volume expansion and contraction without deforming, cracking, or breaking the solid-state electrolyte. In some examples, including any of the foregoing, the laminated pouch provides about 12% of z-volume expansion and contraction without deforming, cracking, or breaking the solid-state electrolyte. In some examples, including any of the foregoing, the laminated pouch provides about 11% of z-volume expansion and contraction without deforming, cracking, or breaking the solid-state electrolyte. In some examples, including any of the foregoing, the laminated pouch provides about 10% of z-volume expansion and contraction without deforming, cracking, or breaking the solid-state electrolyte.

In some examples, including any of the foregoing, the pressure distribution across both major surfaces is uniform or substantially uniform. In some examples, the uniform distribution of pressure is over a surface area of 10 mm$^2$. In some examples, the uniform distribution of pressure is over a surface area of 10 cm$^2$. In some examples, the uniform distribution of pressure is over a surface area of 10 m$^2$.

In some examples, the uniform distribution of pressure is over a surface area of 20 mm$^2$. In some examples, the uniform distribution of pressure is over a surface area of 20 cm$^2$. In some examples, the uniform distribution of pressure is over a surface area of 20 m$^2$.

In some examples, the uniform distribution of pressure is over a surface area of 30 mm$^2$. In some examples, the uniform distribution of pressure is over a surface area of 30 cm$^2$. In some examples, the uniform distribution of pressure is over a surface area of 30 m$^2$.

In some examples, including any of the foregoing, the laminated pouch conforms around the frame.

In some examples, including any of the foregoing, the laminated pouch does not change shape when a vacuum is applied inside the laminated pouch. In some other examples, the thickness of the electrochemical stack compresses as a vacuum is applied. In these examples, the laminated pouch may change shape to accommodate this compression. However, the laminated pouch still maintains space around the four minor surfaces of the cells.

In some examples, including any of the foregoing, the laminated pouch is sealed and under vacuum.

In some examples, including any of the foregoing, at atmospheric pressure, the laminated pouch applies 115.2 pounds (794.3 kilopascals (kPa)) of force overall on both major surfaces of an electrochemical stack with dimensions 64 mm×79 mm. Different electrochemical stack surface dimensions will have different amounts of force applied. Examples of different dimensions are provided herein. In these examples, when under vacuum-sealed conditions, each edge or minor surface of the electrochemical stack receives 115.2 pounds (794.3 kPa) of force overall on an electrochemical stack with dimensions of 64 mm×79 mm.

In some examples, including any of the foregoing, the vacuum provides up to 14.7 pounds per square inch (PSI) (101.4 kPa) of atmospheric pressure on both major surfaces of the electrochemical stack.

In some examples, including any of the foregoing, the vacuum provides up to 13 PSI (89.63 kPa) of pressure on both major surfaces of the electrochemical stack.

In some examples, including any of the foregoing, the vacuum provides up to 12 PSI (82.74 kPa) of pressure on both major surfaces of the electrochemical stack.

In some examples, including any of the foregoing, the vacuum provides up to 11 PSI (75.84 kPa) of pressure on both major surfaces of the electrochemical stack.

In some examples, including any of the foregoing, the vacuum provides up to 10 PSI (68.95 kPa) of pressure on both major surfaces of the electrochemical stack.

In some examples, including any of the foregoing, the vacuum provides up to 9 PSI (62.05 kPa) of pressure on both major surfaces of the electrochemical stack.

In some examples, including any of the foregoing, the vacuum provides up to 8 PSI (55.16 kPa) of pressure on both major surfaces of the electrochemical stack.

In some examples, including any of the foregoing, the vacuum provides up to 7 PSI (48.26 kPa) of pressure on both major surfaces of the electrochemical stack.

In some examples, including any of the foregoing, the vacuum provides up to 6 PSI (41.37 kPa) of pressure on both major surfaces of the electrochemical stack.

In some examples, including any of the foregoing, the vacuum provides up to 5 PSI (34.47 kPa) of pressure on both major surfaces of the electrochemical stack.

In some examples, including any of the foregoing, the vacuum provides up to 4 PSI (27.58 kPa) of pressure on both major surfaces of the electrochemical stack.

In some examples, including any of the foregoing, the vacuum provides up to 3 PSI (20.68 kPa) of pressure on both major surfaces of the electrochemical stack.

In some examples, including any of the foregoing, the vacuum provides up to 2 PSI (13.79 kPa) of pressure on both major surfaces of the electrochemical stack.

In some examples, including any of the foregoing, the vacuum provides up to 1 PSI (6.895 kPa) of pressure on both major surfaces of the electrochemical stack.

In some examples, including any of the foregoing, the vacuum provides at least 1 PSI (6.895 kPa) of pressure on both major surfaces of the electrochemical stack.

In some examples, including any of the foregoing, the laminated pouch has a bonded seal at a seam between facing laminate materials. This bonded seal may be made by a heat sealing method. In some heat sealing methods, two hot metal bars press two laminate pouch pieces together until a polymer layer on each laminate melts and bonds (e.g., welds) the two sheets together. In some examples, including any of the foregoing, a bonded seal may be made by an ultrasonic welding method, or by laser welding, or by adhesive, or by external clamping, or by stitching. The goal is to achieve a proper seal to support evacuation or substantial evacuation within the laminated pouch.

In some examples, including any of the foregoing, the vacuum in the laminated pouch is less than 120 Torr.

In some examples, including any of the foregoing, the vacuum in the laminated pouch is less than 115 Torr.

In some examples, including any of the foregoing, the vacuum in the laminated pouch is less than 110 Torr.

In some examples, including any of the foregoing, the vacuum in the laminated pouch is less than 105 Torr.

In some examples, including any of the foregoing, the vacuum in the laminated pouch is less than 20 Torr.

In some examples, including any of the foregoing, the vacuum in the laminated pouch is less than 15 Torr.

In some examples, including any of the foregoing, the vacuum in the laminated pouch is less than 10 Torr.

In some examples, including any of the foregoing, the vacuum in the laminated pouch is less than 5 Torr.

In some examples, including any of the foregoing, the tray, frame, and/or frame portions may be composed of metal, plastic, rubber, silicone, ceramics, clay, glass, tempered glass, glass or tempered glass with thermal additives, or a combination thereof. In some examples, the tray, frame, and/or frame portions may be metal. In other examples, the tray, frame, and/or frame portions may be plastic. In yet other examples, the tray, frame, and/or frame portions may be a composite of a metal and a non-metal material. In other examples, the tray, frame, and/or frame portions may be a composite of two or more different types of metals. In other examples, the tray, frame, and/or frame portions may be made of polyether ether ketone (PEEK) or glass filled (GF) PEEK. In yet other examples, the tray, frame, and/or frame portions may be made of PEEK or GF PEEK and another material, such as polyetherimide, silicone, urethane, or polypropylene. In some examples, the metal is aluminum, anodized aluminum, magnesium, an alloy of aluminum, or an alloy of magnesium.

In different embodiments, the trays, frames, and/or frame portions may be machined, for example using computer numerical control (CNC) machining, or by various kinds of tooling (for example, progressive and stage tooling), or by die casting. When using CNC or tooling, the frames may comprise two parts, as FIGS. 2A-2D, 5I, 5K, and 10D illustrate. In embodiments, the metal used with one of these processes may be aluminum, though other metals may be used suitably, as noted above. In other embodiments, frames made of plastic, thermoplastic, silicone, or rubber as noted above may be made, for example, by molding, including injection molding. In other embodiments, frames made of ceramics, clay, glass, or tempered glass as noted above may be made, for example, by molding or firing. In some embodiments, carbon fiber or a metal-plastic composite may be used.

In some examples, including any of the foregoing, the laminated pouch has a formed shape. In some examples, the formed portion of the laminated pouch is made using a die and a cavity to deboss and/or emboss a formed shape onto the laminate. Then, the laminate is sealed together and around a frame and electrochemical stack.

In some examples, including any of the foregoing, the ratio of the surface area of a major surface of the formed shape of the laminated pouch relative to the surface area of a major surface of the electrochemical stack is greater than 1. The ratio being greater than 1 accounts for the laminated pouch surrounding the frame, which in turn surrounds the electrochemical stack and provides space between each of the minor surfaces of the electrochemical stack and the frame.

In some examples, including any of the foregoing, the ratio of the surface area of a major surface of the formed shape of the laminated pouch relative to the surface area of a major surface of the electrochemical stack is greater than 1.1. Similarly to what was just discussed above, this ratio accounts for the laminated pouch surrounding the frame, and providing more space between each of the minor surfaces of the electrochemical stack and the frame.

In some examples, including any of the foregoing, the ratio of the surface area of a major surface of the formed shape of the laminated pouch relative to the surface area of a major surface of the electrochemical stack is greater than 1.2. Again, this ratio accounts for the laminated pouch surrounding the frame, and providing more space between each of the minor surfaces of the electrochemical stack and the frame.

Figure 6A:
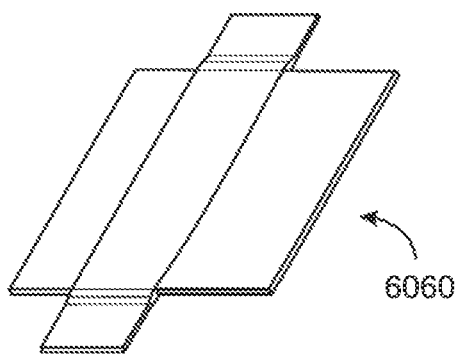
FIGS. 6A-6G are views of terminals for an electrochemical stack according to different embodiments.
Figure 6B:
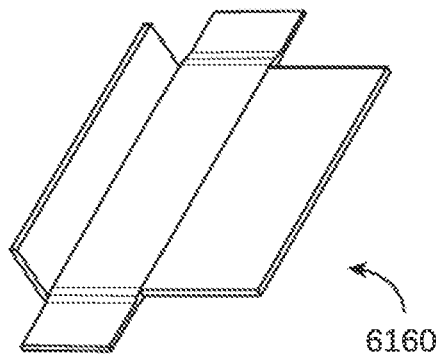
Figure 6C:
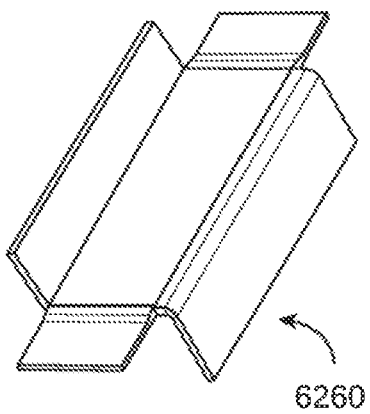
Figure 6D:
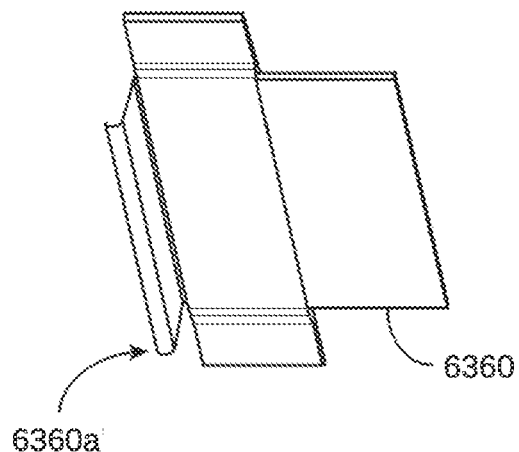

FIG. 6A shows a flat terminal or tab 6060 which is similar to terminals or tabs 2060, 2160 in FIGS. 2A and 2B. To reduce headspace, in an embodiment the terminals or tabs may be shortened through various kinds of bends to reduce headspace. FIG. 6B shows a bent terminal or tab 6160. To provide more terminal area while still reducing headspace, the variant in FIG. 6C shows a terminal or tab 6260 with a Z-bend. As a still further variant, FIG. 6D shows a folded terminal or tab 6360, with a fold 6260a seen underneath a folded portion of the terminal or tab 6360.

Figure 6E:
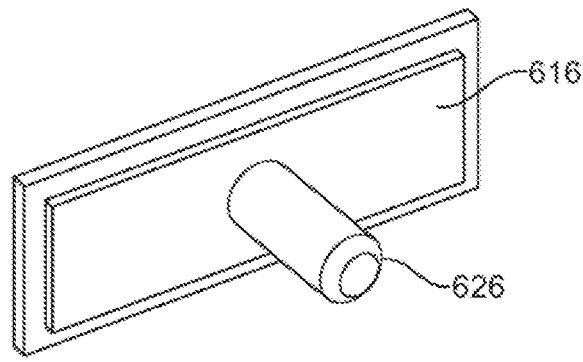
Figure 6F:
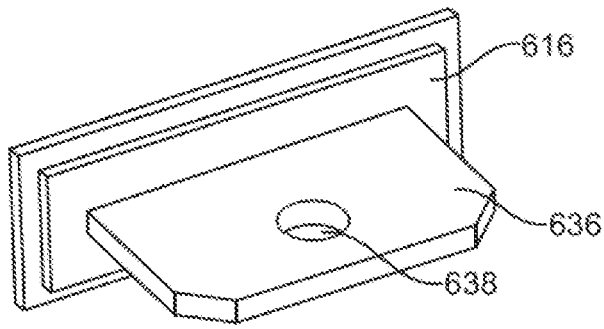
Figure 6G:
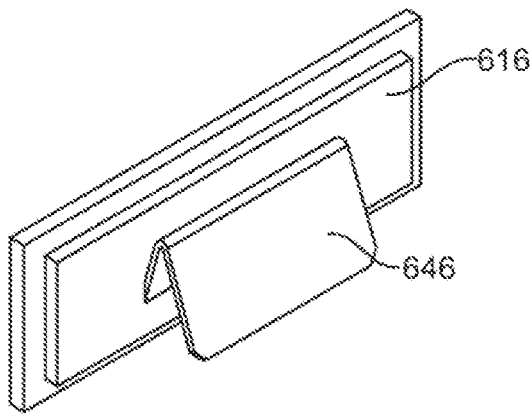

FIGS. 6E-6G show various types of attachments for a configuration such as FIG. 2C, with cathode cell terminals 2231 and anode cell terminals 2232. In an embodiment, a flat portion 616 in each of FIGS. 6E-6G may be attached to each of cathode 2231 and anode 2232. In FIG. 6E, a protrusion 626 may extend from flat portion 616. The protrusion 626 in FIG. 6E is shown as having a cylindrical cross-section, but ordinarily skilled artisans will appreciate that this protrusion may have other cross-sections, such as square or rectangular, and/or may extend from flat portion 616 by different amounts as necessary or desired.

In FIG. 6F, a tab 636 extends from flat portion 616, and contains a through-hole 638. In FIG. 6G, a folded or bent portion 646 extends from flat portion 616. In any of the embodiments of FIGS. 6F to 6G, the protrusion 626, the tab 636, or the folded or bent portion 646 may act as a terminal for connecting a cathode 2231 or an anode 2232 electrically as part of an overall battery system.

Figure 7A:
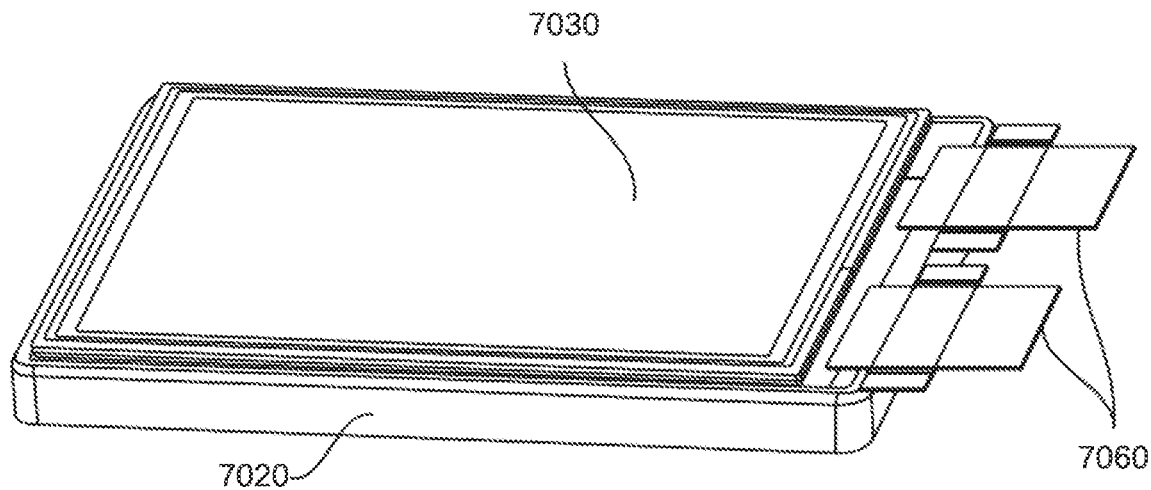
FIGS. 7A and 7B are side perspective views of an electrochemical stack according to an embodiment.
Figure 7B:
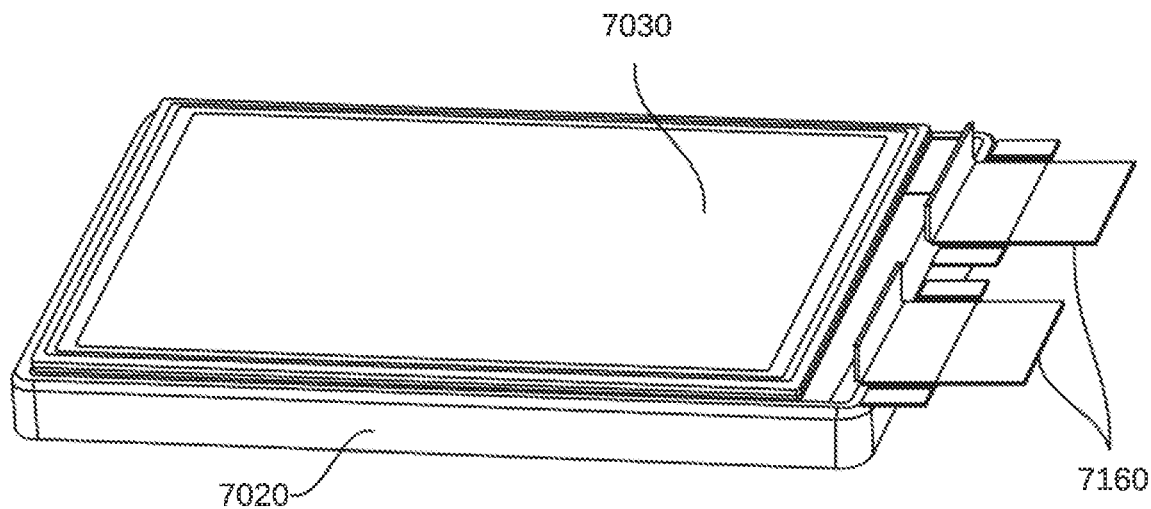
Figure 7C:
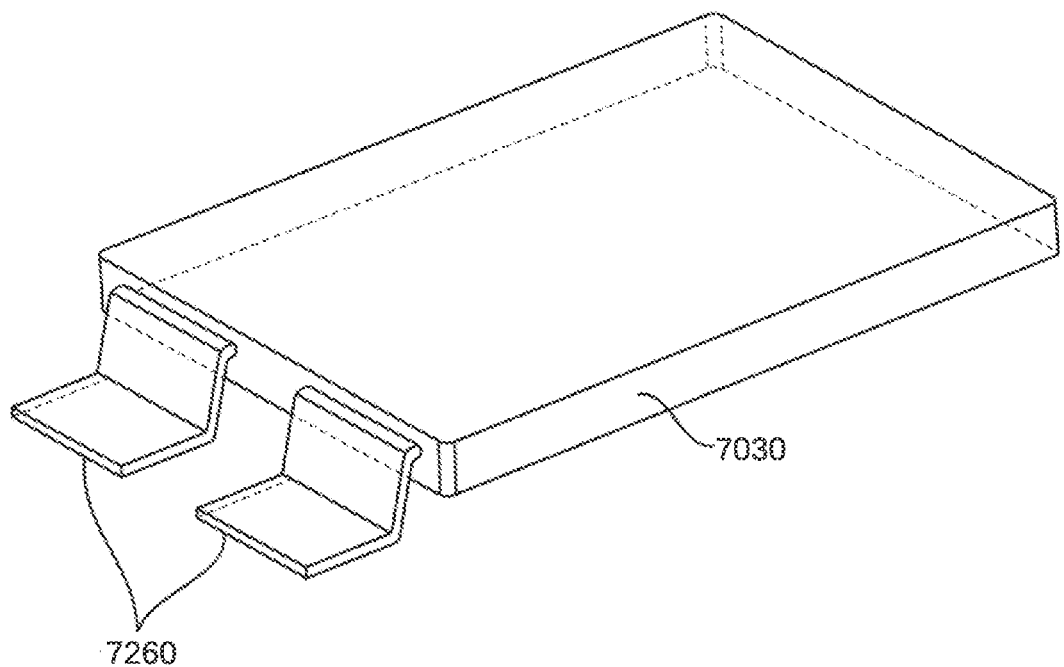
FIG. 7C is a front perspective view of an electrochemical stack according to an embodiment.

FIG. 7A shows a frame 7020 surrounding an electrochemical stack 7030, with terminals 7060 (similar to those shown in FIG. 6A) extending respectively from a cathode and anode (not shown). FIG. 7B shows a variant of the structure in FIG. 7A, with bent terminals or tabs 7160 (similar to those in FIG. 6B), reducing headspace in the resulting solid-state electrolyte battery in its laminated pouch. FIG. 7C shows a similar variant, with electrochemical stack 7030 and bent terminals or tabs 7260 extending therefrom.

In some examples, including any of the foregoing, the major surfaces of the electrochemical stack have a rectangular shape and dimensions of 64 mm×79 mm. FIG. 7C shows an example of an electrochemical stack 7030. In an embodiment, the stack 7030 has dimensions of 64 mm×79 mm. On the left hand side of FIG. 7C there are two terminals or tabs 7260 which are in contact with the electrochemical stack 7030 and extend away from it.

In different embodiments, dimensions of the electrochemical stack may be larger or smaller, depending on how the completed pouches are to be positioned or placed. A ratio between length and width also may vary. For example, an electrochemical stack may range in width from about 60 mm to about 100 mm, and in length from about 70 mm to about 250 mm. In some examples, an electrochemical stack may be about 80 to 100 mm wide, and about 100 to 130 mm long. In some examples, a ratio between length and width may be between about 1.2:1 and about 2.50:1. In some examples, the ratio may be between about 1.2:1 and 1.5:1.

In certain examples, the terminals or tabs may be bent. In certain other examples, the terminals or tabs may be folded. In some examples, the terminals or tabs may be bent or folded to reduce headspace.

In some examples, including any of the foregoing, the electrochemical cells on one side of the center wall comprise a cathode, wherein the electrochemical cells on the other side of the center wall comprise a second cathode, and wherein the cathode is thicker than the second cathode.

In some examples, including any of the foregoing, the electrochemical cells on one side of the center wall comprise a cathode, wherein the electrochemical cells on the other side of the center wall comprise a second cathode, and wherein the cathode has a higher energy density than the second cathode.

In some examples, including any of the foregoing, the electrochemical cells on one side of the center wall comprise a cathode, wherein the electrochemical cells on the other side of the center wall comprise a second cathode, and wherein the cathode provides greater power output than the second cathode.

In some examples, including any of the foregoing, the electrochemical cells on one side of the center wall comprise a cathode, wherein the electrochemical cells on the other side of the center wall comprise a second cathode, and wherein the cathode provides greater capacity than the second cathode.

In some examples, including any of the foregoing, a module comprises two or more of any of the electrochemical stacks and/or electrochemical stack assemblies set forth herein.

In some examples, including any of the foregoing, the module includes positive electrodes in each electrochemical cell, and wherein the thickness of the positive electrodes in at least one or more of the two or more electrochemical stack assemblies is greater than the thickness of the positive electrodes in the other electrochemical stack assemblies. In these examples, the thicker positive electrodes have more active material and a higher energy density. In these examples, the thinner positive electrodes have less active material and a higher power output.

In some examples, set forth herein is an Energy cell. An Energy cell is an electrochemical cell in a electrochemical stack assembly. In some examples, set forth herein is a Power cell. A Power cell is an electrochemical cell in a electrochemical stack assembly. An Energy cell is considered an Energy cell because it has a thicker positive electrode (i.e., more cathode active material, e.g., NMC, LFP, lithium titanium oxide (LTO), etc. . . . ) than a Power cell (i.e., less cathode active material). In some examples, a battery module includes one or more electrochemical stack assemblies in which some of the one or more electrochemical stack assemblies include Energy cells and the other electrochemical stack assemblies include Power cells. In some examples, a battery module includes one or more electrochemical stack assemblies in which each electrochemical stack assembly include a combination of Energy cells and Power cells. In some examples, a battery module includes one or more electrochemical stack assemblies in which each electrochemical stack assembly include a combination of Energy cells and Power cells, and further wherein there are more Energy cells than Power cells. In some other examples, a battery module includes one or more electrochemical stack assemblies in which each electrochemical stack assembly include a combination of Energy cells and Power cells, and further wherein there are more Power cells than Energy cells. The energy and capacity of these cells and modules are tailored, in some examples, to customer specifications and requirements.

In some examples, including any of the foregoing, the module includes positive electrodes in each electrochemical cell, and wherein the thickness of the positive electrodes in at least one or more of the two or more electrochemical stack assemblies is less than the thickness of the positive electrodes in the other electrochemical stack assemblies.

In some examples, including any of the foregoing, the module includes positive electrodes in each electrochemical cell, and wherein the thickness of the positive electrodes in at least one or more of the two or more electrochemical stack assemblies has greater energy density than the positive electrodes in the other electrochemical stack assemblies.

In some examples, including any of the foregoing, the module includes positive electrodes in each electrochemical cell, and wherein the positive electrodes in at least one or more of the two or more electrochemical stack assemblies has greater power output than the positive electrodes in the other electrochemical stack assemblies.

In some examples, including any of the foregoing, the module includes positive electrodes in each electrochemical cell, and wherein the positive electrodes in at least one or more of the two or more electrochemical stack assemblies has greater capacity than the positive electrodes in the other electrochemical stack assemblies.

In some examples, including any of the foregoing, the module includes positive electrodes in each electrochemical cell, and wherein positive electrodes in at least one or more of the two or more electrochemical stack assemblies have greater power output than the positive electrodes in the other electrochemical stack assemblies; and further wherein other positive electrodes in other at least one or more of the two or more electrochemical stack assemblies have greater energy density than the positive electrodes the electrochemical stack assemblies.

In some examples, including any of the foregoing, set forth herein are packs including a module set forth herein or combination of modules set forth herein.

For example, shown below are various electrochemical stack assemblies which may be used with the disclosure herein. This table is not meant to be limiting as other configurations are contemplated.

Contemplated herein are packs which include modules with a higher energy density than other modules in the same pack—so called Energy modules. Contemplated herein are packs which include modules which provide a higher power output than other modules in the same pack—so called Power modules. Contemplated herein are packs which include modules which have more capacity than other modules in the same pack. Provided herein is a pack including one type of module and another pack including another type of module wherein the pack has a higher energy density than the another pack. Provided herein is a pack including one type of module and another pack including another type of module wherein the pack has a higher power output than the another pack. Provided herein is a pack including one type of module and another pack including another type of module wherein the pack provides more capacity than the another pack.

In some examples, for a given electrochemical stack assembly having 16 layers or eight unit cells as described herein, the capacity (measured at C/3, 25° C.) is 1.35 Ah-1.65 Ah, the energy density (measured at C/3, 25° C.) is 5.2 Wh-6.2 Wh, the Specify energy is 45 Wh/kg-55 Wh/kg, the Energy density is 61 Wh/L-73 Wh/L, the Active stack specific energy is 155 Wh/kg-189 Wh/kg, and the Active Stack energy density is 520 Wh/L-634 Wh/L.

In some examples, for a given electrochemical stack assembly having 32 layers or 16 unit cells as described herein, the capacity (measured at C/3, 25° C.) is 1.7 Ah-3.2 Ah, the energy density (measured at C/3, 25° C.) is 10.4 Wh-12.4 Wh, the Specify energy is 90 Wh/kg-110 Wh/kg, the Energy density is 122 Wh/L-146 Wh/L, the Active stack specific energy is 310 Wh/kg-380 Wh/kg, and the Active Stack energy density is 1040 Wh/L-1268 Wh/L.

In some examples, for a given electrochemical stack assembly having 48 layers or 24 unit cells as described herein, the capacity (measured at C/3, 25° C.) is 7.7 Ah-9.3 Ah, the energy density (measured at C/3, 25° C.) is 29.7 Wh-34.1 Wh, the Specify energy is 167 Wh/kg-203 Wh/kg, the Energy density is 348 Wh/L-424 Wh/L, the Active stack specific energy is 288 Wh/kg+352 Wh/kg, and the Active Stack energy density is 983 Wh/L-1201 Wh/L.

In some examples, for a given electrochemical stack assembly having 60 layers or 30 unit cells as described herein, the capacity (measured at C/3, 25° C.) is 8 Ah-11 Ah, the energy density (measured at C/3, 25° C.) is 40 Wh-60 Wh, the Specify energy is 200 Wh/kg-300 Wh/kg, the Energy density is 400 Wh/L-450 Wh/L, the Active stack specific energy is 300 Wh/kg-400 Wh/kg, and the Active Stack energy density is 1000 Wh/L-1300 Wh/L.

In some examples, for a given electrochemical stack assembly having 72 layers or 36 unit cells as described herein, the capacity (measured at C/3, 25° C.) is 46 Ah-38 Ah, the energy density (measured at C/3, 25° C.) is 148 Wh-182 Wh, the Specify energy is 315 Wh/kg-386 Wh/kg, the Energy density is 880 Wh/L-1078 Wh/L, the Active stack specific energy is 372 Wh/kg-454 Wh/kg, and the Active Stack energy density is 1270 Wh/L-1553 Wh/L.

In some examples, for a given electrochemical stack assembly having 72 layers or 36 unit cells as described herein, the capacity (measured at C/3, 25° C.) is 37 Ah-45 Ah, the energy density (measured at C/3, 25° C.) is 140 Wh-171 Wh, the Specify energy is 308 Wh/kg-377 Wh/kg, the Energy density is 837-1023 Wh/L, the Active stack specific energy is 369 Wh/kg-451 Wh/kg, and the Active Stack energy density is 1270 Wh/L-1553 (Wh/L).

In some examples, for a given electrochemical stack assembly having 84 layers or 42 unit cells as described herein, the capacity (measured at C/3, 25° C.) is 50 Ah-60 Ah, the energy density (measured at C/3, 25° C.) is 250-50 Wh-6.2 Wh, the Specify energy is 45 Wh/kg-56 Wh/kg, the Energy density is 60 Wh/L-74 Wh/L, the Active stack specific energy is 154 Wh/kg-189 Wh/kg, and the Active Stack energy density is 519 Wh/L-634 Wh/L.

In some examples, for a given electrochemical stack assembly having 98 layers or 49 unit cells as described herein, the capacity (measured at C/3, 25° C.) is 33.6 Ah-41.1 Ah, the energy density (measured at C/3, 25° C.) is 129.5 Wh-158.3 Wh, the Specify energy is 266 Wh/kg-325 Wh/kg, the Energy density is 769 Wh/L-940 Wh/L, the Active stack specific energy is 312 Wh/kg-382 Wh/kg, and the Active Stack energy density is 1376 Wh/L-1125 Wh/L.

In some examples, for a given electrochemical stack assembly having 98 layers or 49 unit cells as described herein, the capacity (measured at C/3, 25° C.) is 32 Ah-39 Ah, the energy density (measured at C/3, 25° C.) is 123 Wh-150 Wh, the Specify energy is 260-318 Wh/kg, the Energy density is 733 Wh/L-895 Wh/L, the Active stack specific energy is 309 Wh/kg-377 Wh/kg, and the Active Stack energy density is 1376 Wh/L-1125 Wh/L.

Figure 8:
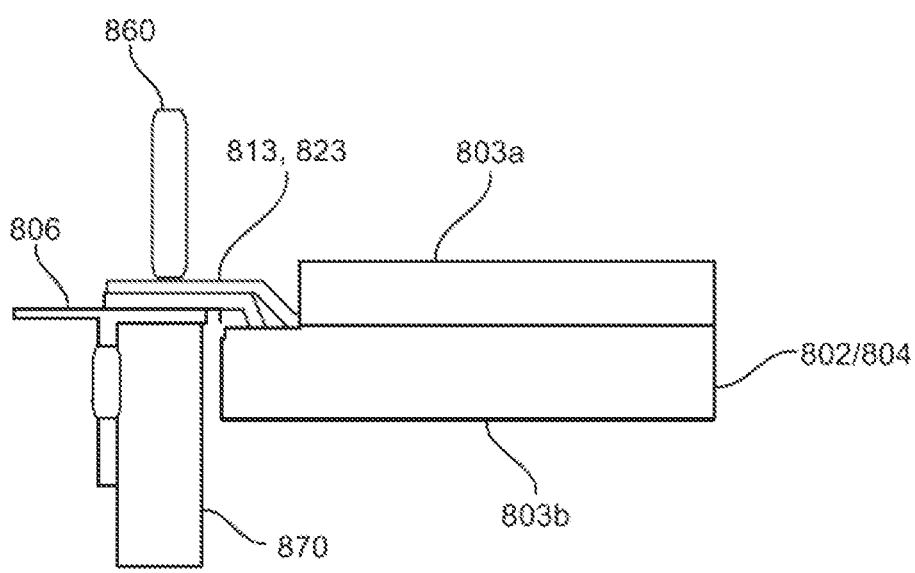
FIG. 8 is a diagram depicting welding of terminals on an electrochemical stack according to an embodiment.

FIG. 8 shows exemplary structure for welding a terminal to a cathode or an anode of an electrochemical stack according to an embodiment. In FIG. 8, a cathode 813 or anode 823 from each of electrochemical stacks 803a and 803b is pressed, along with formed terminal 806, between weld head 860 and anvil 870. Heat is applied to the weld head to weld the terminal 806 and the cathode(s) 813 or anode(s) 823. In FIG. 8, frame 802 or 804 surrounds electrochemical stack 803b, so that stack 803b is not visible in the Figure.

Figure 9A:
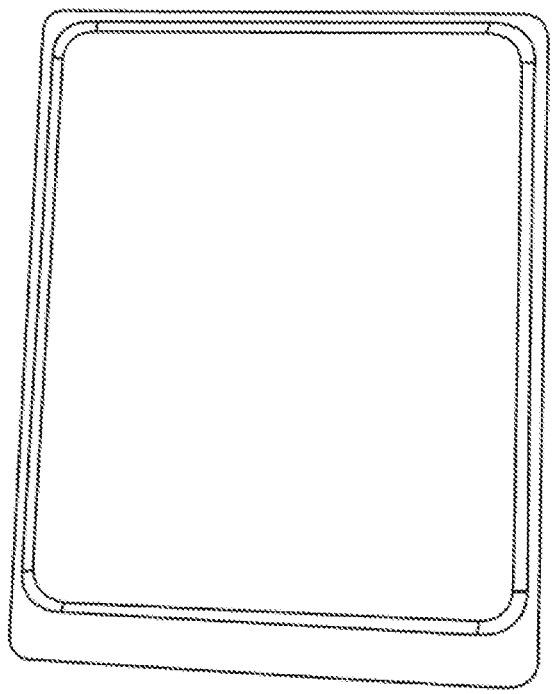
FIG. 9A is an image of a top or bottom of a laminated pouch.
Figure 9B:
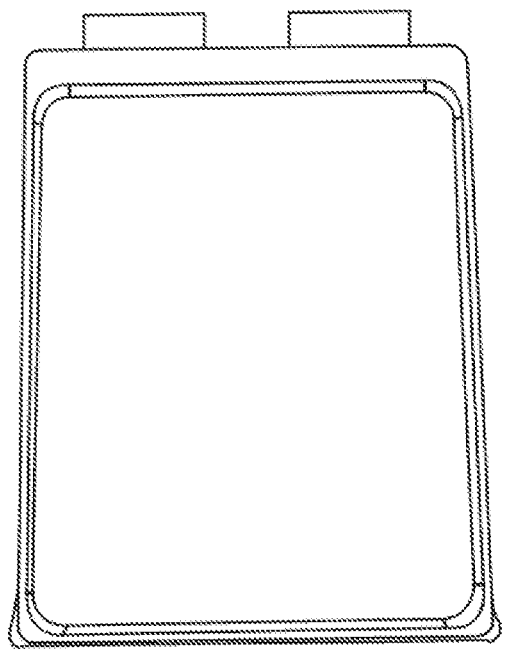
FIGS. 9B to 9D are images of a laminated pouch with a frame and an electrochemical stack inside the pouch according to an embodiment.
Figure 9C:
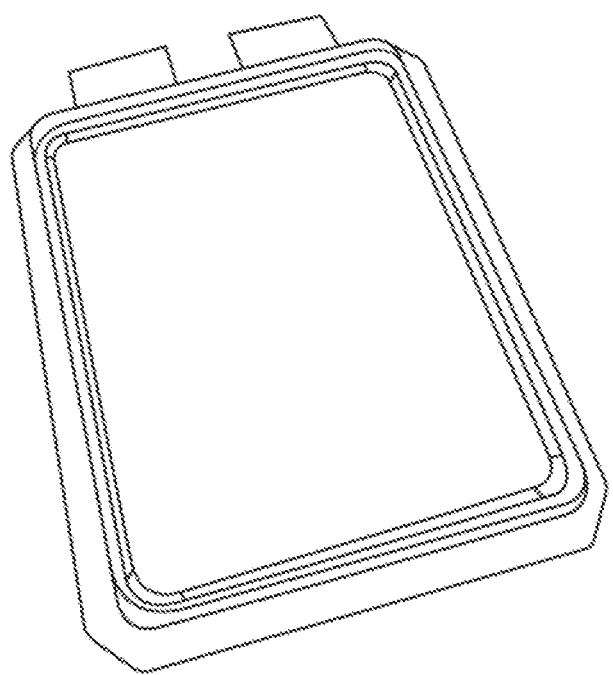
Figure 9D:
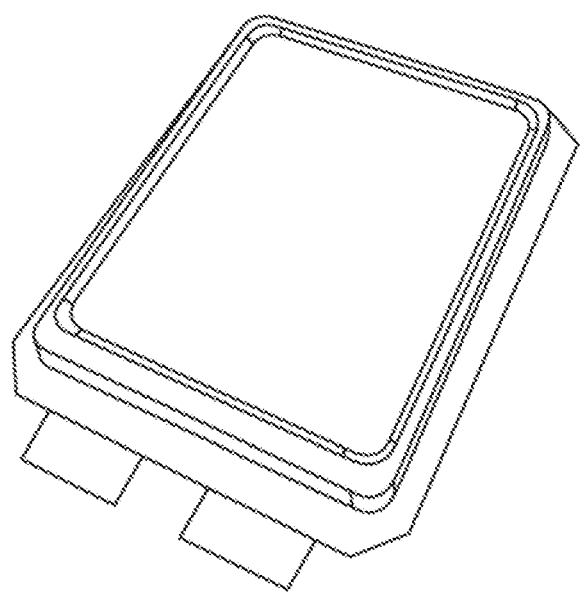

FIG. 9A shows an image of a top or a bottom portion of a laminated pouch. FIGS. 9B, 9C, and 9D show images of a laminated pouch that includes an electrochemical stack with a positive electrode terminal and a negative electrode terminal extending through the laminated pouch.

Figure 9E:
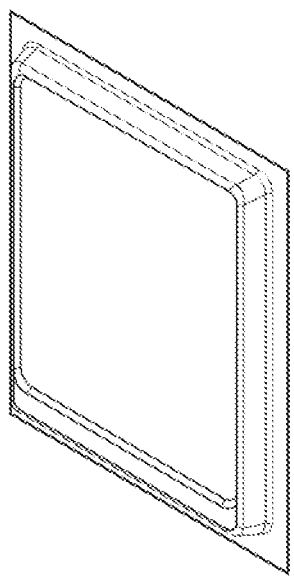
FIG. 9E shows a laminated plate which forms part of the laminated pouch according to an embodiment.
Figure 9F:
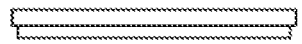
FIGS. 9F-9M show various details of the laminated plate according to an embodiment.
Figure 9G:
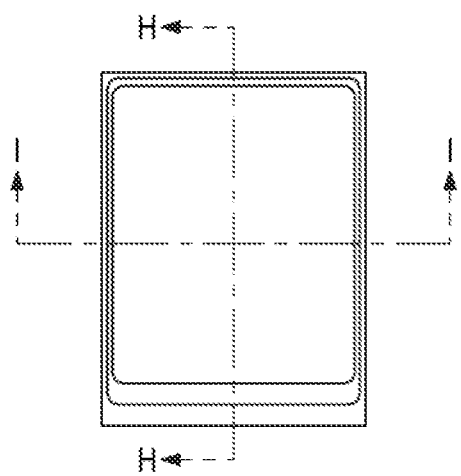
Figure 9H:
Figure 9I:
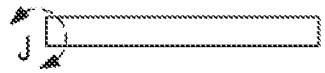
Figure 9J:
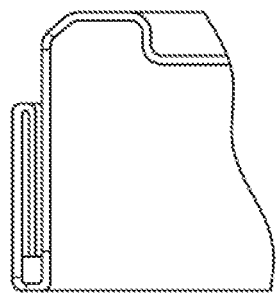

FIG. 9E shows another image of a top portion or a bottom portion of a laminated pouch. FIG. 9F depicts a side view of the top or bottom portion of the laminated, showing a width which in an embodiment may be about 70.5 mm. FIG. 9G is a top plan view of the pouch portion, with FIGS. 9H and 9I being cross-sections of FIG. 9G at lines H-H and I-I, respectively, showing further dimensions of an embodiment of the pouch portion. FIG. 9J shows a further detail of FIG. 9I at circled element J. The circled element is a fold or a bend which also is shown in detail in a different view in FIG. 9L.

Figure 9K:
Figure 9L:
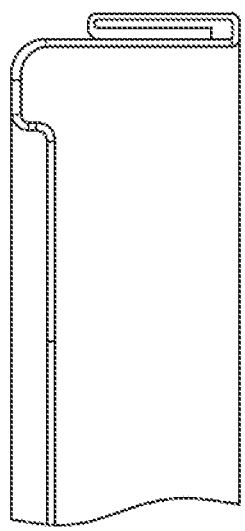
Figure 9M:
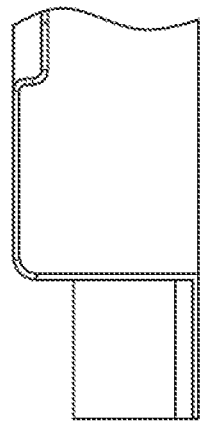

FIG. 9K shows some additional dimensions of the pouch portion according to an embodiment. FIGS. 9L and 9M show respective detailed views of circled elements L and M in FIG. 9H, also showing some further dimensions according to an embodiment.

Figure 9N:
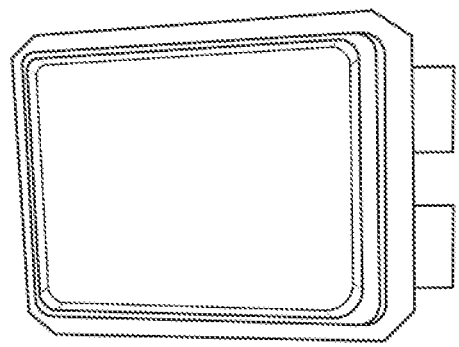
FIG. 9N shows a laminated pouch according to an embodiment.
Figure 9O:
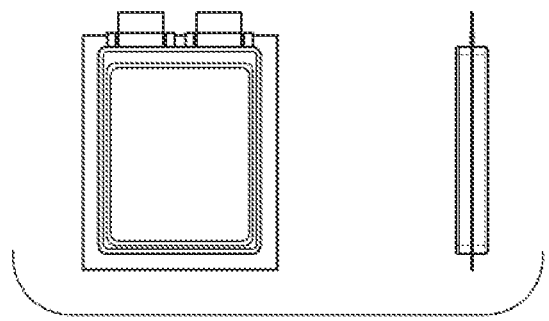
FIG. 9O shows exemplary dimensions of the laminated pouch of FIG. 9N.
Figure 9P:
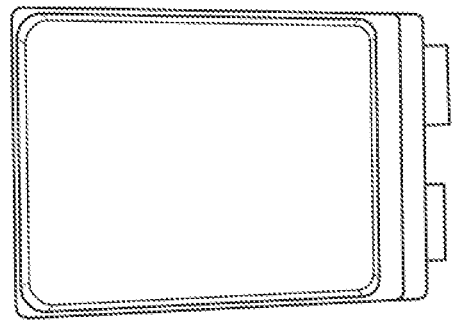
FIG. 9P shows a laminated pouch according to an embodiment.
Figure 9Q:
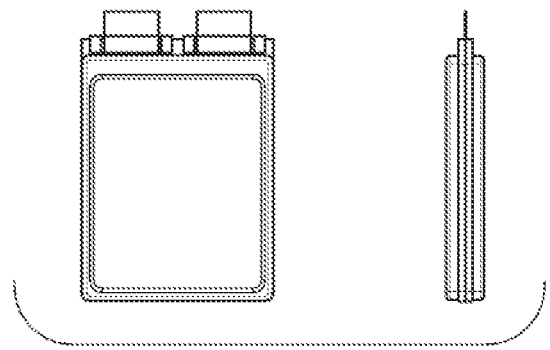
FIG. 9Q shows exemplary dimensions of the laminated pouch of FIG. 9P.

In an embodiment, as shown in FIG. 9N, sides of the laminated pouch portions may be left flat when the pouch is assembled around the frame. FIG. 9O shows exemplary dimensions. In an embodiment, as shown in FIG. 9P, one or more edges (in some cases, up to three edges) of the pouch portions may be rolled, in a manner not dissimilar to a "jelly roll" configuration of battery cells. Rolling up the edges can save space when placing the pouches inside a powered apparatus such as a motor vehicle. FIG. 9Q shows exemplary dimensions. With the edges rolled up, the length and width are smaller in FIGS. 9P and 9Q than in FIGS. 9N and 9O.

Figure 9R:
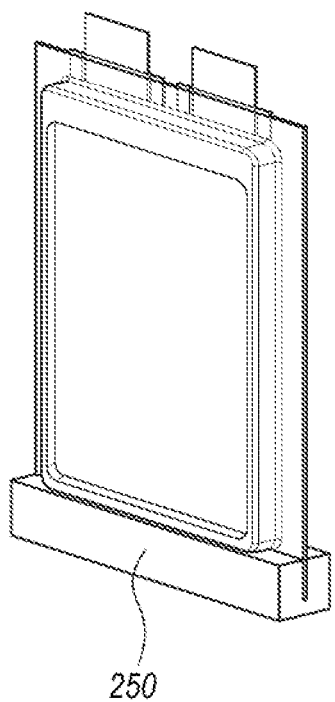
FIG. 9R shows a laminated pouch according to an embodiment.
Figure 9S:
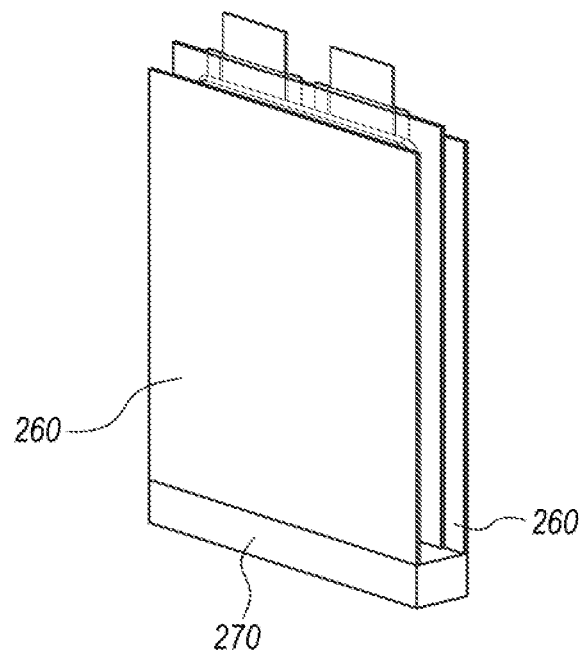
FIG. 9S shows exemplary dimensions of the laminated pouch of FIG. 9R.

In an embodiment, as shown in FIG. 9R, a side of the assembled laminated pouch opposite the electrodes may be left unrolled, and may be inserted into a slotted metal piece 250 to facilitate heat dispersion. In an embodiment, as shown in FIG. 9S, the sides of the assembled pouch may be inserted between flat metal pieces 260 on a base 270 to facilitate heat dispersion.

In some examples, including any of the foregoing, the dimensions of the inner portion of the frame are 65 mm×80 mm, which provides a 1 mm margin around the 64 mm×79 mm electrochemical stack. In an embodiment, the 1 mm margin is distributed equally around the four edges or minor surfaces of the electrochemical stack, yielding a 0.5 mm margin on each edge or minor surface of the electrochemical stack.

In some examples, including any of the foregoing, the dimensions of the inner portion of the frame are 64.75 mm×79.75 mm, which provides a 0.75 mm margin around the 64 mm×79 mm electrochemical stack. In an embodiment, the 0.75 mm margin is distributed equally around the four edges or minor surfaces of the electrochemical stack, yielding a 0.375 mm margin on each edge or minor surface of the electrochemical stack. In some examples, the dimension of the inner portion of the frame are 64.5 mm×79.5 mm, which provides a 0.5 mm margin around the 64 mm×79 mm electrochemical stack. In an embodiment, the 0.5 mm margin is distributed equally around the four edges or minor surfaces of the electrochemical stack, yielding a 0.25 mm margin on each edge or minor surface of the electrochemical stack. More generally, whatever the dimensions of the electrochemical stack which the frame surrounds, there may be a 0.75 mm margin around the stack, or a 0.5 mm margin around the stack. Ordinarily skilled artisans will appreciate that, depending on the dimensions of the electrochemical stack, there should be a suitable margin around the stack to accommodate expansion.

As noted earlier, a ratio of length to width of the electrochemical stack may be from about 1.2:1 to about 2.5:1. Spacing between the electrochemical stack and the frame may be provided as an absolute number, for example, from 0.5 mm to 2 mm, or as a percentage of the length and/or width, for example, from about 0.005% to 1%. Accordingly, in some examples an electrochemical stack may have larger dimensions than those discussed previously, with length to width ratios being as discussed above. In embodiments, the spacing will be distributed equally around the four edges of the electrochemical stack.

In some examples, including any of the foregoing, the thickness of the shape of the laminated pouch may be about 13.5 mm.

In some examples, including any of the foregoing, the at least one positive electrode terminal and at least one negative electrode terminal extend through the frame and the preformed pouch.

In some examples, including any of the foregoing, the laminated pouch is a multi-layer pouch. In some examples, the laminated pouch has a layer of aluminum with one or more layers of a polymeric material on either side of the aluminum. In some examples, the thickness of the layer of aluminum is 10 μm. In some examples, the thickness of the layer of aluminum is 20 μm. In some examples, the thickness of the layer of aluminum is 30 m. In some examples, the thickness of the layer of aluminum is 40 μm. In some examples, the thickness of the layer of aluminum is 50 μm. In some examples, the thickness of the layer of aluminum is 60 μm. In some examples, the thickness of the layer of aluminum is 70 m. In some examples, the thickness of the layer of aluminum is 80 μm. In some examples, the thickness of the layer of aluminum is 90 μm. In some examples, the thickness of the layer of aluminum is 100 μm.

Figure 10A:
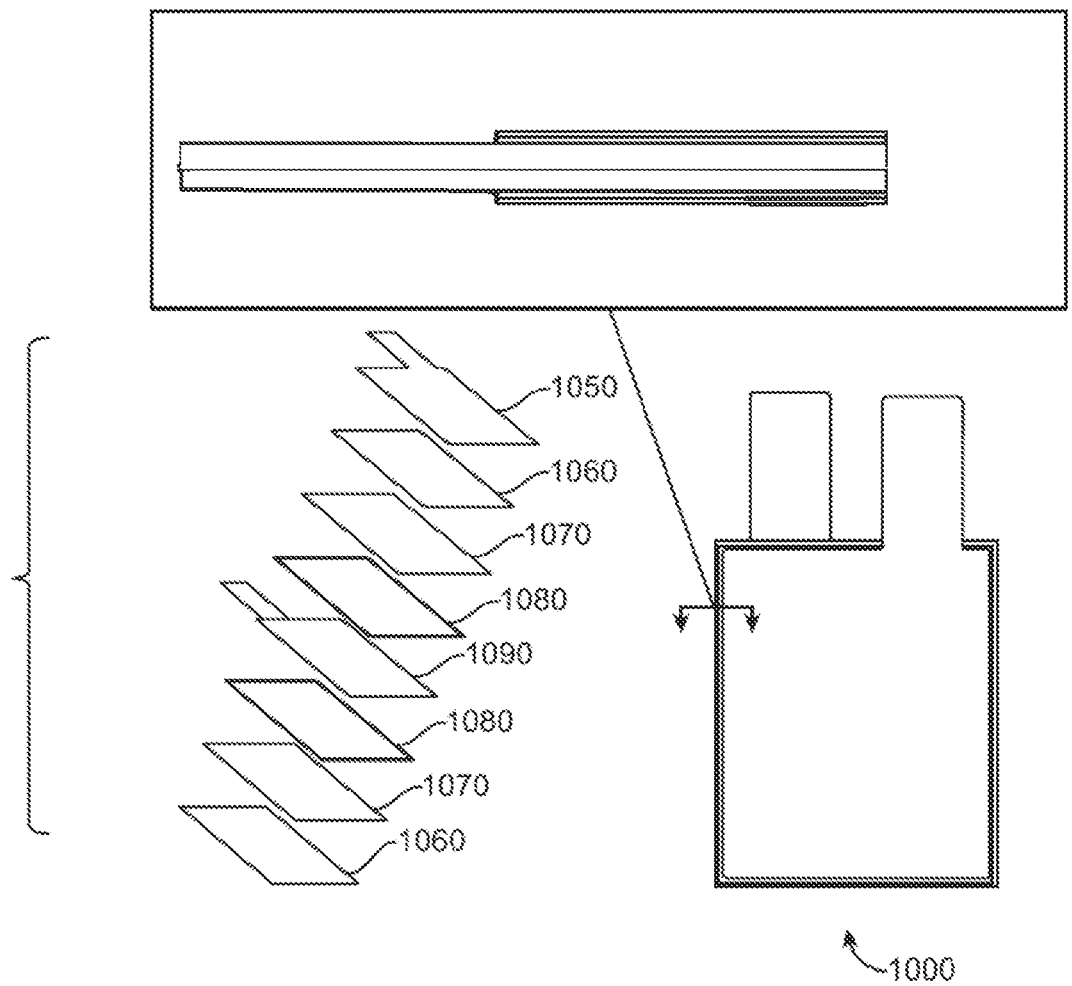
FIGS. 10A-10C are high level diagrams of structure for an electrochemical stack according to different embodiments, FIG. 10C also showing the bonding of an electrochemical stack to a frame.

FIG. 10A is a high level diagram of structure for an electrochemical stack according to an embodiment. In FIG. 10A, in an embodiment electrochemical stack 1000 includes an anode current collector 1050; a top seal 1060 beneath the anode current collector 1050 and a bottom seal 1060 at a bottom of the stack; a first film layer 1070 beneath the top seal 1060 and a second film layer 1080 above the bottom seal 1060; and a pair of cathode seals 1080 on either side of a double cathode 1090.

Figure 10B:
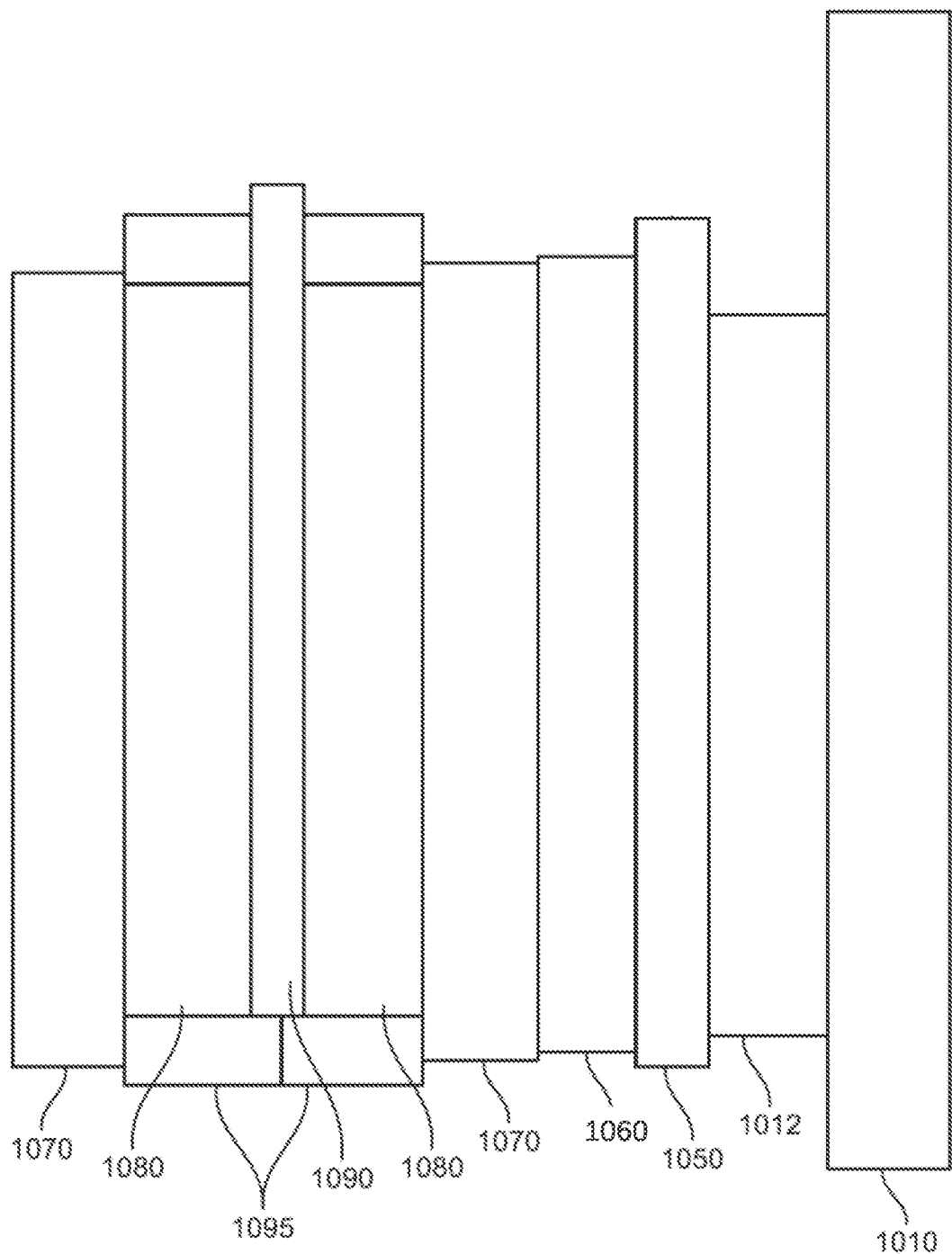

FIG. 10B is a high level diagram of structure of an electrochemical stack bonded to a frame center plate according to an embodiment. In FIG. 10B, going from right to left, the electrochemical stack is bonded to a center wall 1010 with a bond 1012 that may comprise a pressure-sensitive adhesive according to an embodiment. In an embodiment, center wall 1010 may be part of a frame. Anode current collector 1050 overlies the bond 1012. A seal 1060 overlies the anode 1050. A first film 1070 overlies the seal. Seals 1080 surround cathode 1090. A further film 1070 overlies the combination of the seals 1080 and cathode 1090. Depending on the embodiment, a frame 1095 may surround the cathode 1080.

Figure 10C:
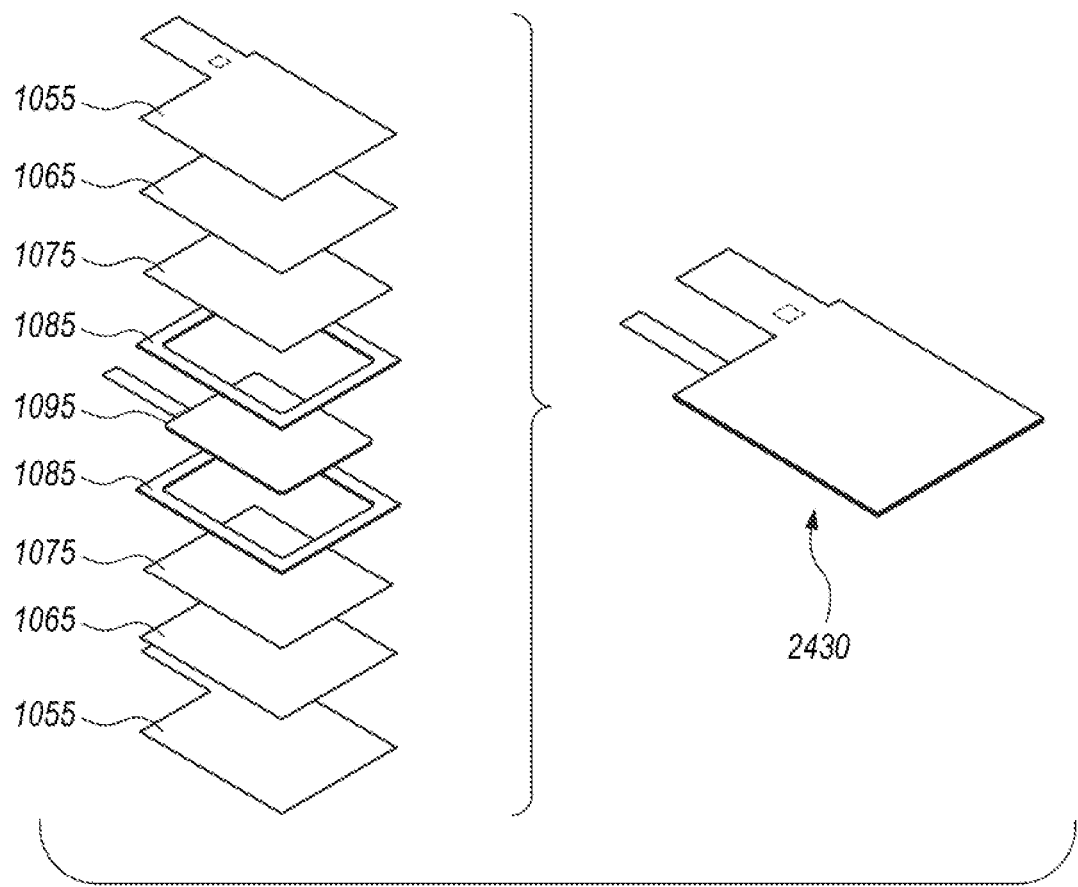

FIG. 10C is a high level diagram of a two-layer unit cell 2430 according to an embodiment. Anode current collectors 1055 are at the top and bottom of the electrochemical stack 2430. Anode supports 1065 are adjacent to the anodes 1055 and inside the anode current collectors 1055 as part of the electrochemical stack 2430. Separators 1075 lie inside the anode supports 1065 in the electrochemical stack 2430. Cathode frames 1085 lie inside the separators 1075. Finally, a cathode current collector 1095 lies at the middle of the electrochemical stack 2430, and works with both of the anodes 1055. Depending on the embodiment, the cathode current collector 1095 may fit within cathode frames 1085.

Figure 10D:
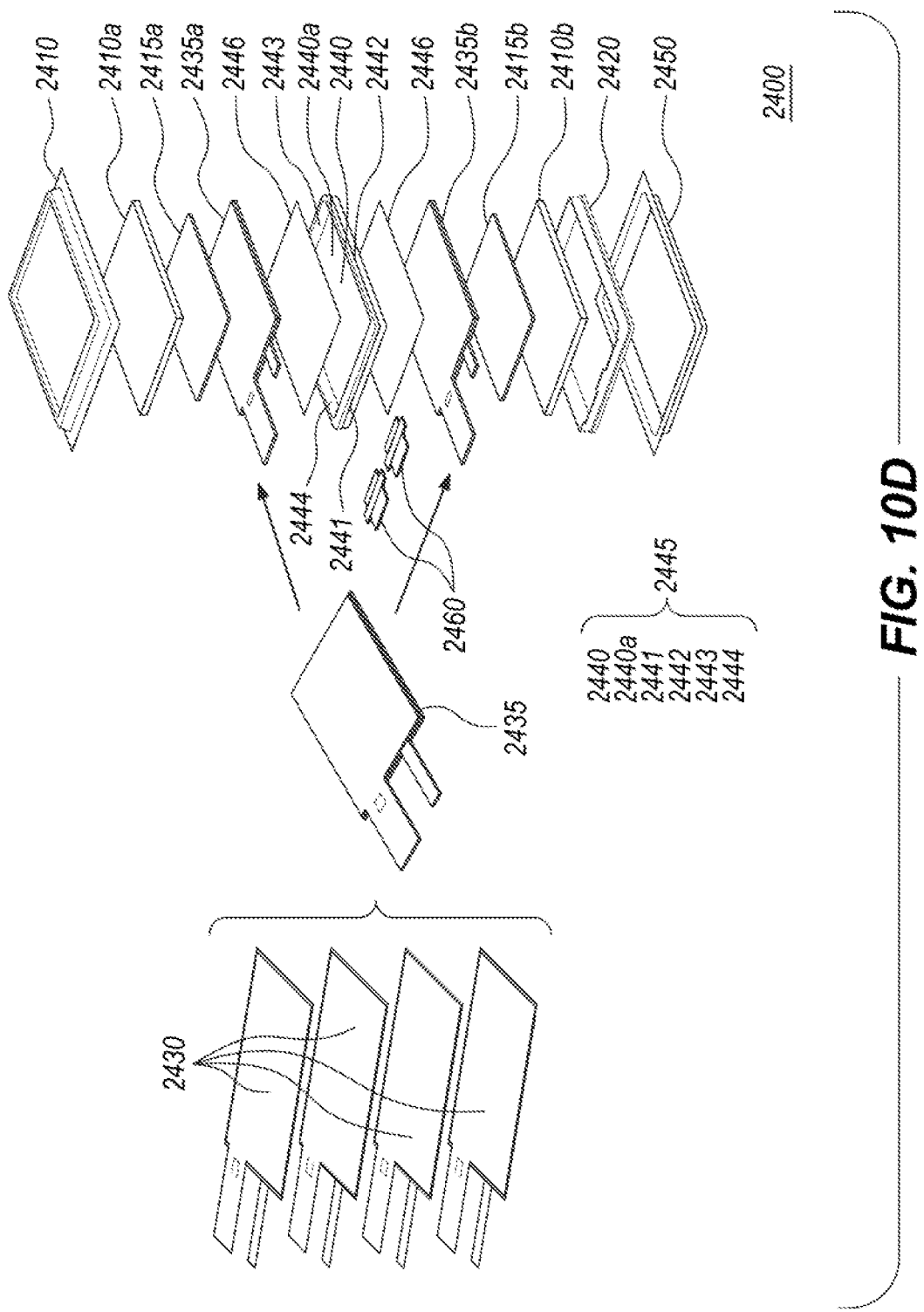
FIG. 10D is a high level diagram of structure for a laminated pouch that contains frames and electrochemical stacks according to an embodiment.

FIG. 10D is a high level exploded view of a prismatic-frame-in-pouch 2400 including unit cells such as those depicted in FIG. 10C according to an embodiment. In the embodiment of FIG. 10D, four unit cells 2430 are combined to form an eight-layer unit stack 2435. In different embodiments, there may be adhesive layers (not shown) between adjacent unit cells 2430, to facilitate keeping the unit cells 2430 in alignment with each other. In different embodiments, the unit cells 2430 may be combined without adhesive layers, with the pressure of the rest of the prismatic-frame-in-pouch 2400—including the pulling of vacuum inside the pouch, and the upper and lower laminated portions contacting the top and bottom of the frame and electrochemical stack assembly inside the pouch—keeping the unit cells 2430 in alignment with each other.

Looking further at FIG. 10D, laminate preforms 2410, 2450 form the upper and lower portions of the laminated pouch assembly 2400. Spacer block 2410*a* and compressible sheet 2415*a* shown as rubber according to an embodiment) underlie laminate preform 2410, and spacer block 2410*b* and compressible sheet 2415*b* overlie laminate preform 2450. In an embodiment, spacer block 2410*b* and compressible sheet 2415*b* lie within frame 2420. Eight-layer unit stack 2435*a* underlies the compressible sheet 2415, and eight-layer unit stack 2435*b* overlies compressible sheet 2415*b*. In the middle of the laminated pouch are frame portion 2440 with center plate or center plane 2440*a* and edges 2441-2444 extending upwardly from center plane 2440*a*, forming a tray 2445. Bonding layers 2446 may be provided on either side to adhere the respective eight-layer stacks 2435*a*, 2435*b* to center plane 2440*a*. In different embodiments, spacer blocks 2410*a* and 2410*b* may be compressible.

FIG. 10D depicts eight-layer unit stacks 2435*a*, 2435*b*, for a total of 16 cells. Other numbers of layers may be provided, depending on the embodiment, with different numbers of unit cells forming a unit stack. For example, two eight-layer stacks may be provided on either side of center plane 2440*a*, for a total of 32 cells. Alternatively, three eight-layer stacks may be provided on either side of center plane 2440*a*, for a total of 48 cells. Other numbers of eight-layer stacks may be provided on either side of center plane 2440*a*, depending on the embodiment. The numbers of unit cells in a stack also may vary. As noted elsewhere, there may be as many as 100 unit cells in a stack. Depending on the embodiment, all of the anode electrodes in a unit stack may be secured to each other, for example, by welding, and the same may be true for the cathode electrodes, again depending on the embodiment.

In some examples, including any of the foregoing, a solid-state electrolyte separator comprising a lithium-stuffed garnet electrolyte is included.

In some examples, including any of the foregoing, the negative electrode comprises lithium metal.

In some examples, including any of the foregoing, the electrochemical stack further includes a center wall.

In some examples, including any of the foregoing, the electrochemical stack further includes a center wall as shown in a number of figures, including FIGS. 2B, 3A-3D, 5A, and 5B.

In some examples, including any of the foregoing, the electrochemical stack further includes a center wall attached to one half of the frame.

In some examples, including any of the foregoing, the center wall is attached to either the positive electrode or negative electrode of the electrochemical stack.

In some examples, including any of the foregoing, the center wall is attached to either the positive electrode or negative electrode of the electrochemical stack with a pressure-sensitive-adhesive.

In some examples, including any of the foregoing, the frame includes a surface parallel to the major surfaces of the electrochemical stack.

In some examples, including any of the foregoing, the frame is attached to either the positive electrode or negative electrode of the electrochemical stack with a pressure-sensitive-adhesive.

Figure 11A:
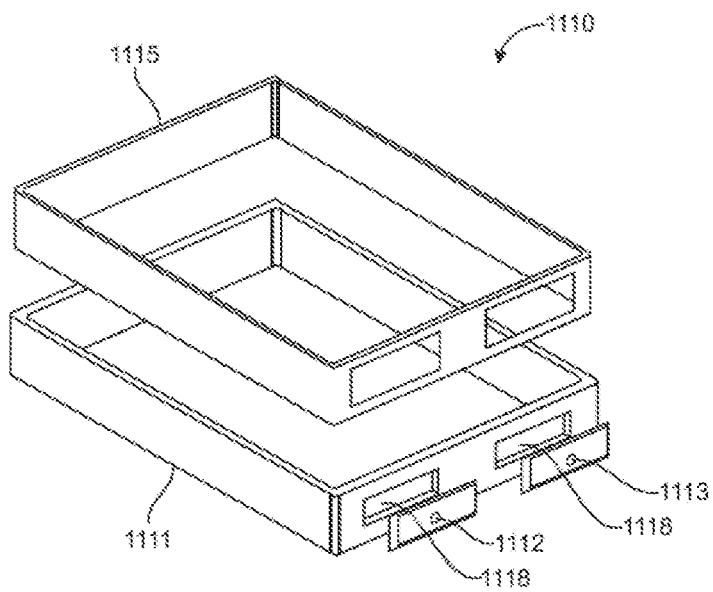
FIGS. 11A-11D are diagrams of frames according to different embodiments.

FIGS. 11A-11D are diagrams of frame assemblies according to different embodiments. FIG. 11A is an exploded view of frame assembly 1110, which includes a first frame section 1111 and a second frame section 1115. In an embodiment, frame section 1115 may nest inside frame section 1111. In an embodiment, frame section 1111 may nest inside frame section 1115. In an embodiment, frame section 1111 may be a suitable plastic, and insert 1115 may be a suitable metal.

Also in FIG. 11A, tabs 1112, 1113 fit over openings 1118 in frame sections 1111 and 1115. In an embodiment, these tabs 1112, 1113 contact a cathode and an anode, respectively, in an electrochemical stack that sits within the frame 1110.

Figure 11B:
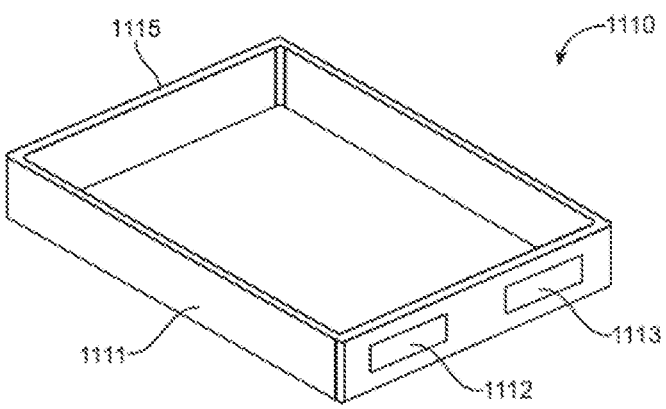

FIG. 11B is an assembled view of frame assembly 1110, with frame portions 1111 and 1115 nested, one inside the other, and tabs 1112, 1113 inserted in the openings in the frame portions 1111 and 1115.

Figure 11C:
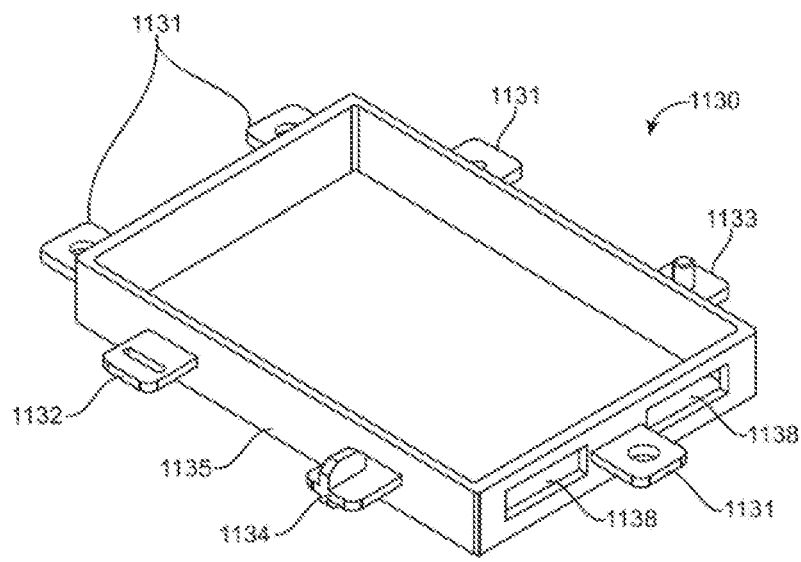
Figure 11D:
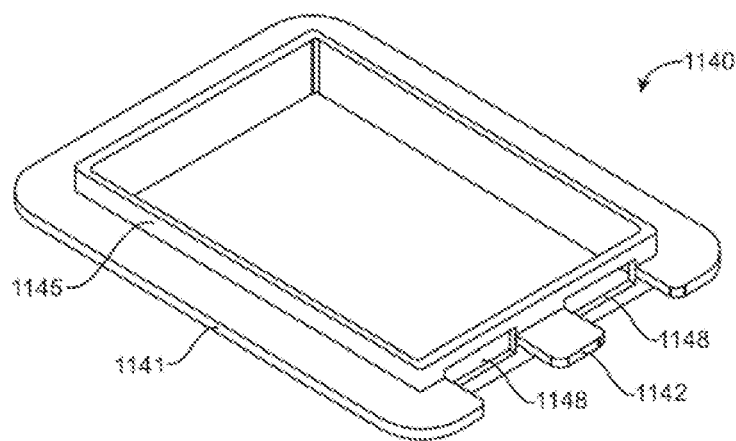

FIGS. 11C and 11D show two embodiments of an outer portion of a frame assembly. In FIG. 11C, outer frame portion 1130 has four different kinds of protrusions. Protrusions 1131 have tabs extending from rectangular portion 1135. The tabs have through-holes. Protrusions 1132 are tabs with indentations therein. Protrusions 1133 are tabs with cylindrical portions extending upwardly therefrom. Depending on the embodiment, the extending portions may have different cross-sections. For example, protrusions 1134 are tabs with protrusions of rectangular cross section extending upwardly therefrom. All of these configurations may be useful in attaching laminated pouches to each other, or to an interior of an area that may hold one or more laminated pouches. FIG. 11C also has openings 1138 to enable connection with a cathode and an anode, respectively, in an electrochemical stack located within the frame assembly.

In FIG. 11D, outer frame portion 1140 has a flange-shaped portion 1141 extending outwardly, around most of the periphery of a rectangular portion 1145 that surrounds an electrochemical stack. A protrusion 1142 also extends from the rectangular portion 1145. FIG. 11D also has openings 1148 to enable connection with a cathode and an anode, respectively, in an electrochemical stack located within the frame assembly.

Figure 12:
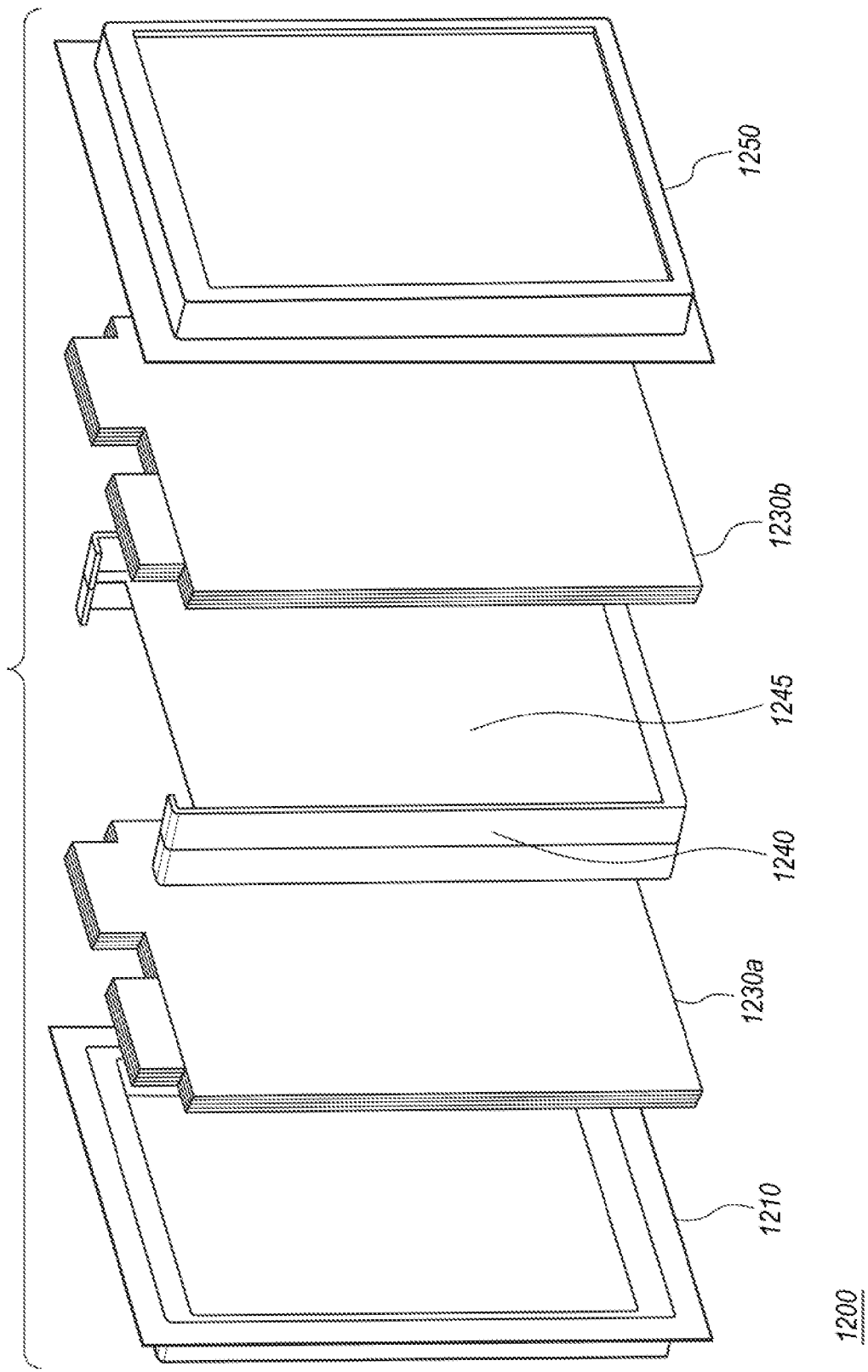
FIG. 12 is an exploded view of a prismatic-frame-in-pouch according to an embodiment.

FIG. 12 shows an exploded view of an assembly 1200. Assembly 1200 includes upper and lower laminate portions 1210, 1250 which may comprise flexible layered polymer which may be similar to materials described with respect to other embodiments. Inside the laminate portions 1210, 1250 are two stacks of cells 1230a, 1230b. The cell layers 1230a, 1230b sit on either side of a center plate 1245 which is part of a metal frame 1240. When assembled, cells 1230a, 1230b are wrapped within a pouch constituted by the upper and lower laminate portions 1210, 1250. When the pouch is vacuum sealed (i.e. when a vacuum is pulled within the pouch), the cells 1230a, 1230b may be packed firmly on either side of center plate 1245.

When fully discharged, all of the Li within a cell sits in the cathode. The cell itself has no Li in the anode. Consequently, the cell is in its most compressed state. In this state, the face of the cell sits slightly below the frame 1240, in some embodiments, one or two mm. As each cell charges and the anodes of each of the cell layers are plated with Li, the respective cell stack expands. The flexible packaging material expands with the stack, eventually becoming flush with the frame of the cell.

In an embodiment, as each cell charges, anodes of each of the layers are plated with pure Li, causing the layers to expand, and each respective stack to expand. As the layers expand, the outside walls of each cell 1230a, 1230b expand with them, eventually reaching the edge of the frame 1240. This frame 1240 protects the edges of each cell, allowing cells to be packed tightly together without the expansion of one cell affecting the next. As each cell discharges, the layers contract back into their respective cell. As a result, as each cell cycles, the assembly 1200 can appear to breathe.

As a result of the structure described in the various embodiments, cells which are part of laminate over frame assemblies are able to dissipate excess heat during charging, including fast charging. The cells can function with or without externally supplied pressure.

While the exterior walls of each cell 1230a, 1230b can expand, the center plate 1245 can wick heat away from the middle of the laminate over frame assembly, carrying the heat from an interior of each cell to the frame 1240. The frame 1240 then can be cooled from the top, bottom, or side, depending on the pack configuration. In connection with the cooling function described herein, it should be noted that pure Li is a much better conductor of heat than is graphite in conventional EV batteries.

In some examples, including any of the foregoing, a thickness of the center plate (referred to variously as a center plate, a center plane, a center wall, and in some instances a bonding plate, as noted above) may be 0.3 mm. In some examples, including any of the foregoing, a thickness of the center plate (referred to variously as a center plate, a center plane, a center wall, and in some instances a bonding plate, as noted above) may be 0.4 mm. In some examples, including any of the foregoing, a thickness of the center plate (referred to variously as a center plate, a center plane, a center wall, and in some instances a bonding plate, as noted above) may be 0.5 mm. In some examples, including any of the foregoing, a thickness of the center plate (referred to variously as a center plate, a center plane, a center wall, and in some instances a bonding plate, as noted above) may be 0.6 mm. In some examples, including any of the foregoing, a thickness of the center plate (referred to variously as a center plate, a center plane, a center wall, and in some instances a bonding plate, as noted above) may be 0.7 mm. In some examples, including any of the foregoing, a thickness of the center plate (referred to variously as a center plate, a center plane, a center wall, and in some instances a bonding plate, as noted above) may be 0.8 mm. In some examples, including any of the foregoing, a thickness of the center plate (referred to variously as a center plate, a center plane, a center wall, a flat plate, and in some instances a bonding plate, as noted above) may be 0.9 mm. In some examples, including any of the foregoing, a thickness of the center plate (referred to variously as a center plate, a center plane, a center wall, a flat plate, and in some instances a bonding plate, as noted above) may be 1.0 mm. In some examples, including any of the foregoing, a thickness of the center plate (referred to variously as a center plate, a center plane, a center wall, a flat plate, and in some instances a bonding plate, as noted above) may be 1.1 mm. In some examples, including any of the foregoing, a thickness of the center plate (referred to variously as a center plate, a center plane, a center wall, a flat plate, and in some instances a bonding plate, as noted above) may be 1.2 mm. In some examples, including any of the foregoing, a thickness of the center plate (referred to variously as a center plate, a center plane, a center wall, a flat plate, and in some instances a bonding plate, as noted above) may be 1.3 mm. In some examples, including any of the foregoing, a thickness of the center plate (referred to variously as a center plate, a center plane, a center wall, a flat plate, and in some instances a bonding plate, as noted above) may be 1.4 mm. In some examples, including any of the foregoing, a thickness of the center plate (referred to variously as a center plate, a center plane, a center wall, a flat plate, and in some instances a bonding plate, as noted above) may be 1.5 mm. In some examples, including any of the foregoing, a thickness of the center plate (referred to variously as a center plate, a center plane, a center wall, a flat plate, and in some instances a bonding plate, as noted above, and also as a flat plate) may be 1.6 mm.

Figure 13B:
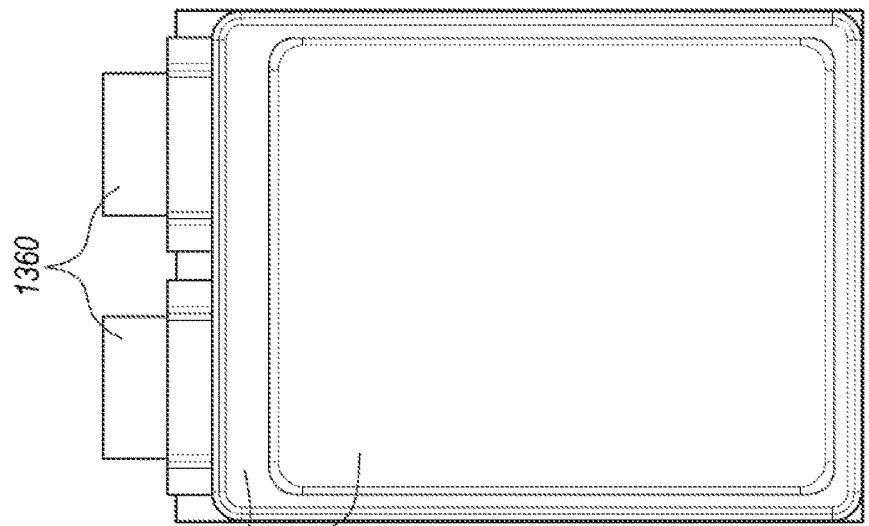
FIGS. 13A-13C show a frame and cell assembly according to an embodiment.
Figure 13A:
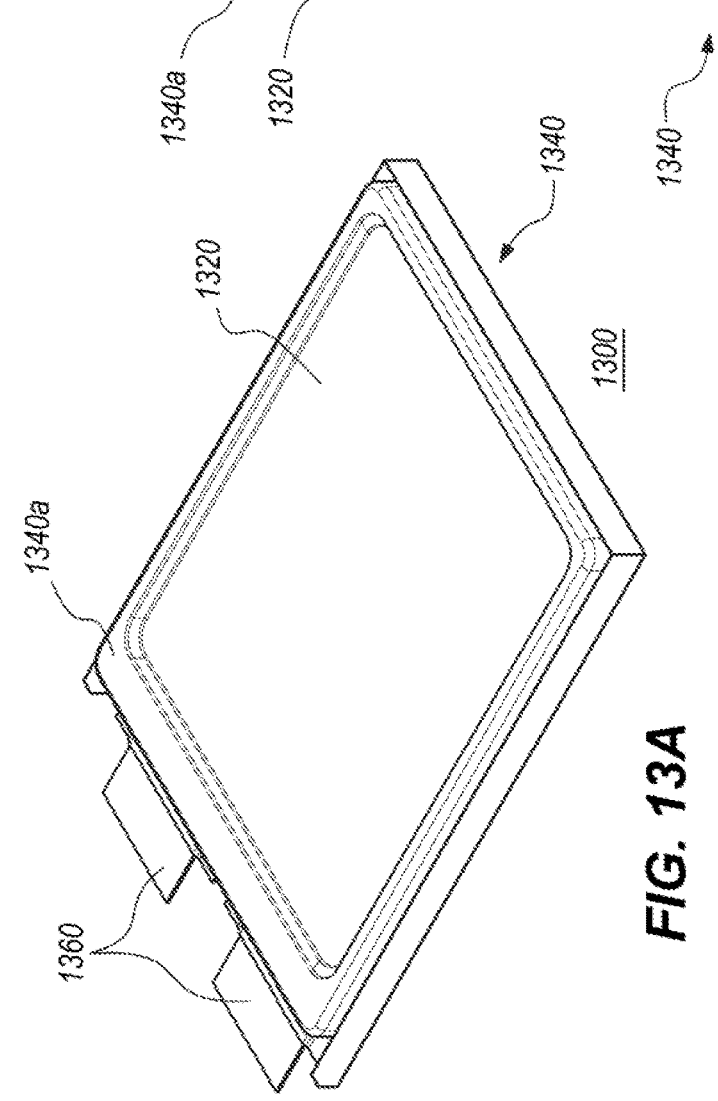
Figure 13C:
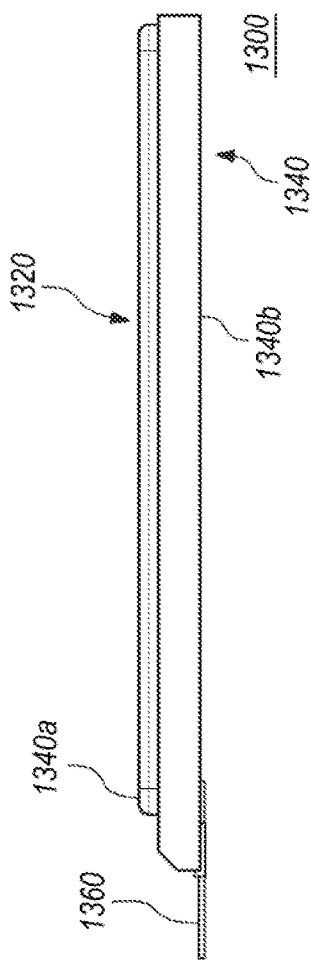

FIGS. 13A-13C show views of a half-stack flat-plate design for an electrochemical stack assembly 1300 according to an embodiment. In an embodiment, an active cell stack 1320 sits on one surface 1340a of a flat plate 1340, and is surrounded by a frame 1350. An opposing surface 1340b of flat plate 1340 is a bottom facing side of this design according to an embodiment. Unlike previously described embodiments, in which a center plate or center wall has cell stacks on opposing surfaces, according to an embodiment as in FIGS. 13A-13C, only one active cell stack sits on flat plate 1340, such that opposing surface 1340b conducts heat only from that active cell stack 1320. A laminated pouch (not shown) surrounds the frame 1350, the flat plate 1340, and the active cell stack. With this type of configuration, cooling is more effective, not only because one cell stack is being cooled instead of two, but also because the opposite surface 1340b, within a laminate pouch (not shown), may be mounted easily, for example, on a surface of a device to be powered, thereby providing yet further heat transfer capability.

In an embodiment, two electrochemical stack assemblies as shown in FIGS. 13A-13C can be positioned so that the opposing surfaces 1340b of flat plates 1340 in the respective assemblies face each other, and can be joined. A laminated pouch (not shown) surrounds the two electrochemical stack assemblies.

In an embodiment, electrodes 1360 protrude near the opposite surface. The electrodes 1360 can be soldered without needing to specially bend them. Overall, configurations according to the described embodiment facilitate mounting of the resulting pack and, as noted earlier, facilitates heat transfer.

In some examples, including any of the foregoing, the just-described half-stack flat-plate may be placed inside a laminated pouch as variously described above. In some examples, including any of the foregoing, two half-stack flat-plates may be placed back to back, with their respective flat plates facing each other, or contacting each other, with the two flat plates forming a center wall, or center plate, or center plane for the overall prismatic-frame-in-pouch. Ordinarily skilled artisans will appreciate that the previously-described center wall/center plate/center plane thicknesses may apply to the flat plates.

Methods of Making Electrochemical Stacks in Pouches

Set forth herein are new methods for protecting a prismatic battery cell with a perimeter (mechanical structure) frame. The prismatic battery cell may be in a stack of cells which are vacuumed, seam-sealed, and in a laminated pouch. The laminated pouch may have electrical terminals protruding outside of the laminated pouch. The resulting prismatic-frame-in-pouch protects the prismatic battery cell.

In some embodiments, a cell comprising a solid-state cathode is packaged in an electrochemical stack disclosed herein.

In some embodiments, a cell comprising a cathode, wherein the cathode comprises a solid-state catholyte, is packaged in an electrochemical stack disclosed herein.

In certain examples, an electrochemical stack is provided which includes a series of electrochemical cells arranged in series.

In certain other examples, an electrochemical stack is provided which includes a series of electrochemical cells arranged in parallel.

In some examples, including any of the foregoing, the electrochemical cells include a lithium-metal negative electrode.

In some examples, including any of the foregoing, the electrochemical cells include a solid-state electrolyte.

In some examples, including any of the foregoing, the electrochemical cells include a solid-state electrolyte separator comprising a lithium-stuffed garnet.

Positive electrode terminals are attached to the electrochemical stack.

Negative electrode terminals are attached to the electrochemical stack.

The electrochemical stack is bonded by way of a pressure-sensitive adhesive to a bonding plate which is also part of one half of the frame.

In certain examples, the electrochemical stack is attached at either top major surface 101 or bottom major surface 102 to a surface on the frame by way of a pressure-sensitive adhesive (PSA) material. This PSA holds the stack by way of either top major surface 101 or bottom major surface 102 to a surface from moving within the frame during charging and discharging. The PSA keeps the minor surfaces of the electrochemical stack from touching the frame. In certain examples, top major surface 101 is bonded to the frame at the center wall shown as 302 in FIG. 3A. In certain examples, bottom major surface 102 is bonded to the frame at the center wall shown as 302 in FIG. 3A.

The other half of the frame is connected to and attached to the above one half of the frame.

A laminate is manufactured into a formed shape. In some examples, the shape matches the shape of the electrochemical stack.

In some examples, including any of the foregoing, the laminate has multiple layers. In certain examples, the laminate has five layers. In some of these examples, the multiple layers include a polyester (PET) layer that is adjacent to an oriented nylon (ONy) layer. The ONy layer is adjacent to an aluminum layer. The aluminum layer is adjacent to a non-adhesive sealing chemical bond polyphthalamide (PPa) layer. The PPa layer is adjacent to a polypropylene (PP) layer. In some examples, the order of these layers may be varied. In some examples, there may be more than five layers, some or all of which may be one or more of the five just-mentioned materials. In some examples, including any of the foregoing, there may be fewer than five layers, some or all of which may be one or more of the five just-mentioned materials.

In some examples, including any of the foregoing, the polymeric materials on either side of the aluminum may comprise one or more of polypropylene (PP), polyphthalamide (PPa), polyethylene terephthalate (PET), and oriented nylon (ONy).

In some examples, including any of the foregoing, the thickness of the layer of PP is 10 µm. In some examples, including any of the foregoing, the thickness of the layer of PP is 20 µm. In some examples, including any of the foregoing, the thickness of the layer of PP is 30 µm. In some examples, including any of the foregoing, the thickness of the layer of PP is 40 µm. In some examples, including any of the foregoing, the thickness of the layer of PP is 50 µm. In some examples, including any of the foregoing, the thickness of the layer of PP is 60 µm. In some examples, including any of the foregoing, the thickness of the layer of PP is 70 µm. In some examples, including any of the foregoing, the thickness of the layer of PP is 80 µm. In some examples, including any of the foregoing, the thickness of the layer of PP is 90 µm. In some examples, including any of the foregoing, the thickness of the layer of PP is 100 µm.

In some examples, including any of the foregoing, the thickness of the layer of PPa is 10 µm. In some examples, including any of the foregoing, the thickness of the layer of PPa is 20 µm. In some examples, including any of the foregoing, the thickness of the layer of PPa is 30 µm. In some examples, including any of the foregoing, the thickness of the layer of PPa is 40 µm. In some examples, including any of the foregoing, the thickness of the layer of PPa is 50 µm. In some examples, including any of the foregoing, the thickness of the layer of PPa is 60 µm. In some examples, including any of the foregoing, the thickness of the layer of PPa is 70 µm. In some examples, including any of the foregoing, the thickness of the layer of PPa is 80 µm. In some examples, including any of the foregoing, the thickness of the layer of PPa is 90 µm. In some examples, including any of the foregoing, the thickness of the layer of PPa is 100 µm.

In some examples, including any of the foregoing, the thickness of the layer of ONy is 10 µm. In some examples, including any of the foregoing, the thickness of the layer of ONy is 20 µm. In some examples, including any of the foregoing, the thickness of the layer of ONy is 30 µm. In some examples, including any of the foregoing, the thickness of the layer of ONy is 40 µm. In some examples, including any of the foregoing, the thickness of the layer of ONy is 50 µm. In some examples, including any of the foregoing, the thickness of the layer of ONy is 60 µm. In some examples, including any of the foregoing, the thickness of the layer of ONy is 70 µm. In some examples, including any of the foregoing, the thickness of the layer of ONy is 80 µm. In some examples, including any of the foregoing, the thickness of the layer of ONy is 90 µm. In some examples, including any of the foregoing, the thickness of the layer of ONy is 100 µm.

In some examples, including any of the foregoing, the thickness of the layer of PET is 10 µm. In some examples, including any of the foregoing, the thickness of the layer of PET is 20 µm. In some examples, including any of the foregoing, the thickness of the layer of PET is 30 µm. In some examples, including any of the foregoing, the thickness of the layer of PET is 40 µm. In some examples, including any of the foregoing, the thickness of the layer of PET is 50 µm. In some examples, including any of the foregoing, the thickness of the layer of PET is 60 µm. In some examples, including any of the foregoing, the thickness of the layer of PET is 70 µm. In some examples, including any of the foregoing, the thickness of the layer of PET is 80 µm. In some examples, including any of the foregoing, the thickness of the layer of PET is 90 µm. In some examples, including any of the foregoing, the thickness of the layer of PET is 100 µm.

In some examples, including any of the foregoing, the thickness of the PET layer is about 12 µm. In some examples, including any of the foregoing, the thickness of the ONy layer is about 25 µm. In some examples, including any of the foregoing, the thickness of the aluminum layer is about 40 µm. In some examples, including any of the foregoing, the thickness of the aluminum layer is about 80 µm. In some examples, including any of the foregoing, the thickness of the PPa layer is about 30 µm. In some examples, including any of the foregoing, the thickness of the PP layer is about 30 µm.

In some examples, including any of the foregoing, the thickness of the PET layer is about 12 µm. In some examples, including any of the foregoing, the thickness of the ONy layer is about 25 µm. In some examples, including any of the foregoing, the thickness of the aluminum layer is about 40 µm. In some examples, including any of the foregoing, the thickness of the aluminum layer is about 60 µm. In some examples, including any of the foregoing, the thickness of the PPa layer is about 40 µm. In some examples, including any of the foregoing, the thickness of the PP layer is about 40 µm.

The PP layer is the layer which from one laminate form to another laminate form in order to form the laminate pouch. Each sheet of laminate is placed face-to-face with the PP layer of each sheet touching. Then, heat is applied to the area to be bonded. The PP layers melt into each other and thus form a pouch.

In some examples, including any of the foregoing, the thickness of the laminate, including all layers, is 100-200 µm. In some examples, including any of the foregoing, the thickness of the laminate, including all layers, is 140-190 µm. In some examples, including any of the foregoing, the thickness of the laminate, including all layers, is 150-175 µm. In some examples, including any of the foregoing, the thickness of the laminate, including all layers, is 160-185 µm.

In some examples, including any of the foregoing, the thickness of the laminate, including all layers, is 140 µm. In some examples, including any of the foregoing, the thickness of the laminate, including all layers, is 141 µm. In some examples, including any of the foregoing, the thickness of the laminate, including all layers, is 142 µm. In some examples, including any of the foregoing, the thickness of the laminate, including all layers, is 143 µm. In some examples, including any of the foregoing, the thickness of the laminate, including all layers, is 144 µm. In some examples, including any of the foregoing, the thickness of the laminate, including all layers, is 145 µm. In some examples, including any of the foregoing, the thickness of the laminate, including all layers, is 146 µm. In some examples, including any of the foregoing, the thickness of the laminate, including all layers, is 147 µm. In some examples, including any of the foregoing, the thickness of the laminate, including all layers, is 148 µm. In some examples, including any of the foregoing, the thickness of the laminate, including all layers, is 149 µm. In some examples, including any of the foregoing, the thickness of the laminate, including all layers, is 150 µm. In some examples, including any of the foregoing, the thickness of the laminate, including all layers, is 151 µm. In some examples, including any of the foregoing, the thickness of the laminate, including all layers, is 152 µm. In some examples, including any of the foregoing, the thickness of the laminate, including all layers, is 153 µm. In some examples, including any of the foregoing, the thickness of the laminate, including all layers, is 154 µm. In some examples, including any of the foregoing, the thickness of the laminate, including all layers, is 155 µm. In some examples, including any of the foregoing, the thickness of the laminate, including all layers, is 156 µm. In some examples, including any of the foregoing, the thickness of the laminate, including all layers, is 157 µm. In some examples, including any of the foregoing, the thickness of the laminate, including all layers, is 158 µm. In some examples, including any of the foregoing, the thickness of the laminate, including all layers, is 159 µm. In some examples, including any of the foregoing, the thickness of the laminate, including all layers, is 160 µm. In some examples, including any of the foregoing, the thickness of the laminate, including all layers, is 161 µm. In some examples, including any of the foregoing, the thickness of the laminate, including all layers, is 162 µm. In some examples, including any of the foregoing, the thickness of the laminate, including all layers, is 163 µm. In some examples, including any of the foregoing, the thickness of the laminate, including all layers, is 164 µm. In some examples, including any of the foregoing, the thickness of the laminate, including all layers, is 165 µm. In some examples, including any of the foregoing, the thickness of the laminate, including all layers, is 166 µm. In some examples, including any of the foregoing, the thickness of the laminate, including all layers, is 167 µm. In some examples, including any of the foregoing, the thickness of the laminate, including all layers, is 168 µm. In some examples, including any of the foregoing, the thickness of the laminate, including all layers, is 169 m. 6n some examples, including any of the foregoing, the thickness of the laminate, including all layers, is 170 m. In some examples, including any of the foregoing, the thickness of the laminate, including all layers, is 171 µm. In some examples, including any of the foregoing, the thickness of the laminate, including all layers, is 172 µm. In some examples, including any of the foregoing, the thickness of the laminate, including all layers, is 173 µm. In some examples, including any of the foregoing, the thickness of the laminate, including all layers, is 174 m. In some examples, including any of the foregoing, the thickness of the laminate, including all layers, is 175 µm. In some examples, including any of the foregoing, the thickness of the laminate, including all layers, is 176 µm. In some examples, including any of the foregoing, the thickness of the laminate, including all layers, is 177 µm. In some examples, including any of the foregoing, the thickness of the laminate, including all layers, is 178 µm. In some examples, including any of the foregoing, the thickness of the laminate, including all layers, is 179 µm. In some examples, including any of the foregoing, the thickness of the laminate, including all layers, is 180 µm. In some examples, including any of the foregoing, the thickness of the laminate, including all layers, is 181 µm. In some examples, including any of the foregoing, the thickness of the laminate, including all layers, is 182 µm. In some examples, including any of the foregoing, the thickness of the laminate, including all layers, is 183 µm. In some examples, including any of the foregoing, the thickness of the laminate, including all layers, is 184 µm. In some examples, including any of the foregoing, the thickness of the laminate, including all layers, is 185 µm. In some examples, including any of the foregoing, the thickness of the laminate, including all layers, is 186 µm. In some examples, including any of the foregoing, the thickness of the laminate, including all layers, is 187 µm. In some examples, including any of the foregoing, the thickness of the laminate, including all layers, is 188 µm. In some examples, including any of the foregoing, the thickness of the laminate, including all layers, is 189 µm. In some examples, including any of the foregoing, the thickness of the laminate, including all layers, is 190 m. The laminate is sealed to another laminate in order to form a pouch.

The laminate is manufactured from a flat sheet form. This form is placed in a pneumatic press. A die and a cavity are used to transform the flat sheet into a pre-formed shape. This includes debossing the form to raise part of the laminate up and away from the laminate surface as well as embossing the form to push part of the laminate down and away from the laminate surface. A combination of deboss and emboss is used to form the shape in the laminate. By forming a shape in the laminate, the laminate does not need to deform against either major surface of the electrochemical stack when a vacuum is pulled on a sealed laminate. The laminate is thus pre-stressed during its manufacture so no stress is concentrated on the electrochemical stack when the laminate is stretched over the frame. As the laminate is pulled over the frame, a draft angle is present as the laminate stretches over the frame. This draft angle in part provides space between the laminate and the electrochemical stack so that the laminate only contacts one or both of the major surface of the electrochemical stack.

In some examples, including any of the foregoing, a pneumatic press machine with a forming die and cavity is used.

The laminate is sealed. This bonded seal may be made by a heat sealing method. In some heat sealing methods, two hot metal bars press two laminate pouch pieces together until a polymer layer on each laminate melts and bonds (e.g., welds) the two sheets together.

A vacuum is pulled on the sealed laminate so the draft angles collapse against the frame but not against the minor surfaces of the electrochemical stack. After pulling a vacuum in the sealed laminate, the pre-formed portion of the laminate will take the shape of the frame.

EXAMPLES

Example 1—Vibration Test—Prophetic Example

To ensure that the electrochemical stack does not move laterally within the frame, wherein a lateral movement in this example is a movement perpendicular to the direction by which the electrochemical stack expands and contracts, a vibration test is used. Lateral movement would be a movement in the x- or y-plane if the z-direction is taken as normal to top or bottom major surfaces 101 and 102 in FIG. 1.

An electrochemical stack is provided.

A vibration test in accordance with UN 38.3 is performed. This test includes:

7 Hz-200 Hz sine sweep;
3 hours duration for each of 3 axes;
1 g from 7-18 Hz; and
8 g from 18-200 Hz.

This test is found in ST/SG/AC.10/11/Rev.6—Recommendations on the TRANSPORT $O_F$ DANGEROUS GOODS, Manual of Tests and Criteria, $6^{th}$ revised edition, United Nations, New York and Geneva, 2015.

UN 38.3 covers a wide range of "transportation of hazardous materials" testing, which includes the following:

Altitude simulating;
Thermal Test;
Vibration;
Shock;
External short circuit;
Impact and crush;
Over voltage; and
Forced discharge.

Example 2-Vibration Test—Working Example

To ensure that the electrochemical stack does not move laterally within the frame, wherein a lateral movement in this example is a movement perpendicular to the direction by which the electrochemical stack expands and contracts, a vibration test is used. Lateral movement would be a movement in the x- or y-plane if the z-direction is taken as normal to top or bottom major surfaces, 101 and 102, in FIG. 1.

The laminate over frame (LOF) laminate sheet tester is a machine that replicates the forces and movement of a sheet of pre-formed laminate in a way that simulates how the laminate would respond to an actual LOF battery 20% growth in the z-direction during charge and discharge cycles. The tester simulates the expansion and contraction of the electrochemical stack with a plunger that applies approximately 75 pounds of force against the inside of the laminate. The laminate test machine simplifies the process of evaluating different laminate construction and manufacturing layering adhesion techniques.

In one example test, the laminate included a layer of aluminum that was 40 µm thick. In a second example test, the laminate included a layer of aluminum that was 80 µm thick.

At 1000 cycles, the 40 µm aluminum had a fatigue fracture and failed. The 80 µm aluminum thick sample survived 1000 cycles.

The fatigue fracture was observed by shining light from the back (backlit) and inspecting the laminate at high resolution (VHX-6000 Camera) for fatigue fracture.

A dummy electrochemical cell was provided with the aforementioned plunger apparatus as a substitute for an electrochemical cell that would expand and contract. A frame and laminated pouch in accordance with an embodiment shown in FIG. 2A was provided. The frame included a center wall to which the plunger was attached with a pressure-sensitive-adhesive. The plunger was cycled 2.5 mm to simulate a "z" volume change. The cycles were run at 5 minutes per cycle. The laminated pouch was sealed under vacuum (15 PSI). The pouch was D-EL80 6PH (3). There were unexpectedly no signs of degradation after 1000 cycles for the laminate with an 80 µm aluminum layer.

Another dummy electrochemical cell was provided wherein a plunger apparatus was substituted for an electrochemical cell that would expand and contract. A frame and laminated pouch in accordance with an embodiment shown FIG. 2A was provided. The frame included a center wall to which the plunger was attached with a pressure-sensitive-adhesive. The plunger was cycled 2.5 mm to simulate a "z" volume change. The cycles were run at 30 seconds per cycle. The laminated pouch was sealed under vacuum (15 PSI). The pouch was D-EL80 6PH (3). There were unexpectedly no signs of degradation after 5000 cycles.

Aspects of the present invention are set out in the following clauses:

CLAUSE 1. An electrochemical stack assembly comprising:
- one or more electrochemical cells, each electrochemical cell comprising a solid-state electrolyte to form at least one electrochemical stack with two major surfaces and four minor surfaces;
- a frame surrounding the at least one electrochemical stack with space between the frame and each of the four minor surfaces; and
- a laminated pouch surrounding the frame and the at least one electrochemical stack, the laminated pouch in contact with one or both of the two major surfaces.

CLAUSE 2. The electrochemical stack assembly of clause 1, further comprising a center wall, and an adhesive to adhere the center wall to one of the two major surfaces, wherein the laminated pouch is in contact with the other of the two major surfaces.

CLAUSE 3. The electrochemical stack assembly of clause 2, wherein the adhesive comprises a pressure sensitive adhesive.

CLAUSE 4. The electrochemical stack assembly of clause 2 or clause 3, wherein the center wall comprises a thermally conductive material.

CLAUSE 5. The electrochemical stack assembly of any of clauses 2 to 4, wherein the one or more electrochemical cells form at least two electrochemical stacks, each having two major surfaces and four minor surfaces, each of the at least two electrochemical stacks having one of the two major surfaces adhered to the center wall.

CLAUSE 6. The electrochemical stack assembly of any of clauses 1 to 5, further comprising at least one positive electrode terminal and at least one negative electrode terminal.

CLAUSE 7. The electrochemical stack assembly of any of clauses 1 to 6, wherein the frame is at a negative electrical potential or a positive electrical potential.

CLAUSE 8. The electrochemical stack assembly of any of clauses 1 to 6, wherein the frame is at a positive electrical potential.

CLAUSE 9. The electrochemical stack assembly of any of clauses 1 to 8, further comprising an insulating material to insulate the frame.

CLAUSE 10. The electrochemical stack assembly of any of clauses 1 to 9, wherein the frame comprises material selected from the group consisting of plastic, plastic with thermal additives, rubber, ceramic, clay, glass, tempered glass, thermoplastics, carbon fiber, metal-plastic composites, aluminum, anodized aluminum, magnesium, magnesium-copper alloy, or aluminum-copper alloy, or combinations thereof.

CLAUSE 11. The electrochemical stack assembly of any of clauses 1 to 10, wherein the space between the frame and the four minor surfaces of the at least one electrochemical stack or each of the at least two electrochemical stacks prevents the application of force by the laminated pouch to the four minor surfaces of the at least one electrochemical stack or each of the at least two electrochemical stacks during charge and discharge cycles of the at least one electrochemical stack or at least two electrochemical stacks and thereby prevents deformation, cracking, or otherwise damaging the solid-state electrolyte in each of the one or more electrochemical cells.

CLAUSE 12. The electrochemical stack assembly of any of clauses 1 to 11, wherein an interior of the laminated pouch is under vacuum such that the laminated pouch contacts one or both of the two major surfaces of the at least one electrochemical stack.

CLAUSE 13. The electrochemical stack assembly of any of clauses 1 to 12, wherein an interior of the laminated pouch is under vacuum such that the laminated pouch contacts one of the two major surfaces of each of the at least two electrochemical stacks.

CLAUSE 14. The electrochemical stack assembly of any of clauses 1 to 13, wherein an interior of the laminated pouch is under vacuum such that the laminated pouch contacts both of the two major surfaces of the at least one electrochemical stack.

CLAUSE 15. The electrochemical stack assembly of any of clauses 1 to 14, wherein the space between the frame and the at least one electrochemical stack or the at least two electrochemical stacks provides space for the at least one electrochemical stack or the at least two electrochemical stacks to expand and contract during a charge and discharge cycle without deforming, cracking, or otherwise damaging the solid-state electrolyte in each of the one or more electrochemical cells.

CLAUSE 16. The electrochemical stack assembly of any of clauses 1 to 14, wherein the space between the frame and the at least one electrochemical stack provides space for the at least one electrochemical stack to expand during a charge cycle without deforming, cracking, or otherwise damaging the solid-state electrolyte in each of the one or more electrochemical cells.

CLAUSE 17. The electrochemical stack assembly of any of clauses 1 to 16, wherein the laminated pouch provides about 20% of expansion and contraction in a direction normal to at least one of the two major surfaces of the at least one electrochemical stack or the at least two electrochemical stacks.

CLAUSE 18. The electrochemical stack assembly of any of clauses 1 to 17, wherein a distribution of pressure across the two major surfaces of the at least one electrochemical stack or the at least two electrochemical stacks is uniform across a surface area of 10 $mm^2$, 10 $cm^2$, or 10 $m^2$.

CLAUSE 19. The electrochemical stack assembly of any of clauses 1 to 17, wherein a distribution of pressure across the two major surfaces of the at least one electrochemical stack or the at least two electrochemical stacks is uniform across a surface area of 20 $mm^2$, 20 $cm^2$, or 20 $m^2$.

CLAUSE 20. The electrochemical stack assembly of any of clauses 1 to 17, wherein a distribution of pressure across the two major surfaces of the at least one electrochemical stack or the at least two electrochemical stacks is uniform across a surface area of 30 $mm^2$, 30 $cm^2$, or 30 $m^2$.

CLAUSE 21. The electrochemical stack assembly of any of clauses 1 to 20, wherein the laminated pouch conforms around the frame.

CLAUSE 22. The electrochemical stack assembly of any of clauses 1 to 21, wherein the laminated pouch retains its shape when an interior of the laminated pouch is under vacuum.

CLAUSE 23. The electrochemical stack assembly of any of clauses 1 to 22, wherein the laminated pouch is sealed and an interior of the laminated pouch is under vacuum.

CLAUSE 24. The electrochemical stack assembly of any of clauses 1 to 23, wherein the laminated pouch applies 78 pounds of force per unit area on both of the two major surfaces of the at least one electrochemical stack or each of the two major surfaces of each of the at least two electrochemical stacks.

CLAUSE 25. The electrochemical stack assembly of any of clauses 1 to 24, wherein a vacuum provides up to 14.7 pounds per square inch (PSI) of atmospheric pressure on the two major surfaces of the at least one electrochemical stack or one of the two major surfaces of each of the at least two electrochemical stacks.

CLAUSE 26. The electrochemical stack assembly of any of clauses 1 to 26, wherein the laminated pouch comprises a pair of laminate forms with facing surfaces forming a seam, the facing surfaces being bonded with a seal at the seam.

CLAUSE 27. The electrochemical stack assembly of any of clauses 1 to 27, wherein the vacuum in the laminated pouch is less than 10 Torr.

CLAUSE 28. The electrochemical stack assembly of any of clauses 1 to 28, wherein the frame comprises material selected from the group consisting of metal, plastic, rubber, silicone, or combinations thereof.

CLAUSE 29. The electrochemical stack assembly of any of clauses 1 to 29, wherein the laminated pouch has a formed shape with two major surfaces.

CLAUSE 30. The electrochemical stack assembly of clause 29, wherein the ratio of the surface area of each of the two major surfaces of the formed shape on the laminated pouch to the surface area of each of the two major surfaces of the at least one electrochemical stack or the at least two electrochemical stacks is greater than 1.

CLAUSE 31. The electrochemical stack assembly of clause 29 or 30, wherein the ratio of the surface area of each of the two major surfaces of the formed shape on the laminated pouch to the surface area of each of the two major surfaces of the at least one electrochemical stack or the at least two electrochemical stacks is greater than 1.1.

CLAUSE 32. The electrochemical stack assembly of any of clauses 29 to 31, wherein the ratio of the surface area of each of the two major surfaces of the formed shape on the laminated pouch to the surface area of each of the two major surfaces of the at least one electrochemical stack or the at least two electrochemical stacks is greater than 1.2.

CLAUSE 33. The electrochemical stack assembly of any of clauses 1 to 32, wherein each of the two major surfaces of the at least one electrochemical stack is rectangular and has dimensions of 64 mm×79 mm.

CLAUSE 34. The electrochemical stack assembly of any of clauses 29 to 33, wherein a thickness of the formed shape of the laminated pouch is about 20% of the thickness of the at least one electrochemical stack or the at least two electrochemical stacks.

CLAUSE 35. The electrochemical stack assembly of clause 34, wherein the thickness of the formed shape of the laminated pouch is 13.5 mm.

CLAUSE 36. The electrochemical stack assembly of any of clauses 6 to 35, wherein the at least one positive electrode terminal and at least one negative electrode terminal extend through the frame and the laminated pouch.

CLAUSE 37. The electrochemical stack assembly of any of clauses 1 to 36, wherein each electrochemical cell comprises a solid-state electrolyte separator.

CLAUSE 38. The electrochemical stack assembly of clause 37, wherein the solid-state electrolyte separator comprises a sintered lithium-stuffed garnet electrolyte.

CLAUSE 39. The electrochemical stack assembly of any of clauses 6 to 38, wherein the negative electrode comprises lithium metal.

CLAUSE 40. The electrochemical stack assembly of any of clauses 2 to 39, wherein the frame comprises a first frame portion and a second frame portion, the second frame portion including a center wall to which one of the two major surfaces of the at least one electrochemical stack or one of the two major surfaces of each of the at least two electrochemical stacks is attached.

CLAUSE 41. The electrochemical stack assembly of any of clauses 2 to 40, wherein one major surface of one of the at least two electrochemical stacks is attached to one surface of the center wall, and one major surface of the other of the at least two electrochemical stacks is attached to the other surface of the center wall.

CLAUSE 42. The electrochemical stack assembly of any of clauses 40 to 41, wherein the center wall is attached to either the positive electrode or the negative electrode of the at least one electrochemical stack.

CLAUSE 43. The electrochemical stack assembly of any of clauses 40 to 42, further comprising a pressure-sensitive adhesive to attach the center wall of the frame to either the positive electrode or the negative electrode of the at least one electrochemical stack.

CLAUSE 44. The electrochemical stack assembly of any of clauses 6 to 43, further comprising a pressure-sensitive adhesive to attach the frame to either the positive electrode or negative electrode of the at least one electrochemical stack.

CLAUSE 45. The electrochemical stack assembly of any of clauses 1 to 44, wherein the frame comprises a metal insert and a surrounding plastic portion.

CLAUSE 46. The electrochemical stack assembly of clause 45, wherein the surrounding plastic portion comprises a plurality of protrusions disposed around a perimeter of the surrounding plastic portion.

CLAUSE 47. The electrochemical stack assembly of clause 45, wherein the surrounding plastic portion comprises a flange portion along at least three sides.

CLAUSE 48. The electrochemical stack assembly of clause 6, wherein the at least one positive electrode terminal and at least one negative electrode terminal are flat.

CLAUSE 49. The electrochemical stack assembly of clause 6, wherein the at least one positive electrode terminal and at least one negative electrode terminal are bent.

CLAUSE 50. The electrochemical stack assembly of clause 6, wherein the at least one positive electrode terminal and at least one negative electrode terminal have a Z-bend.

CLAUSE 51. The electrochemical stack assembly of clause 6, wherein the at least one positive electrode terminal and at least one negative electrode terminal are folded.

CLAUSE 52. The electrochemical stack assembly of any of clauses 2 to 51, wherein the frame comprises a first frame portion including a first center wall to which one of the major surfaces of each of at least two electrochemical stacks is attached, and a second frame portion including a second center wall to which the other of the major surfaces of the other of the at least two electrochemical stacks is attached.

CLAUSE 53. The electrochemical stack assembly of clause 52, wherein the first and second frame portions are positioned with respect to each other such that the first and second center walls can come into contact with each other.

CLAUSE 54. The electrochemical stack assembly of clause 52 or 53, wherein the first frame portion is rectangular, and comprises four edges protruding upwardly from the first center wall so as to form a first tray which holds a first electrochemical stack, and wherein the second frame portion is rectangular, and comprises four edges protruding upwardly from the second center wall so as to form a second tray which holds a second electrochemical stack.

CLAUSE 55. The electrochemical stack assembly of any of clauses 52 to 54, wherein one of the four edges of the first tray contains at least a first pair of elongate openings, and one of the four edges of the second tray contains at least a second pair of elongate openings.

CLAUSE 56. The electrochemical stack assembly of clause 55, further comprising a first piece extending over the first pair of elongate openings, and a second piece extending over the second pair of elongate openings.

CLAUSE 57. The electrochemical stack assembly of clause 55 or clause 56, wherein an anode and a cathode of each of said first and second electrochemical stacks extends through a respective pair of said elongate openings.

CLAUSE 58. The electrochemical stack assembly of any of clauses 52 to 54, wherein one of the four edges of the first tray contains a first elongate opening, and one of the four edges of the second tray contains a second elongate opening.

CLAUSE 59. The electrochemical stack assembly of clause 58, further comprising a first piece extending over the first elongate opening to define a first pair of elongate openings, and a second piece extending over the second elongate opening to define a second pair of elongate openings.

CLAUSE 60. The electrochemical stack assembly of clause 58 or clause 59, wherein an anode and a cathode of each of said first and second electrochemical stacks extends through a respective pair of elongate openings.

CLAUSE 61. The electrochemical stack assembly of any of clauses 1 to 60, wherein each electrochemical stack comprises at least two cells.

CLAUSE 62. The electrochemical stack assembly of any of clauses 1 to 61, wherein each electrochemical stack comprises at least four cells.

CLAUSE 63. The electrochemical stack assembly of any of clauses 1 to 62, wherein each electrochemical stack comprises at least eight cells.

CLAUSE 64. The electrochemical stack assembly of any of clauses 1 to 63, wherein each electrochemical stack comprises as many as 100 cells.

CLAUSE 65. The electrochemical stack assembly of any of clauses 2 to 64, wherein the electrochemical cells on one side of the center wall comprise a cathode, wherein the electrochemical cells on the other side of the center wall comprise a second cathode, and wherein the cathode is thicker than the second cathode.

CLAUSE 66. The electrochemical stack assembly of any of clauses 2 to 64, wherein the electrochemical cells on one side of the center wall comprise a cathode, wherein the electrochemical cells on the other side of the center wall comprise a second cathode, and wherein the cathode has a higher energy density, greater power output, or greater capacity than the second cathode.

CLAUSE 67. The electrochemical stack assembly of any of clauses 2 to 64, wherein the electrochemical cells on one side of the center wall comprise a cathode, wherein the electrochemical cells on the other side of the center wall comprise a second cathode, and wherein the cathode provides greater power output than the second cathode.

CLAUSE 68. The electrochemical stack assembly of clauses 2 to 64, wherein the electrochemical cells on one side of the center wall comprise a cathode, wherein the electrochemical cells on the other side of the center wall comprise a second cathode, and wherein the cathode provides greater capacity than the second cathode.

CLAUSE 69. A module comprising two or more electrochemical stack assemblies of any one of clauses 1 to 68.

CLAUSE 70. The module of clause 69, comprising positive electrodes in each electrochemical cell, and wherein the thickness of the positive electrodes in at least one or more of the two or more electrochemical stack assemblies is greater than the thickness of the positive electrodes in the other electrochemical stack assemblies.

CLAUSE 71. The module of clause 69, comprising negative electrodes in each electrochemical cell, and wherein the thickness of the negative electrodes in at least one or more of the two or more electrochemical stack assemblies is greater than the thickness of the negative electrodes in the other electrochemical stack assemblies.

CLAUSE 72. The module of clause 69, comprising positive electrodes in each electrochemical cell, and wherein the positive electrodes in at least one or more of the two or more electrochemical stack assemblies has greater energy density or greater power output than the positive electrodes in the other electrochemical stack assemblies.

CLAUSE 73. The module of clause 69, comprising positive electrodes in each electrochemical cell, and wherein the positive electrodes in at least one or more of the two or more electrochemical stack assemblies has greater power output than the positive electrodes in the other electrochemical stack assemblies.

CLAUSE 74. The module of clause 69, comprising positive electrodes in each electrochemical cell, and wherein positive electrodes in at least one or more of the two or more electrochemical stack assemblies have greater power output than the positive electrodes in the other electrochemical stack assemblies; and further wherein other positive electrodes in other at least one or more of the two or more electrochemical stack assemblies have greater energy density than the positive electrodes the electrochemical stack assemblies.

CLAUSE 75. A pack comprising a module, or combination of modules, wherein the modules are modules according to any one of clauses 69 to 74.

CLAUSE 76. An electrochemical stack assembly comprising:
  a first solid-state electrochemical stack with two major surfaces and four minor surfaces, said first solid-state electrochemical stack comprising a first electrochemical cell, the cell comprising a solid-state electrolyte;
  a first tray surrounding said first solid-state electrochemical stack, the first tray comprising a first center plane having four sides, and four edges each extending upwardly from a respective one of the four sides, with space between each of the four edges of the first tray and a respective minor surface of said first solid-state electrochemical stack;
  a second solid-state electrochemical stack with two major surfaces and four minor surfaces, said second solid-state electrochemical stack comprising a second electrochemical cell, the cell comprising a solid-state electrolyte;
  a second tray surrounding said second solid-state electrochemical stack, the second tray comprising a second center plane having four sides, and four edges each extending upwardly from a respective one of the four sides, with space between each of the four edges of the second tray and a respective minor surface of said second solid-state electrochemical stack; and
a laminated pouch surrounding the first and second solid-state electrochemical stacks in said first and second trays, the laminated pouch in contact with one of the two major surfaces of the first solid-state electrochemical stack and one of the two major surfaces of the second solid-state electrochemical stack.

CLAUSE 77. The electrochemical stack assembly of clause 76, wherein the first and second center planes are in contact with each other.

CLAUSE 78. The electrochemical stack assembly of clause 76, wherein the first and second center planes comprise material selected from the group consisting of plastic, plastic with thermal additives, rubber, ceramic, clay, glass, tempered glass, aluminum, anodized aluminum, magnesium, magnesium-copper alloy, or aluminum-copper alloy.

CLAUSE 79. The electrochemical stack assembly of clause 76, wherein the first and second trays comprise material selected from the group consisting of plastic, plastic with thermal additives, rubber, ceramic, clay, glass, tempered glass, aluminum, anodized aluminum, magnesium, magnesium-copper alloy, or aluminum-copper alloy.

CLAUSE 80. The electrochemical stack assembly of any of clauses 76 to 79, wherein each of the first and second solid-state electrochemical stacks comprises two electrochemical cells, each with a solid-state electrolyte.

CLAUSE 81. The electrochemical stack assembly of any of clauses 76 to 80, wherein each of the first and second electrochemical stacks comprises four electrochemical cells.

CLAUSE 82. The electrochemical stack assembly of any of clauses 76 to 81, wherein each of the first and second electrochemical stacks comprises eight electrochemical cells, each with a solid-state electrolyte.

CLAUSE 83. The electrochemical stack assembly of any of clauses 76 to 82, wherein each of the first and second electrochemical stacks comprises sixteen electrochemical cells, each with a solid-state electrolyte.

CLAUSE 84. The electrochemical stack assembly of any of clauses 76 to 83, wherein each of the first and second electrochemical stacks comprises twenty-four electrochemical cells, each with a solid-state electrolyte.

CLAUSE 85. The electrochemical stack assembly of any of clauses 76 to 84, wherein each of the electrochemical cells comprises, in order, a first anode current collector, a first anode support, a first separator, a first cathode frame, a first cathode current collector, a second cathode current collector, a second cathode frame, a second separator, a second anode support, and a second anode current collector.

CLAUSE 86. The electrochemical stack assembly of any of clauses 76 to 85, further comprising a first spacer block and a first compressible sheet disposed between one of the two major surfaces of said first solid-state electrochemical stack and said laminated pouch, and a second spacer block and a second compressible sheet disposed between one of the two major surfaces of said second solid-state electrochemical stack and said laminated pouch.

CLAUSE 87. The electrochemical stack assembly of any of clauses 76 to 86, further comprising a first bonding layer between said first center plane and said first electrochemical stack, and a second bonding layer between said second center plane and said second electrochemical stack.

CLAUSE 88. The electrochemical stack assembly of any of clauses 76 to 87, wherein one of the four edges of the first tray contains a first pair of elongate openings, and one of the four edges of the second tray contains a second pair of elongate openings.

CLAUSE 89. The electrochemical stack assembly of clause 88, further comprising a first piece extending over the first pair of elongate openings, and a second piece extending over the second pair of elongate openings.

CLAUSE 90. The electrochemical stack assembly of clause 88 or clause 89, wherein an anode and a cathode of each of said first and second electrochemical stacks extends through a respective pair of said elongate openings.

CLAUSE 91. The electrochemical stack assembly of any of clauses 76 to 90, wherein one of the four edges of the first tray contains a first elongate opening, and one of the four edges of the second tray contains a second elongate opening.

CLAUSE 92. The electrochemical stack assembly of clause 91, further comprising a first piece extending over the first elongate opening to define a first pair of elongate openings, and a second piece extending over the second elongate opening to define a second pair of elongate openings.

CLAUSE 93. The electrochemical stack assembly of clause 91 or clause 92, wherein an anode and a cathode of each of said first and second electrochemical stacks extend through a respective pair of elongate openings.

CLAUSE 94. An electrochemical stack assembly comprising:
one or more electrochemical cells, each electrochemical cell comprising a solid-state electrolyte to form an electrochemical stack with two major surfaces and four minor surfaces;
a frame surrounding the electrochemical stack with space between the frame and each of the four minor surfaces; and
a laminated pouch surrounding the frame and the electrochemical stack, the laminated pouch in contact with one or both of two major surfaces.

CLAUSE 95. The electrochemical stack assembly of clause 94, wherein the electrochemical stack assembly further comprises a center wall, the electrochemical stack assembly further comprising an adhesive to adhere the center wall to one of two major surfaces, wherein the laminated pouch is in contact with the other of the two major surfaces.

CLAUSE 96. The electrochemical stack assembly of clause 95, wherein the adhesive comprises a pressure sensitive adhesive.

CLAUSE 97. The electrochemical stack assembly of clause 95 or 96, wherein the center wall comprises a thermally conductive material.

CLAUSE 98. The electrochemical stack assembly of any of clauses 94 to 97, further comprising at least one positive electrode terminal and at least one negative electrode terminal.

CLAUSE 99. The electrochemical stack assembly of any of clauses 94 to 98, wherein the frame is at a negative electrical potential.

CLAUSE 100. The electrochemical stack assembly of any of clauses 94 to 98, wherein the frame is at a positive electrical potential.

CLAUSE 101. The electrochemical stack assembly of any of clauses 94 to 100, further comprising an insulating material to insulate the frame.

CLAUSE 102. The electrochemical stack assembly of any of clauses 94 to 101, wherein the frame comprises material selected from the group consisting of plastic, plastic with thermal additives, rubber, ceramic, clay, glass, tempered glass, thermoplastics, carbon fiber, metal-plastic composites, aluminum, anodized aluminum, magnesium, magnesium-copper alloy, or aluminum-copper alloy, or combinations thereof.

CLAUSE 103. The electrochemical stack assembly of any of clauses 94 to 102, wherein the space between the frame and the four minor surfaces of the electrochemical stack prevents the application of force by the laminated pouch to the four minor surfaces during charge and discharge cycles of the electrochemical stack and thereby prevents deformation, cracking, or otherwise damaging the solid-state electrolyte in each of the one or more electrochemical cells.

CLAUSE 104. The electrochemical stack assembly of any of clauses 94 to 103, wherein an interior of the laminated pouch is under vacuum such that the laminated pouch contacts one or both major surfaces of the electrochemical stack.

CLAUSE 105. The electrochemical stack assembly of any of clauses 94 to 104, wherein an interior of the laminated pouch is under vacuum such that the laminated pouch contacts both major surfaces.

CLAUSE 106. The electrochemical stack assembly of any of clauses 94 to 105, wherein the space between the frame and the electrochemical stack provides space for the electrochemical stack to expand and contract during a charge and discharge cycle without deforming, cracking, or otherwise damaging the solid-state electrolyte in each of the one or more electrochemical cells.

CLAUSE 107. The electrochemical stack assembly of any of clauses 94 to 106, wherein the space between the frame and the electrochemical stack provides space for the at least one electrochemical stack to expand during a charge cycle without deforming, cracking, or otherwise damaging the solid-state electrolyte in each of the one or more electrochemical cells.

CLAUSE 108. The electrochemical stack assembly of any of clauses 94 to 107, wherein the laminated pouch provides about 20% of expansion and contraction in a direction normal to at least one of the two major surfaces.

CLAUSE 109. The electrochemical stack assembly of any of clauses 94 to 108, wherein a distribution of pressure across the two major surfaces is uniform across a surface area of 10 $mm^2$, 10 $cm^2$, or 10 $m^2$.

CLAUSE 110. The electrochemical stack assembly of any of clauses 94 to 108, wherein a distribution of pressure across the two major surfaces is uniform across a surface area of 20 $mm^2$, 20 $cm^2$, or 20 $m^2$.

CLAUSE 111. The electrochemical stack assembly of any of clauses 94 to 108, wherein a distribution of pressure across the two major surfaces is uniform across a surface area of 30 $mm^2$, 30 $cm^2$, or 30 $m^2$.

CLAUSE 112. The electrochemical stack assembly of any of clauses 94 to 111, wherein the laminated pouch conforms around the frame.

CLAUSE 113. The electrochemical stack assembly of any of clauses 94 to 112, wherein the laminated pouch retains its shape when an interior of the laminated pouch is under vacuum.

CLAUSE 114. The electrochemical stack assembly of any of clauses 94 to 113, wherein the laminated pouch is sealed and an interior of the laminated pouch is under vacuum.

CLAUSE 115. The electrochemical stack assembly of any of clauses 94 to 114, wherein the laminated pouch applies 78 pounds of force per unit area on the two major surfaces of the electrochemical stack.

CLAUSE 116. The electrochemical stack assembly of any of clauses 113 to 115, wherein the vacuum provides up to 14.7 pounds per square inch (PSI) of atmospheric pressure on the two major surfaces of the electrochemical stack.

CLAUSE 117. The electrochemical stack assembly of any of clauses 94 to 116, wherein the laminated pouch comprises a pair of laminate forms with facing surfaces forming a seam, the facing surfaces being bonded with a seal at the seam.

CLAUSE 118. The electrochemical stack assembly of any of clauses 94 to 117, wherein the vacuum in the laminated pouch is less than 10 Torr.

CLAUSE 119. The electrochemical stack assembly of any of clauses 94 to 118, wherein the frame comprises material selected from the group consisting of metal, plastic, rubber, silicone, or combinations thereof.

CLAUSE 120. The electrochemical stack assembly of any of clauses 94 to 119, wherein the laminated pouch has a formed shape with two major surfaces.

CLAUSE 121. The electrochemical stack assembly of any clause 120, wherein the ratio of the surface area of one of the two major surfaces of the formed shape on the laminated pouch to the surface area of one of the two major surfaces of the electrochemical stack is greater than 1.

CLAUSE 122. The electrochemical stack assembly of clause 121, wherein the ratio of the surface area of one of the two major surfaces of the formed shape on the laminated pouch to the surface area of one of the two major surfaces of the electrochemical stack is greater than 1.1.

CLAUSE 123. The electrochemical stack assembly of clause 121 or 122, wherein the ratio of the surface area of one of the two major surfaces of the formed shape on the laminated pouch to the surface area of one of the two major surfaces of the electrochemical stack is greater than 1.2.

CLAUSE 124. The electrochemical stack assembly of any of clauses 94 to 123, wherein one of the major surfaces of the electrochemical stack is rectangular and has dimensions of 64 mm×79 mm.

CLAUSE 125. The electrochemical stack assembly of any of clauses 121 to 124, wherein a thickness of the formed shape of the laminated pouch is about 20% of the thickness of the electrochemical stack.

CLAUSE 126. The electrochemical stack assembly of any of clauses 121 to 124, wherein a thickness of the formed shape of the laminated pouch is 13.5 mm.

CLAUSE 127. The electrochemical stack assembly of any of clauses 98 to 125, wherein the at least one positive electrode terminal and at least one negative electrode terminal extend through the frame and the laminated pouch.

CLAUSE 128. The electrochemical stack assembly of any of clauses 98 to 124, wherein each electrochemical cell comprises a solid-state electrolyte separator.

CLAUSE 129. The electrochemical stack assembly of clause 128, wherein the solid-state electrolyte separator comprises a sintered lithium-stuffed garnet electrolyte.

CLAUSE 130. The electrochemical stack assembly of any of clauses 94 to 129, wherein the negative electrode comprises lithium metal.

CLAUSE 131. The electrochemical stack assembly of any of clauses 95 to 130, wherein the center wall is attached to either a positive electrode or a negative electrode of the electrochemical stack.

CLAUSE 132. The electrochemical stack assembly of clause 131, further comprising a pressure-sensitive adhesive to attach the center wall of the frame to either the positive electrode or the negative electrode of the electrochemical stack.

CLAUSE 133. The electrochemical stack assembly of clause 131 or clause 132, further comprising a pressure-sensitive adhesive to attach the frame to either the positive electrode or negative electrode of the electrochemical stack.

CLAUSE 134. The electrochemical stack assembly of any of clauses 94 to 133, wherein the frame comprises a metal insert and a surrounding plastic portion.

CLAUSE 135. The electrochemical stack assembly of clause 134, wherein the surrounding plastic portion comprises a plurality of protrusions disposed around a perimeter of the surrounding plastic portion.

CLAUSE 136. The electrochemical stack assembly of clause 134 or clause 135, wherein the surrounding plastic portion comprises a flange portion along at least three sides.

CLAUSE 137. The electrochemical stack assembly of clause 98, wherein the at least one positive electrode terminal and at least one negative electrode terminal are flat.

CLAUSE 138. The electrochemical stack assembly of clause 98, wherein the at least one positive electrode terminal and at least one negative electrode terminal are bent.

CLAUSE 139. The electrochemical stack assembly of clause 98, wherein the at least one positive electrode terminal and at least one negative electrode terminal have a Z-bend.

CLAUSE 140. The electrochemical stack assembly of clause 98, wherein the at least one positive electrode terminal and at least one negative electrode terminal are folded.

CLAUSE 141. A module comprising two or more electrochemical stack assemblies of any one of clauses 76 to 140.

CLAUSE 142. The module of clause 138, comprising positive electrodes in each electrochemical cell, and wherein the thickness of the positive electrodes in at least one or more of the two or more electrochemical stack assemblies is greater than the thickness of the positive electrodes in the other electrochemical stack assemblies.

CLAUSE 143. The module of clause 138, comprising negative electrodes in each electrochemical cell, and wherein the thickness of the negative electrodes in at least one or more of the two or more electrochemical stack assemblies is greater than the thickness of the negative electrodes in the other electrochemical stack assemblies.

CLAUSE 144. The module of clause 138, comprising positive electrodes in each electrochemical cell, and wherein the positive electrodes in at least one or more of the two or more electrochemical stack assemblies have greater energy density than the positive electrodes in the other electrochemical stack assemblies.

CLAUSE 145. The module of clause 138, comprising positive electrodes in each electrochemical cell, and wherein the positive electrodes in at least one or more of the two or more electrochemical stack assemblies have greater power output than the positive electrodes in the other electrochemical stack assemblies.

CLAUSE 146. The module of clause 138, comprising positive electrodes in each electrochemical cell, and wherein positive electrodes in at least one or more of the two or more electrochemical stack assemblies have greater power output than the positive electrodes in the other electrochemical stack assemblies; and further wherein other positive electrodes in other at least one or more of the two or more electrochemical stack assemblies have greater energy density than the positive electrodes in the other electrochemical stack assemblies.

CLAUSE 147. A pack comprising a module, or combination of modules, wherein the modules are modules according to any one of clauses 141 to 146.

CLAUSE 148. An electric vehicle comprising an electrochemical stack assembly according to any of clauses 1 to 140; a module according to any of clauses 141 to 146; or a pack according to clause 147.

The embodiments and examples described above are intended to be merely illustrative and non-limiting. Ordinarily skilled artisans will recognize, or will be able to ascertain using no more than routine experimentation, numerous equivalents of specific compounds, materials and procedures. All such equivalents are considered to be within the scope and are encompassed by the appended claims.

What is claimed is:

1. An electrochemical stack assembly comprising:
one or more electrochemical cells, each electrochemical cell comprising a solid-state electrolyte to form a first electrochemical stack with two major surfaces and four minor surfaces;
a frame surrounding the first electrochemical stack with space between the frame and each of the four minor surfaces, the frame comprising a center wall integral with the frame, one of the two major surfaces in contact with the center wall; and
a laminated pouch surrounding the frame and the electrochemical stack, the laminated pouch in contact with the other of the two major surfaces.

2. The electrochemical stack assembly of claim 1, further comprising an adhesive to adhere the center wall to one of the two major surfaces.

3. The electrochemical stack assembly of claim 2, wherein the adhesive comprises a pressure sensitive adhesive.

4. The electrochemical stack assembly of claim 1, wherein the center wall comprises a thermally conductive material.

5. The electrochemical stack assembly of claim 1, further comprising at least one positive electrode terminal and at least one negative electrode terminal.

6. The electrochemical stack assembly of claim 1, wherein the frame is at one of a negative or a positive electrical potential.

7. The electrochemical stack assembly of claim 1, further comprising an insulating material to insulate the frame.

8. The electrochemical stack assembly of claim 1, wherein the frame comprises material selected from the group consisting of plastic, plastic with thermal additives, rubber, ceramic, clay, glass, tempered glass, thermoplastics, carbon fiber, metal-plastic composites, aluminum, anodized aluminum, magnesium, magnesium-copper alloy, or aluminum-copper alloy, or combinations thereof.

9. The electrochemical stack assembly of claim 1, wherein the space between the frame and the four minor surfaces of the first electrochemical stack prevents the application of force by the laminated pouch to the four minor surfaces during charge and discharge cycles of the first electrochemical stack and thereby prevents deforming, cracking, or otherwise damaging the first electrochemical stack.

10. The electrochemical stack assembly of claim 1, wherein the space between the frame and the first electrochemical stack provides space for the first electrochemical stack to expand and contract during a charge and discharge cycle without deforming, cracking, or otherwise damaging the first electrochemical stack.

11. The electrochemical stack assembly of claim 1, wherein an interior of the laminated pouch is under vacuum to put the laminated pouch in contact with the other major surface.

12. The electrochemical stack assembly of claim 1, wherein the laminated pouch provides about 20% of expansion and contraction in a direction normal to at least one of the two major surfaces.

13. The electrochemical stack assembly of claim 1, wherein a distribution of pressure across the two major surfaces is uniform across a surface area of 10 mm$^2$, 20 mm$^2$, 30 mm$^2$, 10 cm$^2$, 20 cm$^2$, 30 cm$^2$, 10 m$^2$, 20 m$^2$, or 30 m$^2$.

14. The electrochemical stack assembly of claim 1, wherein the laminated pouch conforms around the frame.

15. The electrochemical stack assembly of claim 1, wherein the laminated pouch retains its shape when an interior of the laminated pouch is under vacuum.

16. The electrochemical stack assembly of claim 1, wherein the laminated pouch is sealed and an interior of the laminated pouch is under vacuum.

17. The electrochemical stack assembly of claim 1, wherein the laminated pouch applies 78 pounds of force per unit area on the two major surfaces of the electrochemical stack.

18. The electrochemical stack assembly of claim 16, wherein the vacuum provides up to 14.7 pounds per square inch (PSI) of atmospheric pressure on the two major surfaces of the electrochemical stack.

19. The electrochemical stack assembly of claim 1, wherein the laminated pouch comprises a pair of laminate forms with facing surfaces forming a seam, the facing surfaces being bonded with a seal at the seam.

20. The electrochemical stack assembly of claim 16, wherein the vacuum in the laminated pouch is less than 10 Torr.

\* \* \* \* \*